US010091686B2

(12) United States Patent
Kim et al.

(10) Patent No.: US 10,091,686 B2
(45) Date of Patent: Oct. 2, 2018

(54) METHOD AND APPARATUS FOR TRANSMITTING AND RECEIVING STATUS REPORT COMPRISING RECEIVED STATUS OF PACKET DATA IN A MOBILE COMMUNICATION SYSTEM

(71) Applicant: Samsung Electronics Co., Ltd., Suwon-si, Gyeonggi-do (KR)

(72) Inventors: Soeng-Hun Kim, Suwon-si (KR); Sung-Ho Choi, Suwon-si (KR); O-Sok Song, Suwon-si (KR); Gert Jan Van Lieshout, Staines (GB); Himke Van Der Velde, Staines (GB)

(73) Assignee: Samsung Electronics Co., Ltd., Suwon-si (KR)

(*) Notice: Subject to any disclaimer, the term of this patent is extended or adjusted under 35 U.S.C. 154(b) by 195 days.

(21) Appl. No.: 14/139,154

(22) Filed: Dec. 23, 2013

(65) Prior Publication Data

US 2014/0112255 A1    Apr. 24, 2014

Related U.S. Application Data

(63) Continuation of application No. 11/520,781, filed on Sep. 14, 2006, now Pat. No. 8,634,400.

(30) Foreign Application Priority Data

Sep. 15, 2005 (KR) .................. 10-2005-0086360
Jan. 4, 2006 (KR) .................. 10-2006-0000948

(Continued)

(51) Int. Cl.
*H04L 12/24* (2006.01)
*H04W 28/02* (2009.01)
*H04L 1/16* (2006.01)
*H04L 1/18* (2006.01)
*H04W 36/02* (2009.01)

(52) U.S. Cl.
CPC ....... *H04W 28/0278* (2013.01); *H04L 1/1635* (2013.01); *H04L 1/1642* (2013.01);
(Continued)

(58) Field of Classification Search
USPC ......... 370/230, 236, 10, 242, 310, 331, 349, 370/394, 389
See application file for complete search history.

(56) References Cited

U.S. PATENT DOCUMENTS 5,677,918 A * 10/1997 Tran ................. H04L 1/0083
370/321
6,317,430 B1   11/2001 Knisely et al.
(Continued)

FOREIGN PATENT DOCUMENTS

EP    1 253 795 A1   10/2002
EP    1 533 932 A1   5/2005
(Continued)

*Primary Examiner* — Yemane Mesfin
*Assistant Examiner* — Mon Cheri Davenport
(74) *Attorney, Agent, or Firm* — Jefferson IP Law, LLP

(57) ABSTRACT

A method for transmitting packet data units Packet Data Units (PDUs) at a PDU transmitter in a communication system is provided. The method includes transmitting a first PDU comprising a PDU header and a data portion, receiving Negative Acknowledgement NACK information for the first PDU, segmenting the first PDU to form one or more PDU segments if a size of a second PDU for retransmission is smaller than a size of the first PDU, wherein each of the one or more PDU segment comprises a PDU segment header and a data portion, and transmitting the one or more PDU segment to a PDU receiver.

20 Claims, 41 Drawing Sheets

(30) Foreign Application Priority Data

| | | |
|---|---|---|
| Mar. 9, 2006 | (KR) | 10-2006-0022226 |
| Jun. 9, 2006 | (KR) | 10-2006-0051938 |
| Jun. 13, 2006 | (KR) | 10-2006-0053225 |

(52) U.S. Cl.
CPC .......... *H04L 1/1657* (2013.01); *H04L 1/1825* (2013.01); *H04L 1/1854* (2013.01); *H04W 36/02* (2013.01)

(56) References Cited

U.S. PATENT DOCUMENTS

| | | |
|---|---|---|
| 6,343,341 B1 | 1/2002 | Cabrera et al. |
| 6,772,215 B1 | 8/2004 | Rathonyi et al. |
| 6,895,010 B1 | 5/2005 | Chang et al. |
| 6,973,140 B2 | 12/2005 | Hoffman et al. |
| 2002/0141448 A1* | 10/2002 | Matsunaga ............. H04L 29/06 370/469 |
| 2004/0004954 A1 | 1/2004 | Terry et al. |
| 2004/0071140 A1* | 4/2004 | Jason ..................... H04L 47/10 370/392 |
| 2004/0165554 A1 | 8/2004 | Chao et al. |
| 2005/0013828 A1 | 1/2005 | George et al. |
| 2006/0056333 A1 | 3/2006 | Ogura |

FOREIGN PATENT DOCUMENTS

| | | |
|---|---|---|
| KR | 10-2004-0009226 A | 1/2004 |
| WO | 03/043259 A1 | 5/2003 |
| WO | 2004/054307 A1 | 6/2004 |

\* cited by examiner

METHOD AND APPARATUS FOR TRANSMITTING AND RECEIVING STATUS REPORT COMPRISING RECEIVED STATUS OF PACKET DATA IN A MOBILE COMMUNICATION SYSTEM

PRIORITY

This application is a continuation application of a prior application Ser. No. 11/520,781, filed on Sep. 14, 2006, which claimed the benefit under 35 U.S.C. § 119(a) of a Korean patent application filed on Sep. 15, 2005 in the Korean Intellectual Property and assigned Serial number 10-2005-0086360, a Korean patent application filed on Jan. 4, 2006 in the Korean Intellectual Property Office and assigned Serial number 10-2006-0000948, a Korean patent application filed on Mar. 9, 2006 in the Korean Intellectual Property Office and assigned Serial number 10-2006-0022226, a Korean patent application filed on Jun. 9, 2006 in the Korean Intellectual Property Office and assigned Serial number 10-2006-0051938, and a Korean patent application filed on Jun. 13, 2006 in the Korean Intellectual Property Office and assigned Serial number 10-2006-0053225, the entire disclosure of each of which is hereby incorporated by reference.

BACKGROUND OF THE INVENTION

Field of the Invention

The present invention relates generally to a mobile communication system. More particularly, the present invention relates to a method and apparatus for transmitting and receiving a status report indicating a received status of packet data.

Description of the Related Art

A Universal Mobile Telecommunication Service (UMTS) system is a 3rd generation asynchronous mobile communication system using Wideband Code Division Multiple Access (WCDMA) based on Global System for Mobile Communications (GSM) and General Packet Radio Services (GPRS), both of which are European mobile communication systems.

The general UMTS system is composed of a Core Network (CN) and a plurality of Radio Network Subsystems (RNSs). The RNSs constitute a UMTS Terrestrial Radio Access Network (UTRAN). The CN includes a Serving GPRS Support Node (SGSN) and a Gateway GPRS Support Node (GGSN) in order to connect the UTRAN to a packet data network such as the Internet.

The RNS is composed of Radio Network Controllers (RNCs) and a plurality of Node Bs. Each RNC is connected to its associated Node Bs via an interface called Iub. A connection between the RNCs is made by an interface called Iur. In addition, a connection between a User Equipment (UE) and the UTRAN is made by an interface called Uu. The RNC allocates radio resources for its own Node Bs and the Node Bs actually provide the radio resources allocated from the RNC, to the UE. The radio resources are configured separately for each individual cell, and the radio resources provided by each Node B mean the radio resources associated with a particular cell is managed by the corresponding Node B. The UE sets up a radio channel using the radio resources associated with the particular cell managed by the Node B, and transmits and receives data over a set radio channel.

Meanwhile, in 3rd Generation Partnership Project (3GPP) in charge of UMTS standardization, Long Term Evolution (LTE) of the UMTS system is now under discussion. LTE is a technology for implementing communication based on high-speed packets of about 100 Mbps, aiming at deployment in around 2010. Accordingly, several plans are under discussion. For example, there is one plan to reduce the number of nodes located in a transmission path by simplifying a configuration of the network, and another plan to approach radio protocols as close to radio channels as possible. As a result, the LTE configuration is expected to change from a 4-node configuration of the existing UMTS system to a 2-node or 3-node configuration.

FIG. 1 illustrates an exemplary configuration of an Evolved UMTS mobile communication system. As illustrated, Evolved Radio Access Networks (E-RANs) 110 and 112 are simplified to a 2-node configuration of Evolved Node Bs (ENBs) 120, 122, 124, 126 and 128), and Evolved Gateway GPRS Serving Node (EGGSNs) 130 and 132. A User Equipment (UE) 101 accesses an Internet Protocol (IP) network 114 via the E-RANs 110 and 112.

The ENBs 120 to 128 correspond to legacy Node Bs of the UMTS system, and are connected to the UE 101 via radio channels. Compared with the legacy Node Bs, the ENBs 120 to 128 perform complex functions. In LTE, all user traffic including real-time service such as Voice over IP (VoIP) are serviced through a shared channel, so there is no need for an apparatus for collecting status information of UEs and performing scheduling thereon. For example, the ENBs 120 to 128 take charge of the scheduling.

Like High Speed Downlink Packet Access (HSDPA) or Enhanced uplink Dedicated Channel (E-DCH) supported by the UMTS system, LTE also performs Hybrid Automatic Retransmission Request (HARQ) between the ENBs 120 to 128 and the UE 101. HARQ refers to a technique for soft-combining previously received data with retransmitted data without discarding previously received data, thereby increasing a reception success rate. However, because it is not possible to satisfy various Quality-of-Service (QoS) requirements only with HARQ, outer Automatic Retransmission Request (ARQ) can be performed in an upper layer, and the outer ARQ is also performed between the UE 101 and the ENBs 120 to 128.

In order to implement a data rate of a maximum of 100 Mbps, LTE can use Orthogonal Frequency Division Multiplexing (OFDM) as a radio access technology in the 20-MHz bandwidth. In addition, an Adaptive Modulation & Coding (AMC) scheme for determining a modulation scheme and a channel coding rate according to a channel status of the UE can be applied to LTE.

Meanwhile, radio communication includes a process of segmenting or concatenating packets having various sizes, generated in an application layer, in an appropriate size, attaching a header containing necessary additional information thereto, and transmitting the header-attached segments through a radio channel. The operation of matching the size of the packets to the size appropriate for transmission and reception over the radio channel is called 'framing'.

The typical UMTS communication system frames transmission data once in a Radio Link Control (RLC) layer, and then performs framing again in a Medium Access Control (MAC) layer. This is because although the UMTS communication is designed based on dedicated channels that operate only with RLC framing, there is a need for framing of the MAC layer due to introduction of the shared channel of HSDPA/E-DCH. More specifically, the RLC layer performs an operation of matching a packet size of an upper layer to a predetermined size, and the MAC layer performs an operation of concatenating the packets provided from the RLC layer according to the amount of the packets to be transmitted in the next Transmission Time Interval (TTI). In IP communication, the upper layer can be an IP layer.

FIGS. 2A and 2B illustrate a hierarchical structure for framing upper layer data, and a frame format thereof in a typical UMTS communication system, respectively.

Referring to FIG. 2A, a UMTS radio protocol is composed of a physical layer 275, a MAC layer 270, and RLC layers 260 and 265. If data (for example, an IP packet) generated in upper layers 250 and 255 is delivered to any one of the RLC entities 260 and 265, the RLC entity 260 or 265 segments the IP packet according to a predetermined size, and attaches a header to each of the segmented parts, thereby generating a RLC Protocol Data Unit (PDU). As illustrated in FIG. 2B, the header includes a Sequence Number (SN) 210, an E bit 215 and a Length Indicator (LI) 220. The LI 220, information indicating an end position of the IP packet, is optional header information inserted when the last part of the IP packet is included in the RLC PDU. For example, because a RLC PDU 205 includes the last part of an IP packet 204, a LI is inserted in the RLC PDU 205.

The MAC layer 270 receives RLC PDUs from the RLC layers 260 and 265, and concatenates the RLC PDUs according to the size of a MAC PDU 206. In a system to which Node B scheduling is applied, like HSDPA or E-DCH, a size of the MAC PDU 206 is variable according to the amount of scheduled transmission resources. Therefore, a Size Index (SID) 208 indicating a size of each RLC PDU, and an N bit 209 indicating the number of contained RLC PDUs are inserted in the MAC PDU 206 as header information. RLC PDUs delivered from more than two RLC entities can be concatenated to one MAC PDU 206. In order to identify the RLC PDUs, a Multiplexing Identifier (MID) 211 is inserted in the head of the MAC PDU 206. The multiplexing information 211 indicates to which RLC entities the contained RLC PDUs should be delivered.

In HARQ operation, received packets may suffer sequence turnover, and in order to solve the sequence turnover problem, a receiver receiving the MAC PDU 206 may need a separate SN. Therefore, a Transmission Sequence Number (TSN) 207 is assigned for the RLC PDUs generated in one RLC entity among the RLC PDUs contained in the MAC PDU 206 in a concatenated fashion. That is, the RLC PDUs 202 and 203 generated by different RLC entities have different TSN values.

As described in FIGS. 2A and 2B, the overlapping framing scheme used in the typical UMTS network is disadvantageous because overlapped information is used in the header. For example, the SN 210 is inserted in each RLC PDU, and the TSN 207 is inserted in the MAC PDU 206. In addition, as the SN 210 is inserted in each RLC PDU having a smaller size, overhead increases undesirably.

Accordingly, there is a need for an improved method and apparatus for transmitting and receiving a status report that comprises a received status of packet data.

SUMMARY OF THE INVENTION

An aspect of exemplary embodiments of the present invention is to address at least the above problems and/or disadvantages and to provide at least the advantages described below. Accordingly, an aspect of exemplary embodiments of the present invention is to provide a method and apparatus for correctly transmitting and receiving a series of data packets in a mobile communication system having a hierarchical structure.

An exemplary embodiment of the present invention provides a method and apparatus for transmitting and receiving a status report indicating a received status of data packets in a mobile communication system.

According to one aspect of exemplary embodiments of the present invention, there is provided a method for transmitting a status report indicating a received status of packet data in a mobile communication system, in which in the course of receiving data packets from a transmitter, whether there is a need for transmission of an implicit NACK signal for requesting retransmission of at least one non-received data packet whose sequence number is unidentified is determined; if there is a need for transmission of the implicit NACK signal, the implicit NACK signal including a sequence number of the last packet among the successfully received data packets is generated, and a status report including the implicit NACK signal is transmitted to the transmitter; and if there is no need for transmission of the implicit NACK signal, a status report including at least one of an ACK signal indicating a sequence number of a successfully received data packet and an explicit NACK signal indicating a sequence number of a non-received data packet whose sequence number is identified is transmitted to the transmitter.

According to another aspect of exemplary embodiments of the present invention, there is provided a method for receiving a status report indicating a received status of packet data in a mobile communication system, in which data packets are transmitted to a receiver; a status report indicating a received status of the transmitted data packets is received from the receiver; whether an implicit NACK signal including a sequence number of the last packet among the successfully received data packets is included in the status report is determined, in order to request retransmission of a non-received data packet whose sequence number is unidentified; if the implicit NACK signal is included in the status report, data packets following the last packet indicated by the implicit NACK signal is transmitted to the receiver; and if the implicit NACK signal is not included in the status report, at least one of an ACK signal indicating a sequence number of a successfully received data packet and an explicit NACK signal indicating a sequence number of a non-received data packet whose sequence number is identified is detected from the status report, and the non-received data packet whose sequence number is identified is retransmitted, indicated by the explicit NACK signal.

According to a further aspect of exemplary embodiments of the present invention, there is provided an apparatus for transmitting a status report indicating a received status of packet data in a mobile communication system, in which a data receiver receives data packets from a transmitter and stores the received data packets; and a controller determines in the course of receiving the data packets whether there is a need for transmission of an implicit NACK signal for requesting retransmission of a non-received data packet whose sequence number is unidentified, if there is a need for transmission of the implicit NACK signal, generates a status report including an implicit NACK signal indicating a sequence number of the last packet among the successfully received data packets, if there is no need for transmission of the implicit NACK signal, generates a status report including at least one of an ACK signal indicating a sequence number of a successfully received data packet and an explicit NACK signal indicating a sequence number of a non-received data packet whose sequence number is identified, and transmits the status reports to the transmitter.

According to yet another aspect of exemplary embodiments of the present invention, there is provided an apparatus for receiving a status report indicating a received status of packet data in a mobile communication system, in which a data transmitter transmits data packets to a receiver; and a controller receives from the receiver, a status report indicating a received status of the transmitted data packets, if an implicit NACK signal including a sequence number of the last packet among the successfully received data packets is included in the status report, in order to request retransmission of a non-received data packet whose sequence number is unidentified, controls the data transmitter such that it transmits data packets following the last packet indicated by the implicit NACK signal to the receiver, and if the implicit NACK signal is not included in the status report, detects from the status report at least one of an ACK signal indicating a sequence number of a successfully received data packet and an explicit NACK signal indicating a sequence number of a non-received data packet whose sequence number is identified, and controls the data transmitter such that it retransmits the non-received data packet whose sequence number is identified, indicated by the explicit NACK signal.

According to still another aspect of exemplary embodiments of the present invention, there is provided a method for transmitting a status report indicating a received status of packet data in a terminal of a mobile communication system, in which the terminal receiving data packets moves from a source cell to a target cell due to handover; after moving to the target cell, the terminal waits until a data packet is first received from the target cell; and upon receipt of the data packet, a status report indicating a received status of the terminal is transmitted to a radio network controller (RNC) that controls radio resources of the terminal.

According to still another aspect of exemplary embodiments of the present invention, there is provided a terminal apparatus for transmitting a status report indicating a received status of packet data in a mobile communication system, in which a data receiver receives a series of data packets from a network and stores the received data packets; and a controller waits until a data packet is first received from the target cell, if the terminal moves from a source cell to a target cell due to handover, and upon receipt of the data packet, transmits a status report indicating a received status of the terminal to a radio network controller (RNC) that controls radio resources of the terminal.

BRIEF DESCRIPTION OF THE DRAWINGS

The above and other objects, features and advantages of certain exemplary embodiments of the present invention will be more apparent from the following detailed description taken in conjunction with the accompanying drawings, in which.

DETAILED DESCRIPTION OF EXEMPLARY EMBODIMENTS

The matters defined in the description such as a detailed construction and elements are provided to assist in a comprehensive understanding of exemplary embodiments of the invention. Accordingly, those of ordinary skill in the art will recognize that various changes and modifications can be made without departing from the scope and spirit of the invention. Also, descriptions of well-known functions and constructions are omitted for clarity and conciseness.

Exemplary embodiments of the present invention provides a mobile communication system including a Radio Link Control (RLC) layer for segmenting a packet from an upper layer according to a predetermined size, and a Medium Access Control (MAC) layer for concatenating the packets from the RLC layer according to the amount of transmission resources allocated through scheduling, and in the mobile communication system, the MAC layer performs framing rather than both the RLC layer and the MAC layer perform framing in an overlapping fashion. The MAC layer performs framing according to a size of the MAC PDU to be transmitted in the next Transmission Time Interval (TTI). In the case where the variable-size frames are used, even though there is an ARQ retransmission request, a transmitter may not perform retransmission because of mismatch between a size of the packet to be retransmitted and the amount of scheduled transmission resources. In order to solve this problem, an exemplary embodiment of the present invention introduces a segmented retransmission concept (or the concept of segmentation before retransmission).

Figure 1:
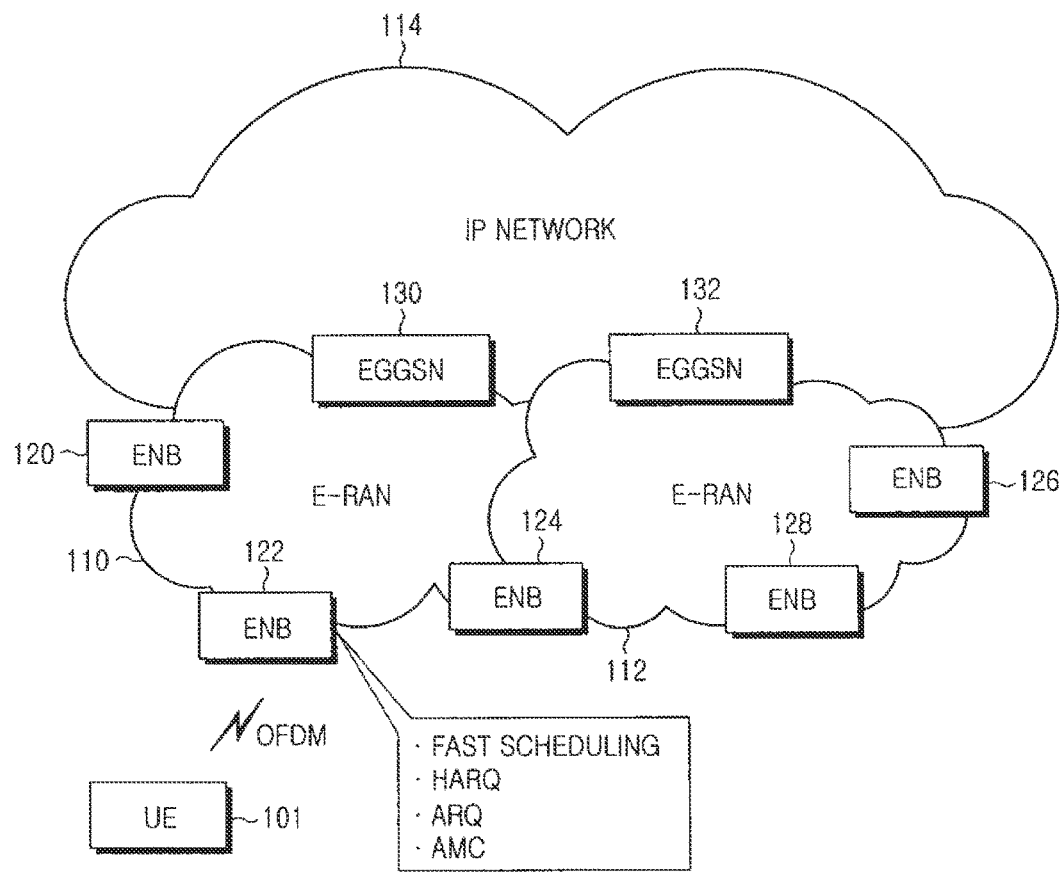
FIG. 1 is a diagram illustrating an exemplary configuration of an Evolved UMTS mobile communication system.
Figure 2A:
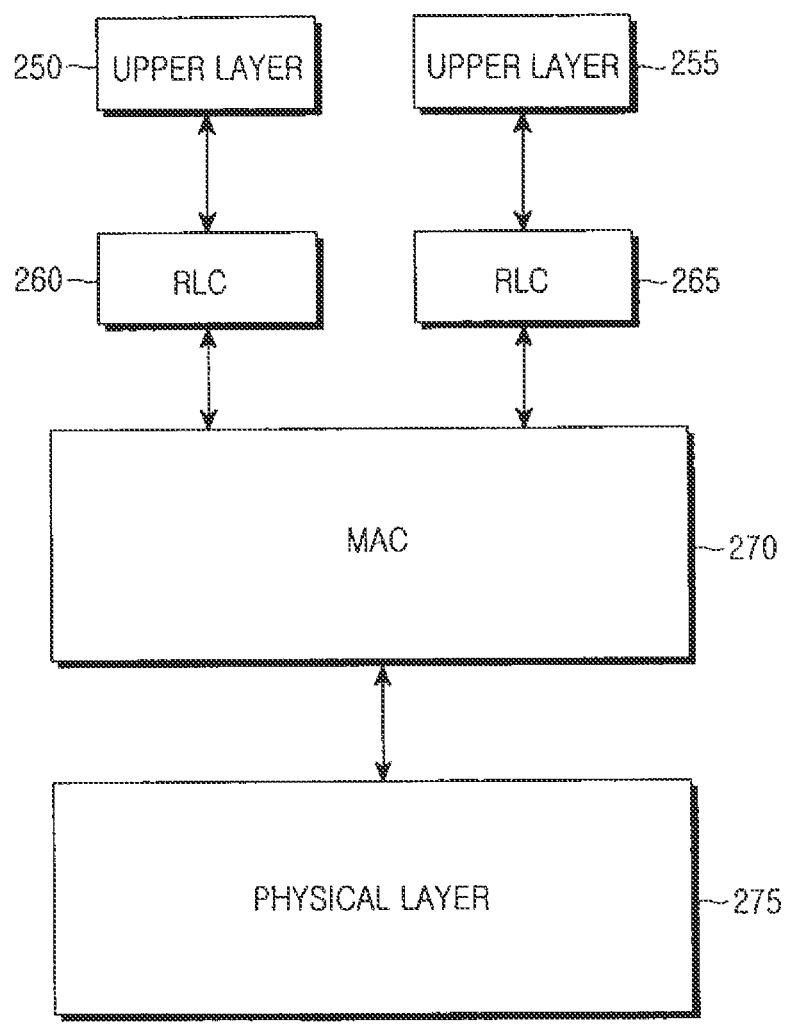
FIGS. 2A and 2B are diagrams illustrating a hierarchical structure for framing upper layer data, and a frame format thereof in a typical UMTS communication system, respectively.
Figure 2B:
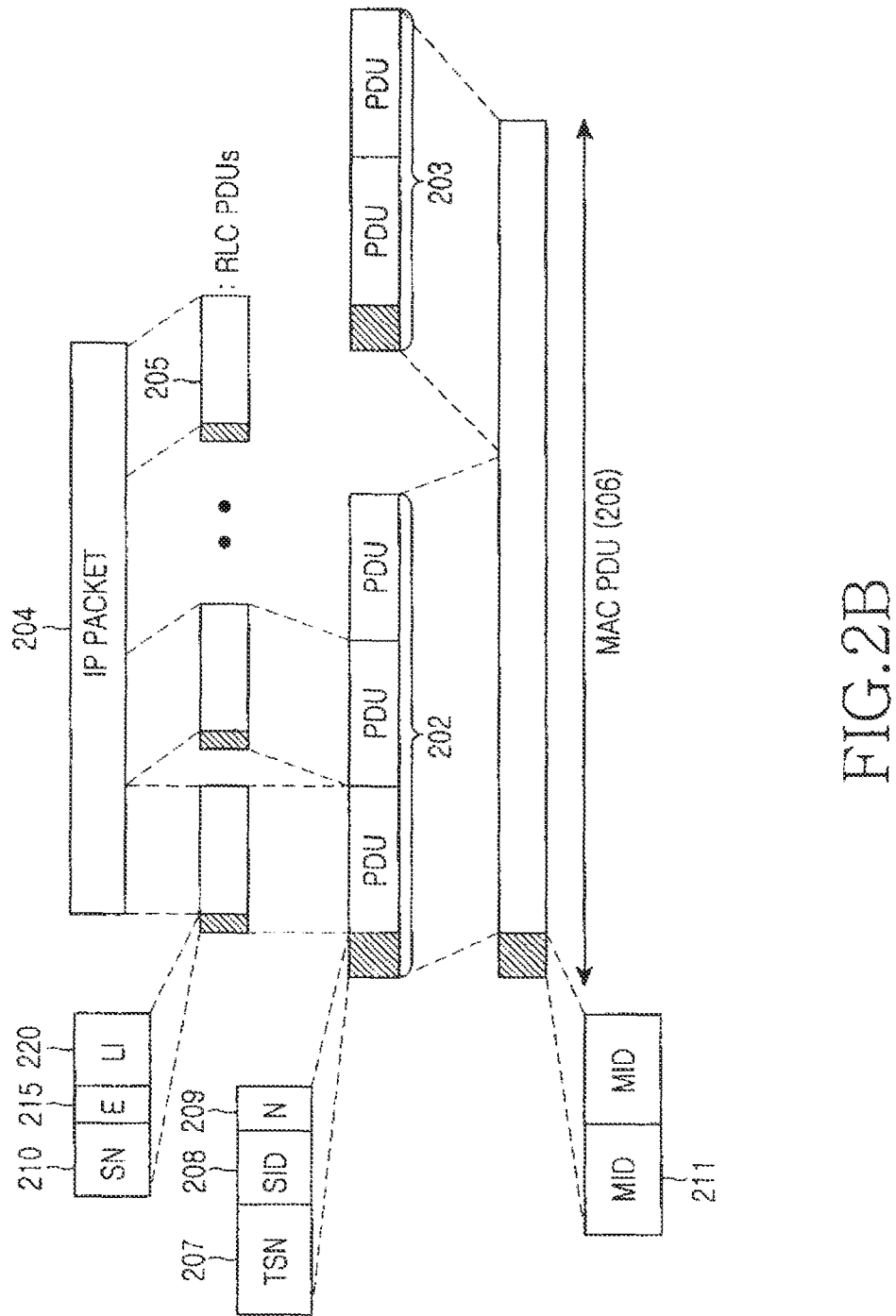
Figure 3:
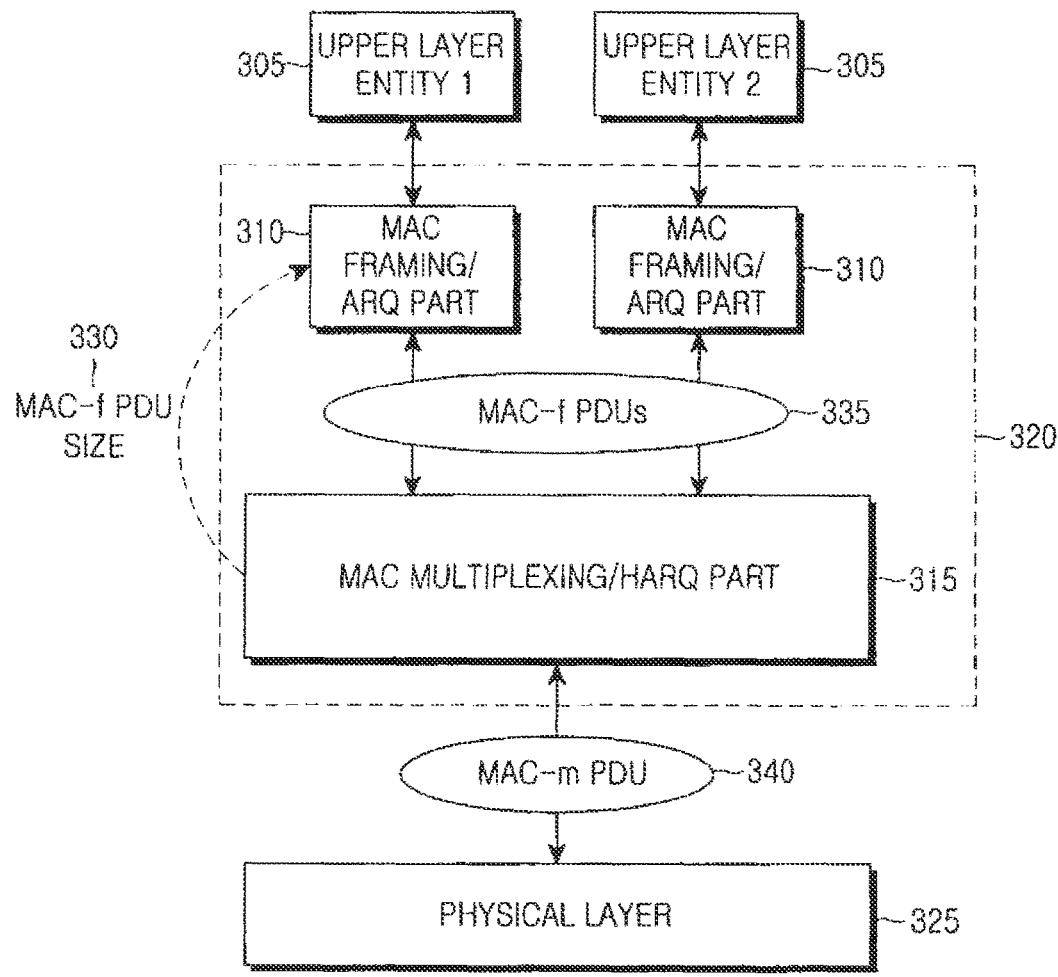
FIG. 3 is a diagram illustrating a hierarchical structure of a radio protocol according to an exemplary embodiment of the present invention.
Figure 4:
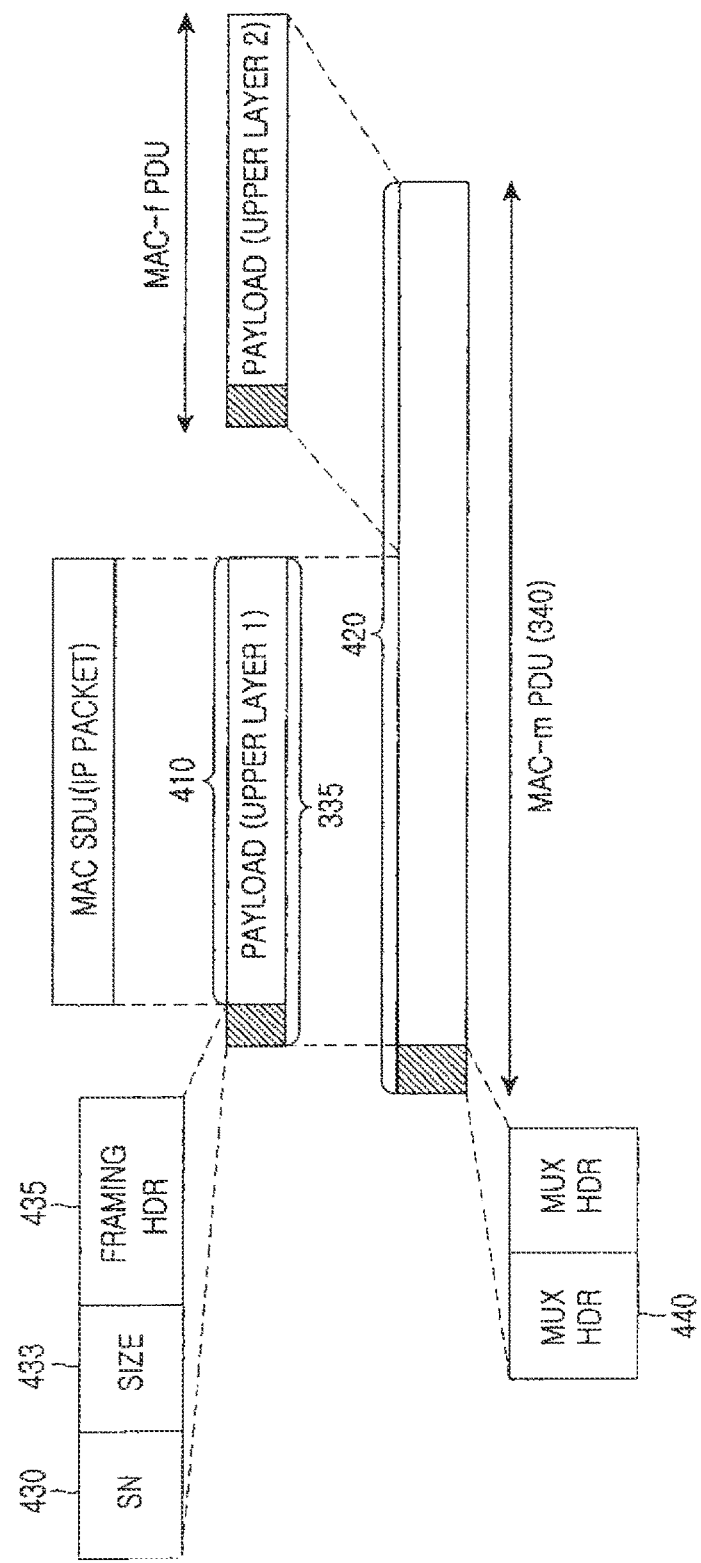
FIG. 4 is a diagram illustrating a frame format according to an exemplary embodiment of the present invention.

FIGS. 3 and 4 illustrate a hierarchical structure of a radio protocol and a frame format thereof according to an exemplary embodiment of the present invention.

As illustrated, a radio protocol is composed of a MAC layer 320 and a physical layer 325, and the MAC layer 320 is composed of two sub-layers of a MAC-framing (MAC-f) layer 310 and a MAC-multiplexing (MAC-m) layer 315. The MAC-f layer 310 manages the similar function to that of the RLC layer, and like the RLC layer, one MAC-f entity can be formed per service. The MAC-f layer 310 receives MAC Service Data Units (SDUs) from an upper layer 305, and frames MAC-f PDUs according to a size 330 requested by the MAC-m layer 315 using the MAC SDUs. In addition, the MAC-f layer 310 performs ARQ on the MAC-f PDUs 335.

The MAC-m layer 315 is connected to a plurality of MAC-f entities 310, and multiplexes MAC-f PDUs 335 from the MAC-f entities 310 to one MAC-m PDU 340. In addition, the MAC-m layer 315 performs a HARQ operation on the MAC-m PDU 340. The MAC-m layer 315 determines a size of the MAC-m PDU 340 according to a channel status of a UE, and determines the size 330 of the MAC-f PDUs taking into account buffer statuses and priorities of the MAC-f entities 310.

Referring to FIG. 4, each MAC-f PDU 335 is composed of a SN 430, a Size field 433, a Framing Header (FH) 435, and a payload 410. The MAC-f layer 310 receives the MAC-f PDU size 330 notified from the MAC-m layer 315, and segments or concatenates an IP packet(s) from the upper layer 305 according to the size 330, thereby generating the payload 410. Further, the MAC-f layer 310 generates a MAC-f PDU 335 by inserting therein the SN 430 that monotonously increases one by one, the Size field 433 indicating a size of the payload, and the Framing Header 435, and delivers the generated MAC-f PDU 335 to the MAC-m layer 315. The Framing Header 435 includes concatenated segmentation-related information.

The MAC-m PDU 340 is composed of at least one Multiplexing Header 440, and a payload 420. Each Multiplexing Header 440 includes therein multiplexing information on each MAC-f PDU 335 contained in the payload 420. For example, the multiplexing information can be an ID of a corresponding MAC-f entity.

Figure 5:
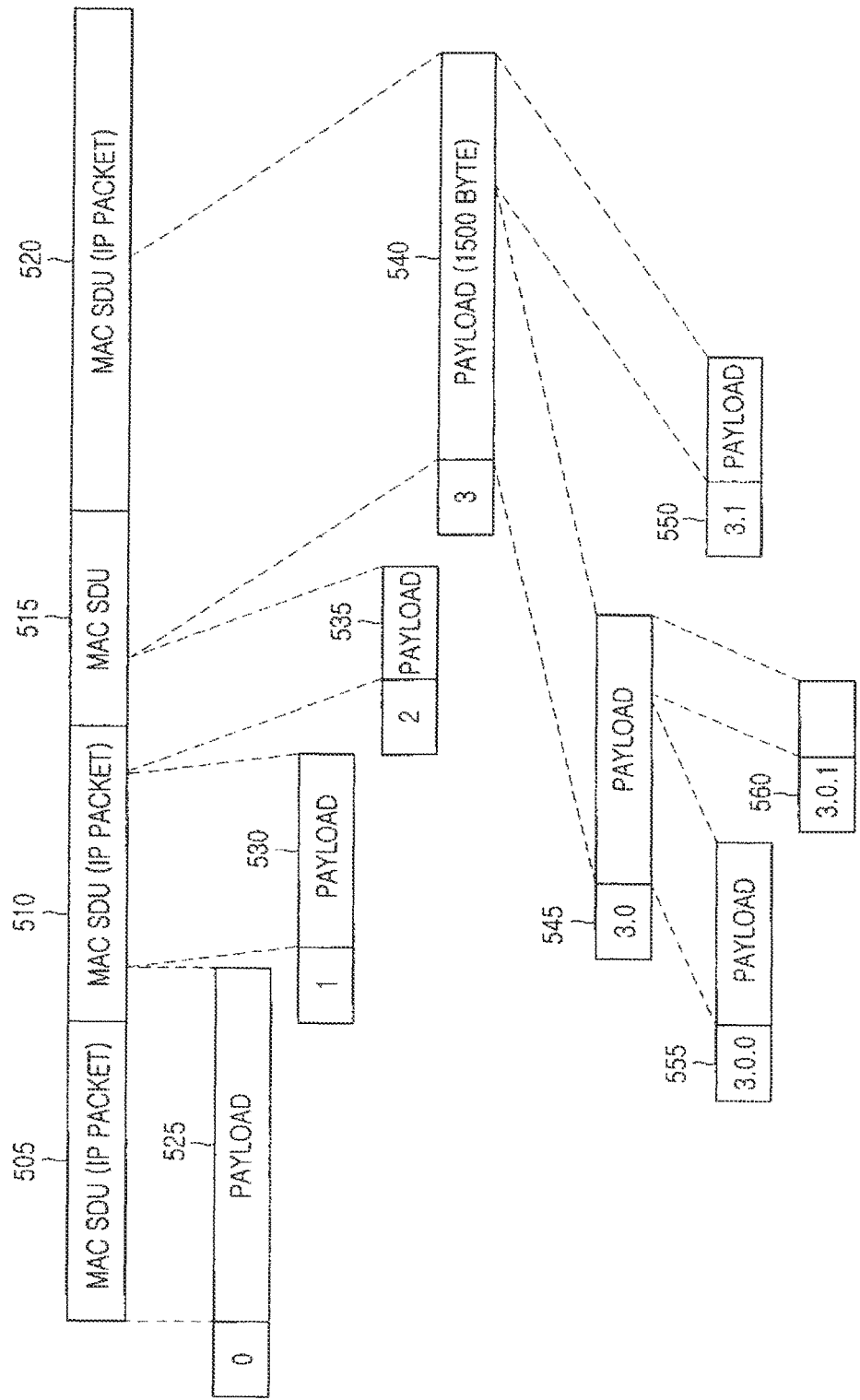
FIG. 5 is a diagram of segmented retransmission based on a frame size determined depending on the amount of scheduled transmission resources.

With reference to FIG. 5, a description will now be made of an exemplary ARQ operation performed when a size of the MAC-m PDU and a size of the MAC-f PDU are variably set according to a channel status. For convenience, it will be assumed herein that MAC-m multiplexing is not performed. In addition, the sub-SN field in the full header of each MAC-f PDU is shown herein.

Referring to FIG. 5, four IP packets 505, 510, 515 and 520 are buffered in a MAC-f layer. The MAC-f layer, under the control of a MAC-m layer, configures a MAC-f PDU 525 with an SN=0, and transmits the configured MAC-f PDU 525. A size of the MAC-f PDU 525 is set to 1000 bytes according to the channel status. Next, the MAC-f layer, under the control of the MAC-m layer, transmits a MAC-f PDU 530 with an SN=1 and an MAC-f PDU 535 with an SN=2. In addition, the MAC-f layer transmits a MAC-f PDU 540 with an SN=3. As the channel status becomes better, a payload size of the MAC-f PDU 540 is set to 1500 bytes.

A receiver's MAC-f layer has received MAC-f PDUs 525 to 535 with SN=0 to 2, but it has failed to receive a MAC-f PDU 540 with an SN=3. Therefore, the receiver's MAC-f layer sends a request for retransmission of the MAC-f PDU 540 with an SN=3 to a transmitter's MAC-f layer. However, if the channel status becomes poor at the time that the transmitter's MAC-f layer prepares for the retransmission upon receipt of the retransmission request, and thus an available size of the MAC-f PDU payload is reduced to 1000 bytes, then the transmitter's MAC-f layer cannot transmit the MAC-f PDU 540 having a 1500-byte size.

In this case, where the transmitter's MAC-f layer cannot retransmit the packet of the original size due to the change in the channel status at the retransmission time, the transmitter's MAC-f layer should re-segment the packet before transmission. At this juncture, the transmitter provides the receiver with the information indicating the fact that the packet is a packet retransmitted for a specific packet and the packet is segmented. Accordingly, each of the segmented-retransmitted packets uses the intact SN of its original packet, and additionally includes a sub-SN.

For example, as shown in FIG. 5, if the MAC-f PDU 540 is segmented into two MAC-f PDUs 545 and 550 before being retransmitted, a sub-SN=0 and a sub-SN=1 are inserted in the MAC-f PDUs 545 and 550, respectively, together with the original SN=3. That is, the total SN of the MAC-f PDU 545 is [3.0], and the total SN of the MAC-f PDU 550 is [3.1].

The segmented retransmission may be repeated several times if needed. For example, if the MAC-f PDU 545 should also be segmented-retransmitted, the segmented-retransmitted MAC-f PDUs 555 and 560 include a common/sub-SN= [3.0] and use other sub-SN=0 and sub-SN=1, thereby having the total SN=[3.0.0] and the total SN=[3.0.1], respectively.

For convenience, the terms used herein will be defined as follows:
Segment: MAC-f PDU segmented for retransmission
Segment level: the number of times that the original MAC-f PDU is segmented for segmented retransmission. For example, a segment level of the MAC-f PDUs 545 and 550 is 1, and a segment level of the MAC-f PDUs 555 and 560 is 2.

Figure 6A:
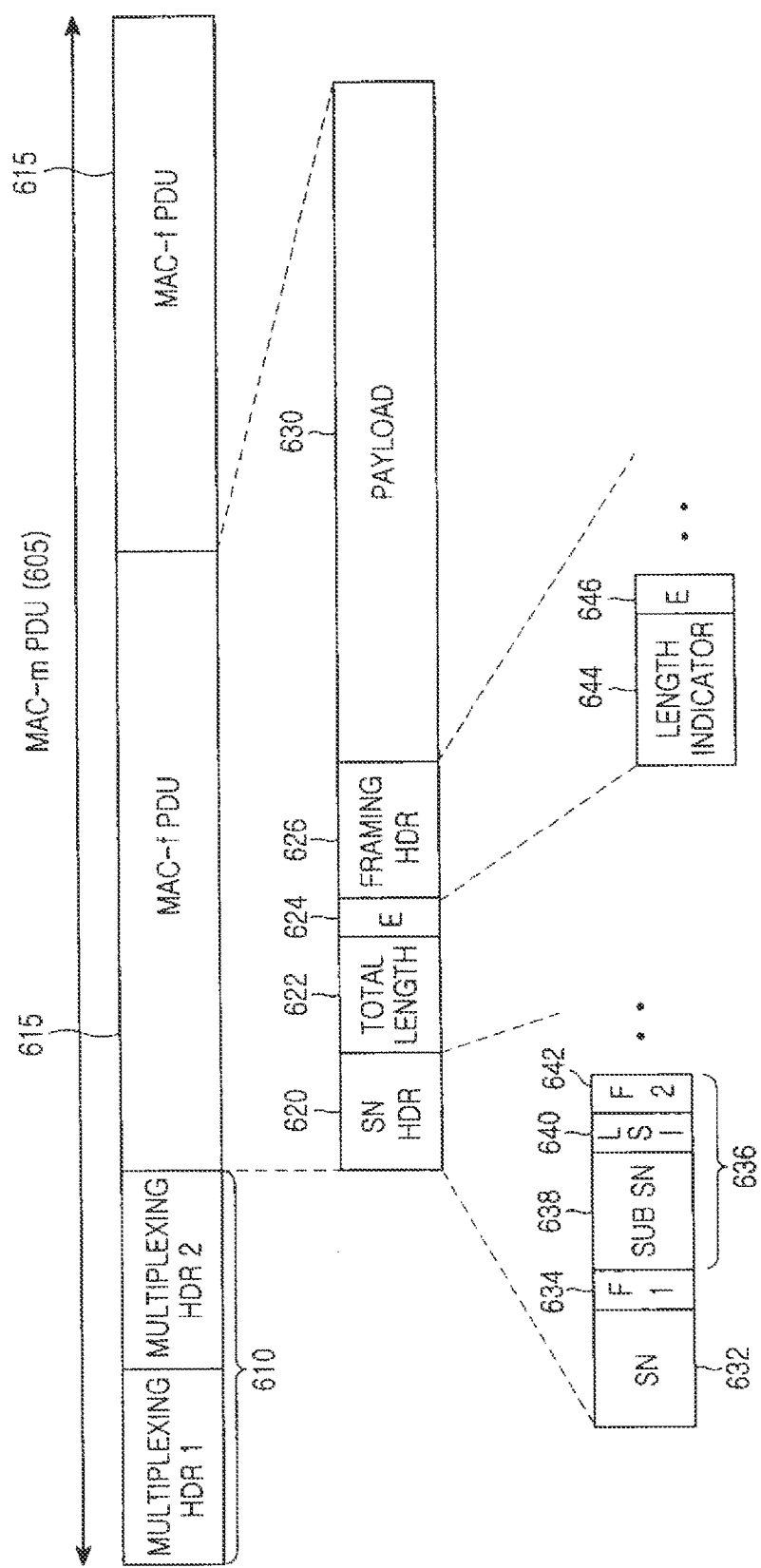
FIGS. 6A and 6B are diagrams illustrating a detailed frame format according to an exemplary embodiment of the present invention.
Figure 6B:
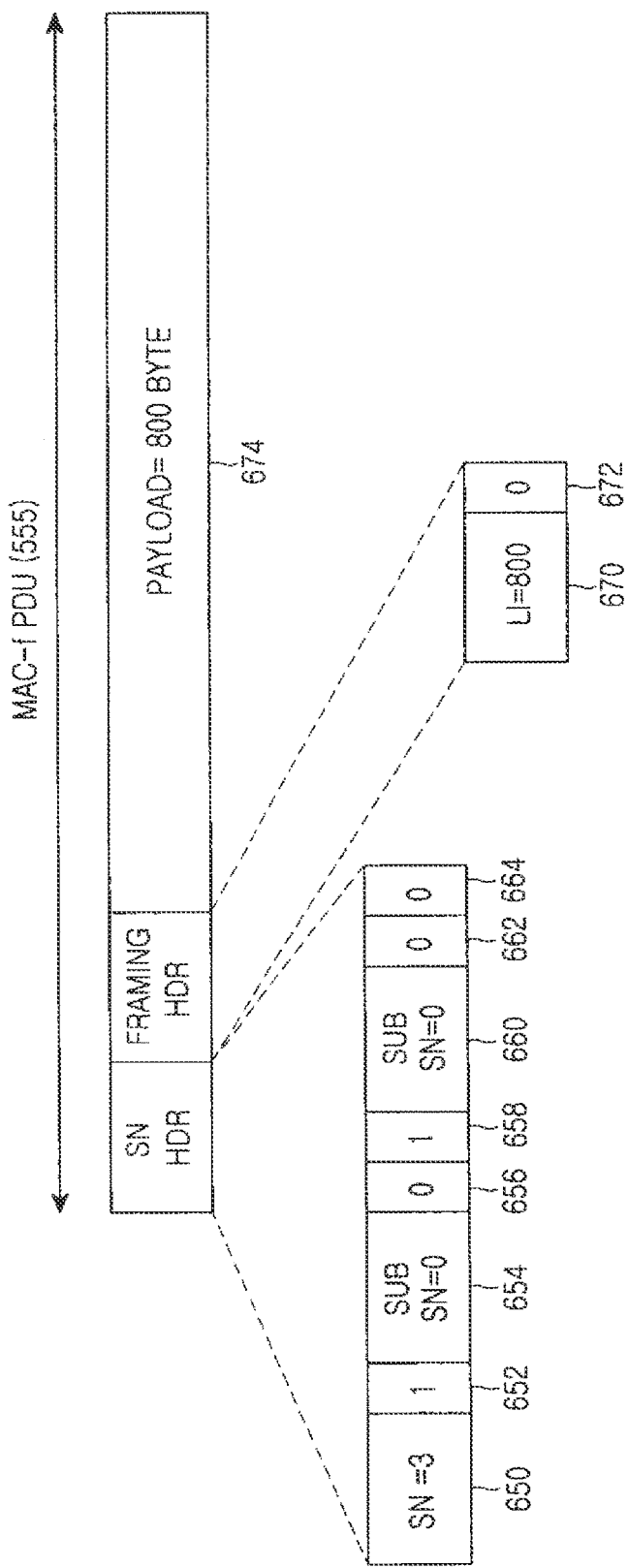

FIGS. 6A and 6B illustrate a detailed frame format according to an exemplary embodiment of the present invention.

Referring to FIG. 6A, a MAC-m PDU 605 is composed of a plurality of Multiplexing Headers 610 and MAC-f PDUs 615. The number of the Multiplexing Headers 610 is equal to the number of the MAC-f PDUs 615 contained in the MAC-m PDU 605. The sequence of the Multiplexing Headers 610 is also equal to the sequence of the MAC-f PDUs 615. That is, the first Multiplexing Header includes multiplexing information for the first MAC-f PDU, and the second Multiplexing Header includes multiplexing information for the second MAC-f PDU. Each of the Multiplexing Headers 610 is composed of a flag bit indicating whether the information following an ID of a MAC-f entity where the corresponding MAC-f PDU is to be processed is other multiplexing information or the first MAC-f PDU.

Each MAC-f PDU 615 is composed of an SN Header 620, a Total Length (TL) 622, an E bit 624, a Framing Header 626, and a payload 630. A packet(s) from an upper layer(s), that is, an IP packet(s), is segmented or concatenated and then contained in the payload 630.

The SN Header 620 is composed of an SN 632, an F1 bit 634, and a sub-SN Header 636. The sub-SN Header 636 is included in the segmented-retransmitted MAC-f PDU, and is composed of a sub-SN 638, a Last Segment Indicator (LSI) 640, and an F2 bit 642. The number of sub-SN Header(s) existing in one MAC-f PDU is equal to a segment level. For example, one sub-SN Header exists in an SN Header of a MAC-f PDU with a segment level=1, and two sub-SN Headers exist in an SN Header of a MAC-f PDU with a segment level=2.

The SN 632 is an integer that monotonously increases one by one every time the MAC-f PDU is first transmitted. The F1 bit 634 is 1-bit information indicating whether its following information is the sub-SN 638 or the TL 622. If the F1 bit 634 is '0', it indicates that the F1 bit 634 is followed by the TL field 622, and if the F1 bit 634 is '1', it indicates that the F1 bit 634 is followed by the sub-SN Header 636.

The LSI 640, a part of the sub-SN Header 636, is information indicating whether the corresponding segmented-retransmitted MAC-f PDU is the last segment or not. The sub-SN 638 is an integer that monotonously increases one by one every time the segmented MAC-f PDUs with the same segment level are retransmitted, beginning at the segment level 0. The F2 bit 642 is 1-bit information indicating whether its following information is the next sub-SN Header or the TL field 622. If the F2 bit 642 is '0', it indicates that the F2 bit 642 is followed by the TL field 622, and if the F2 bit 642 is '1', it indicates that the F2 bit 642 is followed by the next sub-SN field.

The TL 622 indicates a size of the payload 630 in bytes.

The E bit 624 indicates whether its following information is the Framing Header 626 including a Length Indicator (LI) 644, or the payload 630. For example, if the E bit 624 is '0', it means that it is followed by the payload 630, and if the E bit 624 is '1', it means that it is followed by the LI 644.

The Framing Header 626 contains therein information on the segmentation/concatenation of IP packets contained in the payload 630. The Framing Header 626 is composed of the LI 644 and the E bit 646. The LI 644 is information indicating a position of the last part when the last part of the IP packet is included in the payload 630. Therefore, when several IP packets are concatenated in the payload 630, several LIs are included in the Framing Header 626. The E bit 646 is inserted in the rear of each LI 644, and indicates whether there is any following LI, or it is followed by the payload 630.

A receiver's MAC-f layer can extract IP packets from the payload 630 by checking the Framing Header 626 of the MAC-f PDUs arranged according to the SN 632. Because the part indicated by the LI 644 is an end point of one IP packet and a start point of the next IP packet, the receiver's MAC-f layer extracts IP packets by arranging payloads in order of their SNs 632 and then segmenting it on the basis of the position indicated by the LI 644.

FIG. 6B illustrates a structure of the MAC-f PDU 555 shown in FIG. 5. The TL field and the E bit are omitted herein. In the foregoing description, it has been stated that the total SN of the MAC-f PDU 555 is [3.0.0], and the segment level of the MAC-f PDU 555 is 2. Therefore, the MAC-f PDU 555 includes two sub-SN fields 654 and 660: the first sub-SN field 654 is '0' and the second sub-SN field 660 is '0'. An F1 bit 652 following an SN 650 is '1' indicating the presence/absence of its following sub-SN field 654.

An LSI 656 following the first sub-SN field 654 is set to '0 (false)' indicating that the MAC-f PDU 555 is not the segmented-transmitted last segment, and an F2 bit 658 following the LSI 656 is set to '1 (true)' indicating the presence/absence of its following sub-SN field 660. An LSI 662 following the second sub-SN field 660 is set to '0' indicating that the MAC-f PDU 555 is not the segmented-transmitted last segment, and an F2 bit 664 following the LSI 662 is set to '0' indicating that it is followed by a TL field (not shown).

An LI 670 of the Framing Header is '800' indicating that a length of a payload 674 is 800 bytes, and an E field 672 is set to '0' indicating that it is followed by the payload 674.

The frame structures shown in FIGS. 6A and 6B are mere examples, and there are several possible modifications in addition to the presented structures. That is, it should be understood that the present invention is not to define the frame structure itself, but to frame an IP packet in various sizes according to communication status. In addition, the present invention provides a method and apparatus for appropriately matching a size of a retransmission packet when it is not possible to retransmit the original packet as it is because of deterioration of the radio channel during retransmission. To this end, the present invention introduces the concept of an SN and a sub-SN, fixes the SN to the value used for initial transmission, and inserts the SN and the sub-SN in a corresponding segmented-retransmitted packet so that a receiver can reassemble the segmented packets in the initially transmitted original packet.

Figure 7:
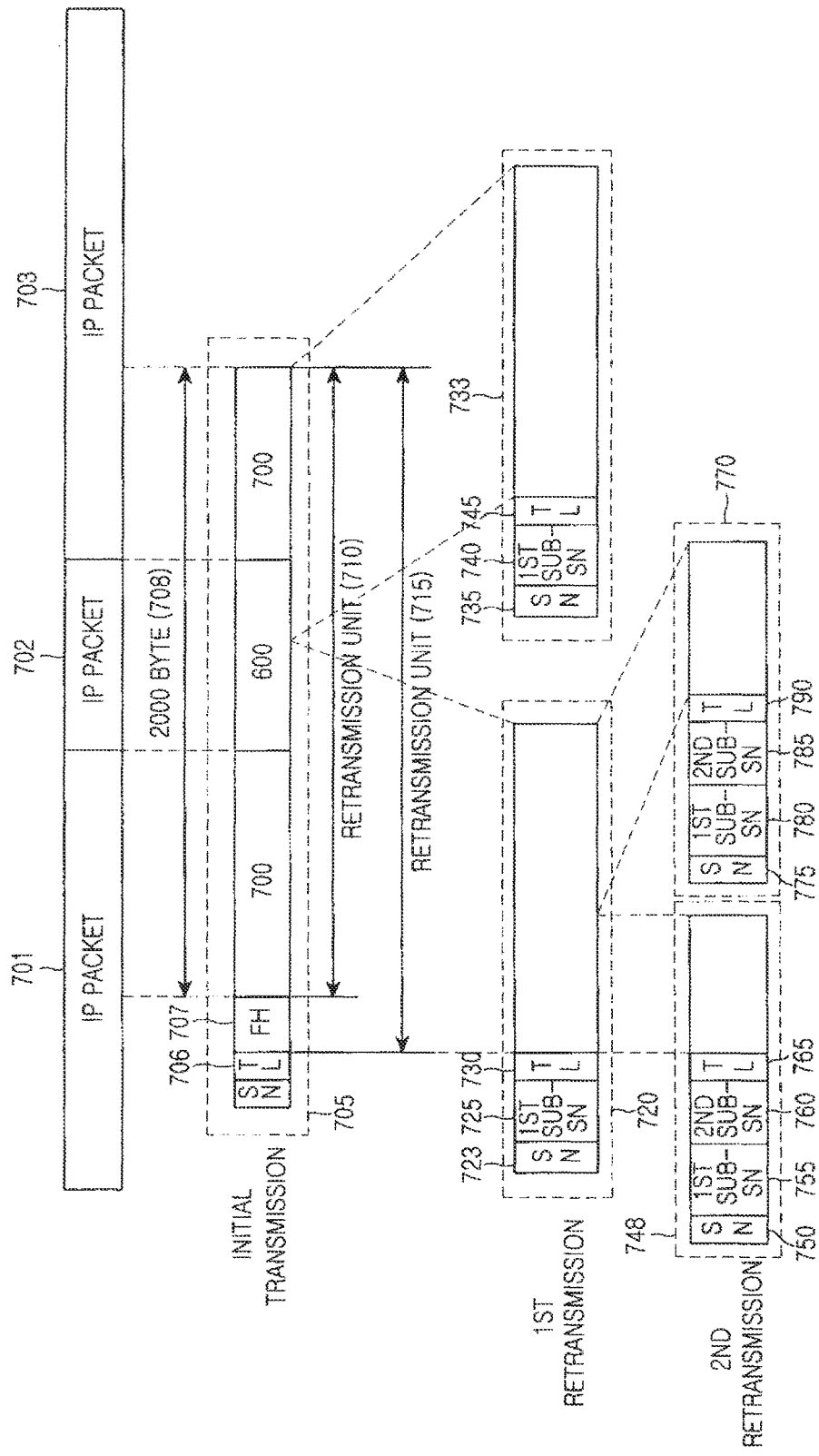
FIG. 7 is a diagram illustrating exemplary segmented retransmission according to an exemplary embodiment of the present invention.

FIG. 7 illustrates exemplary segmented retransmission according to an exemplary embodiment of the present invention.

Referring to FIG. 7, there are three IP packets 701, 702 and 703 having specific sizes, and the last part of the IP packet 701, the one complete IP packet 702, and the first part of the IP packet 703 are contained in a payload 708 of one MAC-f PDU 705. Here, a size of the part associated with the IP packet 701, contained in the payload 708, is 700 bytes, the total size of the IP packet 702 is 600 bytes, and a size of the part associated with the IP packet 703 is 700 bytes.

A size of the MAC-f PDU 705 slightly exceeds 2000 bytes, and the MAC-f PDU 705 is first transmitted at a first time. In this case, the transmitter sets an SN of the MAC-f PDU 705 to 'x', and sets a TL to 2000. Assume thereafter that there is a retransmission request and a size of the MAC-f PDU transmittable at a second time where retransmission is to be performed is, for example, 1200 bytes. Then the transmitter segments the MAC-f PDU 705 before retransmission because it cannot transmit the MAC-f PDU 705 as it is.

The segmented retransmission is an operation of segmenting the original packet before retransmission. In this operation, a part of the segmented packet is newly made, and a part of the original packet is segmented. Here, when the segmented part of the original packet is called a 'retransmission unit', there are two approaches for indicating which part of the original packet it will regard as a retransmission unit.

A first approach is to regard the payload 708 of the MAC-f PDU 705 as a retransmission unit 710, and a second approach is to regard the sum of a Framing Header 707 and the payload 708 as a retransmission unit 715. When the second approach is taken, the transmitter has no need to newly configure a Framing Header every time it performs segmented retransmission, but the receiver cannot extract the original IP packet until it reconfigures the original packet by receiving all the segmented-retransmitted packets. However, when the first approach is taken, the transmitter should newly configure a Framing Header every time it performs segmented retransmission, but the receiver can extract the original IP packet using the Framing Header of the segmented-retransmitted packet.

A description will now be made of an operation performed when the retransmission unit 715 including the payload 708 and the Framing Header 707 is used.

During first retransmission, the MAC-f PDU 705 is segmented into a MAC-f PDU 720 and a MAC-f PDU 733, and then retransmitted, and during second retransmission, the MAC-f PDU 720 is segmented into a MAC-f PDU 748 and a MAC-f PDU 770, and then retransmitted. Therefore, a segment level of the MAC-f PDU 720 and the MAC-f PDU 733 is 1, and a segment level of the MAC-f PDU 748 and the MAC-f PDU 770 is 2. A description will now be made as to how the values of Header fields of the segmented-retransmitted MAC-f PDUs 720, 735, 748 and 770 are determined.

As described above, each of the segmented-retransmitted MAC-f PDUs includes one SN or at least one sub-SN Header, a TL field, a Framing Header, and a payload.

The same value as the SN of the first transmitted MAC-f PDU is inserted in SN fields 723, 735, 750 and 775. Therefore, 'x' is inserted in the SN fields 723, 735, 750 and 775 of the MAC-f PDU 720, MAC-f PDU 733, MAC-f PDU 748 and MAC-f PDU 770.

The number of sub-SN Headers 725, 740, 755, 760, 780 and 785 is determined according to a segment level. For example, the sub-SN Headers 725 and 740 are included in the MAC-f PDU 720 and the MAC-f PDU 733 both with a segment level=1, respectively, on a one-by-one basis.

Sequence information of the segmented-retransmitted MAC-f PDU is inserted in a sub-SN field (not shown) included in each sub-SN Header, and the sequence information is an integer that monotonously increases one by one beginning at 0. For example, the MAC-f PDU 720, as it is a first MAC-f PDU in the corresponding segment level, has a sub-SN=0, and the MAC-f PDU 733, as it is a second MAC-f PDU in the corresponding segment level, has a sub-SN=1.

An LSI (not shown) included in each sub-SN Header is a field indicating whether the MAC-f PDU is the last MAC-f PDU in the corresponding segment level. Assuming that an LSI='0 (false)' indicates a non-last MAC-f PDU and an LSI='1 (true)' indicates a last MAC-f PDU, the MAC-f PDU 720, as it is not the last MAC-f PDU in the corresponding segment level, has an LSI=0, and the MAC-f PDU 733, as it is the last MAC-f PDU in the corresponding segment level, has an LSI=1.

MAC-f PDUs 748 and 770 with a segment level=2 each have two sub-SN Headers 755-760 and 780-785, respectively. Here, the sub-SNs the LSIs of the last sub-SN Headers 760 and 785 are meaningful (or significant) in the corresponding segment level, and the same value as the values used in the previous segment level are inserted in the sub-SNs and LSIs of the remaining sub-SN Headers 755 and 780. For example, as to the MAC-f PDU 748, the sub-SN and LSI of the first sub-SN Header 755 of the MAC-f PDU 748 is equal to the sub-SN and LSI of the sub-SN Header 725 of the parent MAC-f PDU 720. In addition, the sub-SN and LSI of the second sub-SN Header 760 of the MAC-f PDU 748 is determined according to the foregoing approaches.

In this specification, the terms "parent MAC-f PDU" and "child MAC-f PDU" represent a relationship between segmented-retransmitted MAC-f PDUs, and when one MAC-f PDU is segmented into several MAC-f PDUs before being retransmitted, the original MAC-f PDU is called a parent MAC-f PDU and the segmented MAC-f PDUs are called child MAC-f PDUs.

Because TL fields 706, 730, 745, 765 and 790, as stated above, are information indicating a size of the corresponding payload in bytes, a new value is inserted in each of the segmented-retransmitted MAC-f PDUs. For example, a value '2000' is inserted in a TL field 706 of the MAC-f PDU 705, and a new value '1200' is inserted in the TL field 730 of the MAC-f PDU 720, which is a child MAC-f PDU of the MAC-f PDU 705.

An LI is inserted in the Framing Header 707, as described above. The LI has a value inserted therein, indicating whether the last byte of the IP packet is included in the MAC-f PDU 705, and indicating its position if it is included. Herein, because there is shown the case where the retransmission unit 715 including the Framing Header 707 and the payload 708 is used as stated above, the Framing Header 707 is used in the non-segmented MAC-f PDU 705, and each of the segmented MAC-f PDUs 720, 733, 748 and 770 includes no Framing Header. On the contrary, if the retransmission unit 710 including the payload 708 is used, two LIs for the IP packet 701 and the IP packet 702 are included, for example, in the Framing Header 707 of the MAC-f PDU 705, but the LI indicating an end of the IP packet 701 is inserted in a Framing Header (not shown) of the child MAC-f PDU 720 of the MAC-f PDU 707.

As described above, there are a Header field where a value of the parent MAC-f PDU is used as it is during segmented retransmission, and a Header field where it is newly inserted in the child MAC-f PDU. In an exemplary implementation, for convenience, the Header field where the value used in the parent MAC-f PDU is used as it is will be referred to as a 'copied header', and the Header field where a field value is newly inserted will be referred to as a 'newly inserted header'. The copied header includes an SN field, and sub-SN fields and LSIs of the remaining sub-SN Headers except for the meaningful (significant) sub-SN Header, and the newly inserted header includes the meaningful sub-SN Header, a TL field, and a Framing Header field. The meaningful sub-SN Header is a sub-SN Header containing meaningful information in the corresponding segment level, and in the segment level n, an nth sub-SN Header is a meaningful sub-SN Header.

Figure 8:
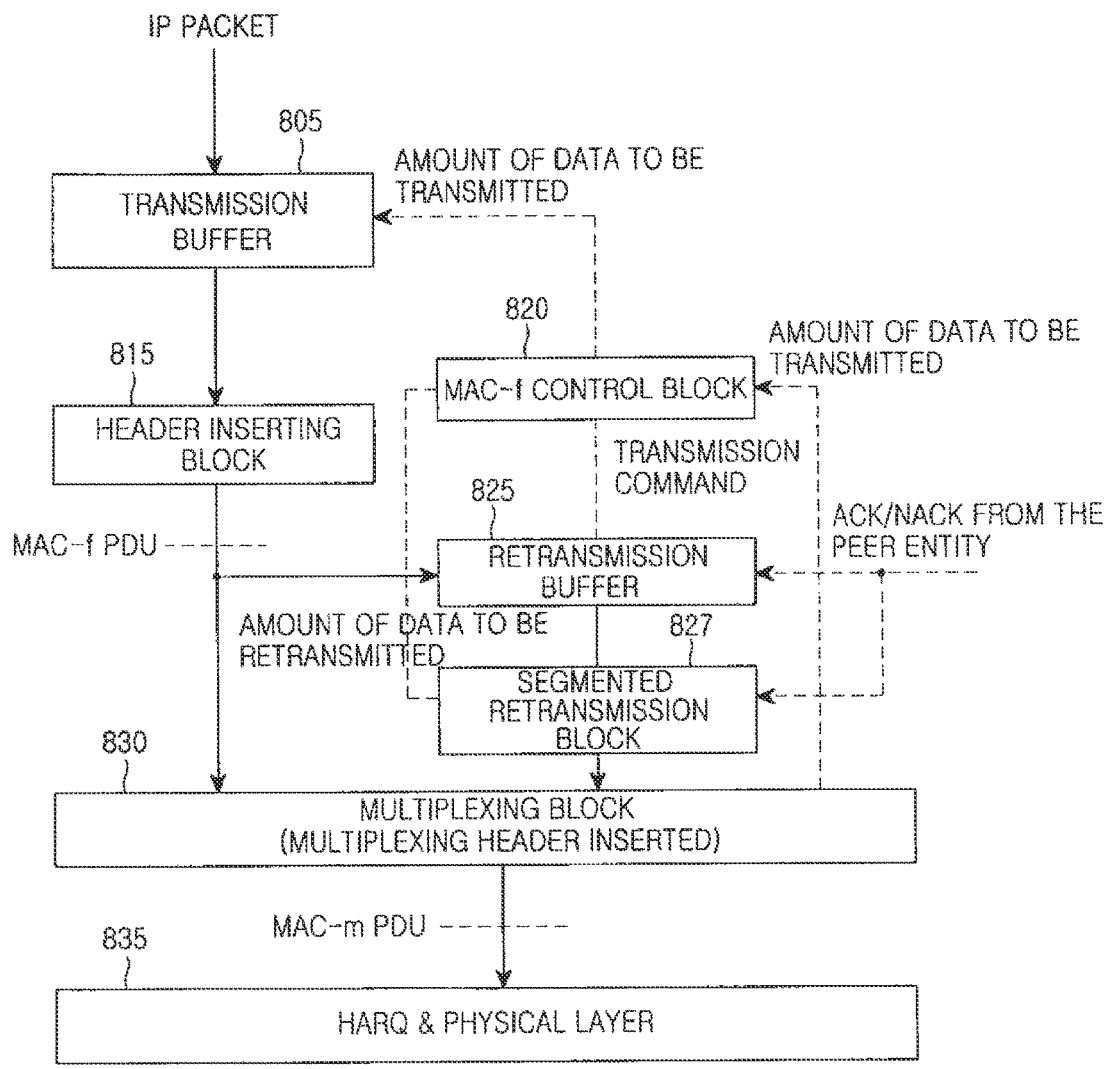
FIG. 8 is a block diagram illustrating a structure of a transmitter according to an exemplary embodiment of the present invention.

FIG. 8 is a block diagram illustrating a structure of a transmitter according to an exemplary embodiment of the present invention.

Referring to FIG. 8, a transmitter includes a transmission buffer 805, a header inserting block 815, a MAC-f control block 820, a retransmission buffer 825, a segmented retransmission block 827, a multiplexing block 830, and a HARQ block & physical layer 835. Of these entities, the transmission buffer 805, the header inserting block 815, the MAC-f control block 820, the retransmission buffer 825, and the segmented retransmission block 827 constitute a MAC-f entity. Although one MAC-f entity is shown herein, a plurality of MAC-f entities for a plurality of services can also be provided.

The transmission buffer 805 stores IP packets delivered from an upper layer until they are transmitted through a physical layer. The transmission buffer 805 outputs the stored IP packets to the header inserting block 815 according to the amount of data required by the MAC-f control block 820.

The multiplexing block 830 determines the amount of data that it will transmit in the next TTI for each individual MAC-f entity according to the radio transmission resources allocated by a Node B's scheduler, and notifies the determined information to the MAC-f control block 820. The MAC-f control block 820 determines the data that it will transmit in the next TTI according to priorities of initial transmission and retransmission. If the MAC-f control block 820 determines to transmit a new IP packet in the next TTI, it notifies the amount of transmission data to the transmission buffer 805. On the contrary, however, if the MAC-f control block 820 determines to perform retransmission in the next TTI, it sends a retransmission command to the retransmission buffer 825, and notifies the amount of retransmission data to the segmented retransmission block 827.

The transmission buffer 805 delivers an IP packet(s) corresponding to the notified amount to the header inserting block 815. Here, if the amount of transmission data is not matched to a size of one IP packet, the transmission buffer 805 can either segment one IP packet to deliver a part of the IP Packet, or deliver a plurality of IP packets.

The header inserting block 815 inserts an SN Header, a TL, an E bit and a Framing Header in the IP packet(s) delivered by the transmission buffer 805, thereby configuring a MAC-f PDU.

The MAC-f PDU is delivered to the retransmission buffer 825 and the multiplexing block 830. The retransmission buffer 825 stores the MAC-f PDU, and discards the stored MAC-f PDU or schedules retransmission according to the feedback signal received from the other party's entity. Specifically, upon receipt of an Acknowledge (ACK) signal from the other party's ARQ entity, the retransmission buffer 825 discards therefrom the MAC-f PDU corresponding to the ACK signal. On the contrary, upon receipt of a Negative Acknowledge (NACK) signal from the other party's ARQ entity, the retransmission buffer 825 prepares for retransmission on the MAC-f PDU corresponding to the NACK signal. That is, the retransmission buffer 825, upon receipt of a retransmission command from the MAC-f control block 820, delivers a MAC-f PDU corresponding to the NACK signal to the segmented retransmission block 827. The ACK signal and/or the NACK signal can be contained in a status report that is transmitted at a specific occurrence time determined based on a predetermined period, or transmitted according to another triggering condition.

The segmented retransmission block 827 performs segmented retransmission on the MAC-f PDU from the retransmission buffer 825. When there is no need for segmented retransmission, the MAC-f PDU delivered by the retransmission buffer 825 is delivered to the multiplexing block 830 without modification. However, when there is a need for segmented retransmission, the segmented retransmission block 827 segments a retransmission unit of a parent MAC-f PDU from the retransmission buffer 825 in a necessary size, attaches an SN Header and a TL field to each of the segments, and attaches a Framing Header if needed, thereby generating child MAC-f PDUs. For example, the segmented retransmission block 827 adds a sub-SN Header to the SN Header of the parent MAC-f PDU, re-matches the total length to a payload size of the corresponding child MAC-f PDU, and sets the Framing Header according to whether there is the last byte of an IP packet in the corresponding child MAC-f PDU, thereby generating each MAC-f PDU.

The segmented retransmission block 827 also serves as a retransmission buffer for the child MAC-f PDUs. That is, the segmented retransmission block 827 stores the child MAC-f PDUs until it receives ACK signals for the child MAC-f PDUs, and upon receipt of the ACK signals, the segmented retransmission block 827 discards the child MAC-f PDUs.

The multiplexing block 830 multiplexes MAC-f PDUs provided from a plurality of MAC-f entities, to one MAC-m PDU, and inserts Multiplexing Headers in the MAC-m PDU. The MAC-m PDU undergoes an HARQ operation by the HARQ block & physical layer 835, and the HARQ-processed MAC-m PDU is transmitted over a radio channel.

Figure 9:
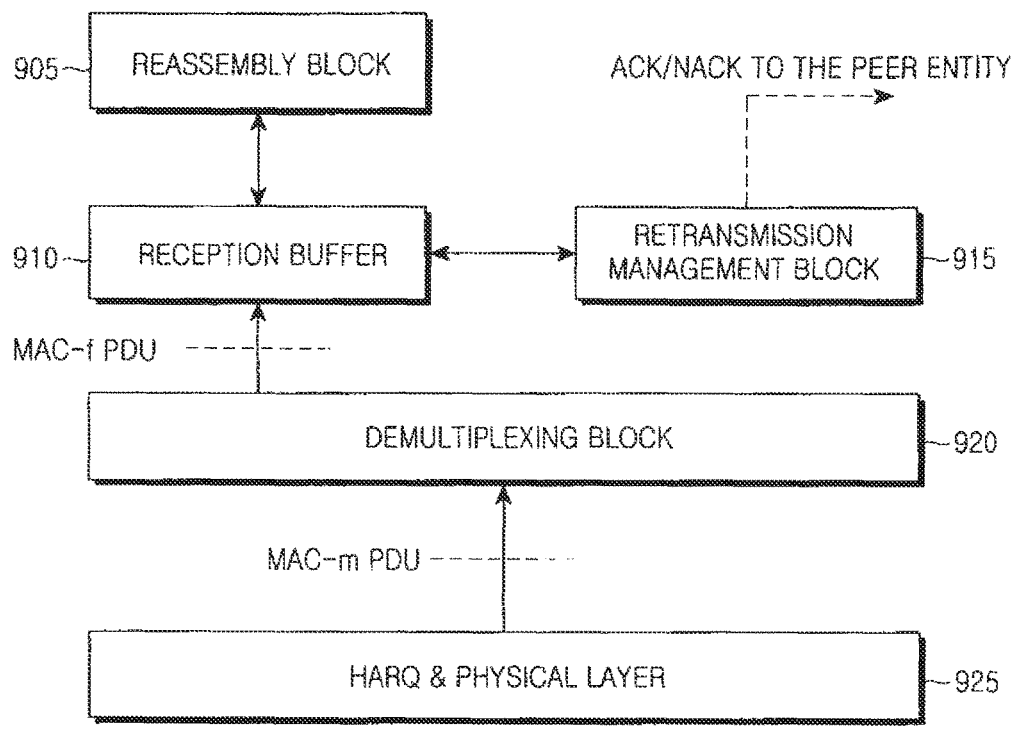
FIG. 9 is a block diagram illustrating a structure of a receiver according to an exemplary embodiment of the present invention.

FIG. 9 is a block diagram illustrating a structure of a receiver according to an exemplary embodiment of the present invention.

Referring to FIG. 9, a receiver includes a reassembly block 905, a reception buffer 910, a retransmission management block 915, a demultiplexing block 920, and an HARQ block & physical layer 925. Of these entities, the reassembly block 905, the reception buffer 910, and the retransmission management block 915 constitute a MAC-f entity. Although only one MAC-f entity is shown herein, a plurality of MAC-f entities for a plurality of services can also be provided.

The HARQ block & physical layer 925 performs an HARQ process on a MAC-m PDU through a physical channel, and delivers the MAC-m PDU successfully received through the HARQ process, to the demultiplexing block 920. The demultiplexing block 920 analyzes Multiplexing Headers of the MAC-m PDU delivered from the HARQ block & physical layer 925, demultiplexes the MAC-m PDU into a plurality of MAC-f PDUs, and then delivers the demultiplexed MAC-f PDUs to the MAC-f entities indicated by Multiplexing Headers corresponding to the demultiplexed MAC-f PDUs.

The reception buffer 910 stores the MAC-f PDUs received from the demultiplexing block 920 in the positions corresponding to their SNs, and delivers reassemblable MAC-f PDUs among the stored MAC-f PDUs to the reassembly block 905. Herein, the "reassemblable MAC-f PDUs" refer to MAC-f PDUs that are arranged in order of their SNs without gap.

The retransmission management block 915 performs an operation of checking SNs and sub-SNs of the MAC-f PDUs stored in the reception buffer 910, and transmitting ACK/NACK signals to the other party's ARQ entity by the physical layer. Here, the NACK signal is transmitted by the retransmission management block 915 to request retransmission of a particular failed MAC-f PDU, or when it cannot determine for which MAC-f PDU it should send a retransmission request. A detailed description of the NACK signal for each case will be made later. The ACK signal can be transmitted when there is no gap. The reassembly block 905 performs an operation of reconfiguring the segmented MAC-f PDUs among the MAC-f PDUs into the original IP packet depending on the Framing Headers of the MAC-f PDUs delivered from the reception buffer 910, and then delivering the IP packet to the upper layer.

Figure 10:
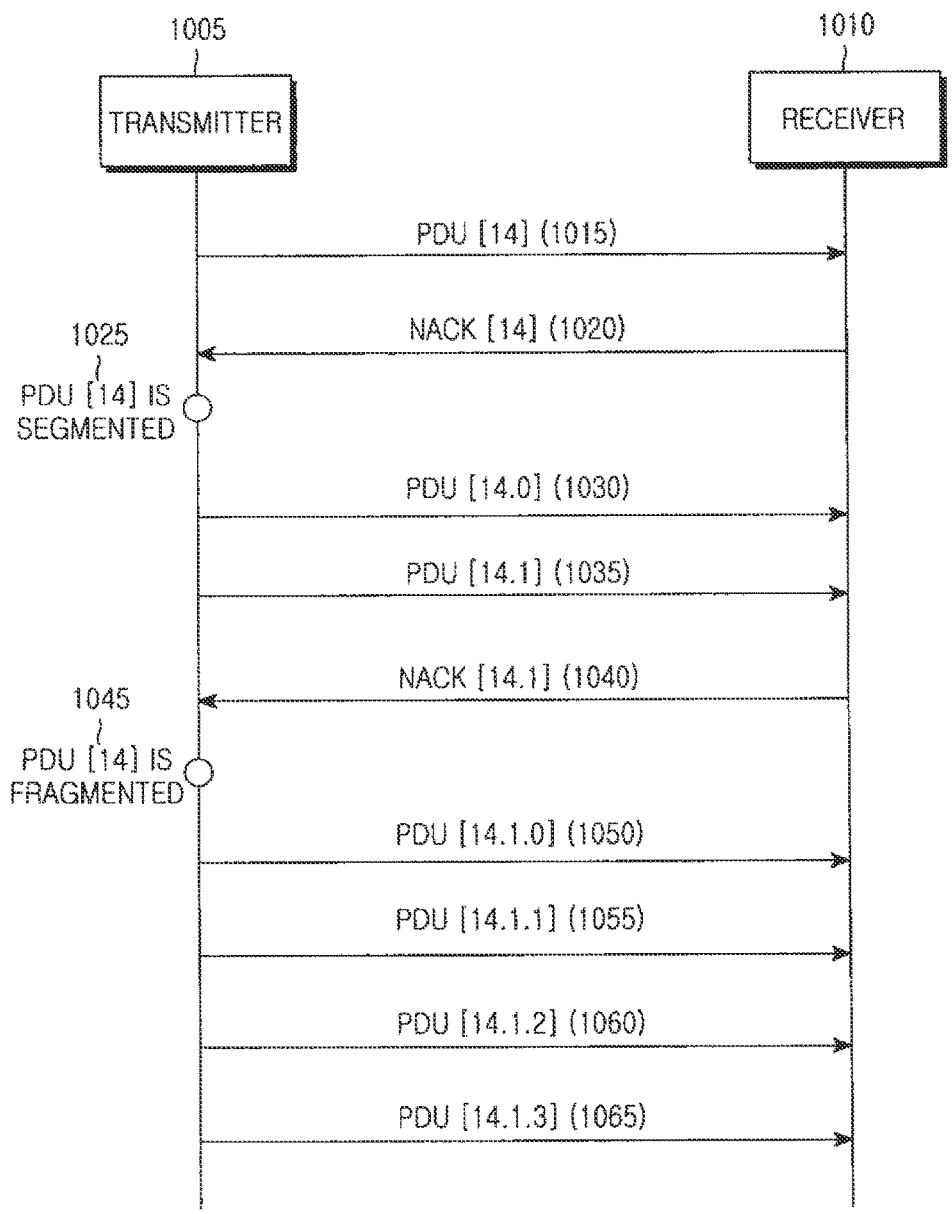
FIG. 10 is a signaling diagram of a segmented retransmission operation according to an exemplary embodiment of the present invention.

FIG. 10 is a signaling diagram of a segmented retransmission operation according to an exemplary embodiment of the present invention.

Referring to FIG. 10, in step 1015, a transmitter 1005 transmits a MAC-f PDU with an SN=14 (hereinafter referred to as "PDU[14]") to a receiver 1010. In step 1020, the receiver 1010 transmits a NACK signal indicating a failure to receive the PDU[14] (hereinafter referred to as a "NACK[14]") to the transmitter 1005.

If the transmitter 1005 intends to retransmit the PDU[14] in response to the NACK[14] but the allowed amount of radio transmission resources is insufficient to transmit the original size of the PDU[14], the transmitter 1005 segments the PDU[14] in step 1025. Herein, the PDU[14] is segmented into a PDU[14.0] and a PDU[14.1]. Here, a LSI of a first sub-SN Header of the PDU[14.1] is set to '1', indicating that the PDU[14.1] is the last segment associated with the PDU[14]. In step 1030, the transmitter 1005 transmits the PDU[14.0] to the receiver 1010. In step 1035, the transmitter 1005 transmits the PDU[14.1] to the receiver 1010.

Thereafter, in step 1040, the receiver 1010 transmits a NACK signal for the PDU[14.1] (hereinafter referred to as a "NACK[14.1]") to the transmitter 1005. If the transmitter 1005 intends to retransmit the PDU[14.1] in response to the NACK[14.1] but the allowed amount of radio transmission resources is insufficient to transmit the PDU[14.1], the transmitter 1005 re-segments the PDU[14.1] in step 1045. Herein, the PDU[14.1] is segmented into PDU[14.1.0], PDU[14.1.1], PDU[14.1.2], and PDU[14.1.3]. First sub-SN Headers of the PDU[14.1.0], PDU[14.1.1], PDU[14.1.2], and PDU[14.1.3] are equal to the first sub-SN Header of the PDU[14.1], and new sub-SNs and LSIs are set in second sub-SN Headers. Here, the LSI of the second sub-SN Header of the PDU[14.1.3] is set to '1', indicating that the PDU[14.1.3] is the last segment associated with the PDU[14.1]. In steps 1050, 1055, 1060 and 1065, the transmitter 1005 sequentially transmits the PDU[14.1.0], PDU[14.1.1], PDU[14.1.2], and PDU[14.1.3] to the receiver 1010.

As shown above, an exemplary embodiment of the present invention can selectively make retransmission request and perform retransmission for the segmented-retransmitted MAC-f PDUs. For example, in the case where the PDU[14] is segmented into the PDU[14.0] and the PDU[14.1] and then transmitted, if the receiver 1010 has received the PDU[14.0] but has failed to receive the PDU[14.1], it transmits a NACK signal for the PDU[14.1]. Likewise, if the receiver 1010 has failed to receive the PDU[14.1.2], the receiver 1010 transmits a NACK signal for the PDU[14.1.2].

The following problems may occur when there is a retransmission request for the segmented retransmission. If a receiver fails to receive the last segment, the receiver cannot recognize the reception failure, and thus cannot transmit a NACK signal for the last segment. This is because the SN-based ARQ system cannot detect reception failure of a previous PDU unless the next PDU with the same segment level is received. For example, the receiver 1010 cannot recognize non-reception of PDU[14] until it arrives at a reception time of PDU[15].

However, in the segmented retransmission, even though the receiver receives the next PDU, it may occasionally fail to correctly recognize the reception-failed PDU. For example, if the receiver 1010 receives PDU[14.1.0] and PDU[15], the receiver 1010 recognizes presence of non-received segments because an LSI of the PDU[14.1.0] is 0, but it cannot determine how many segments it should further receive. Therefore, the receiver 1010 cannot also recognize the necessity of requesting retransmission for PDU[14.1.1], PDU[14.1.2], and PDU[14.1.3].

Figure 11A:
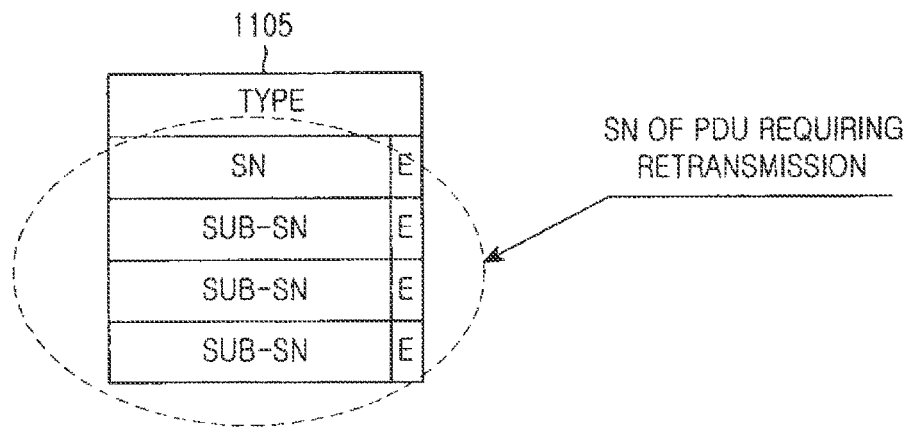
FIGS. 11A and 11B are diagrams illustrating a format of NACK signals according to an exemplary embodiment of the present invention.
Figure 11B:
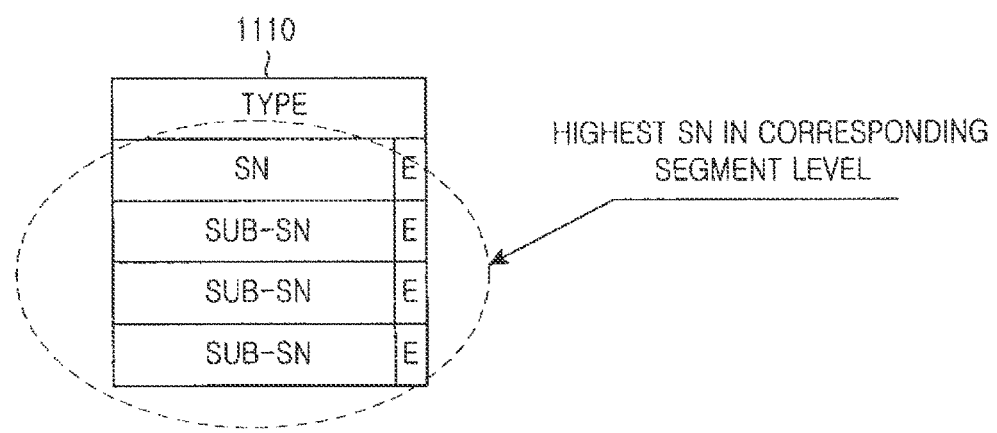

In order to solve this problem, an exemplary embodiment of the present invention defines a format of the NACK signal. FIG. 11A illustrates a format of an explicit NACK signal according to an exemplary embodiment of the present invention, and FIG. 11B illustrates a format of an implicit NACK signal according to an exemplary embodiment of the present invention. As illustrated, the explicit NACK signal and the implicit NACK signal are distinguished by their corresponding type values.

The explicit NACK signal 1105 shown in FIG. 11A is used when the reception-failed PDU is explicitly known, and it is composed of a Type field, an SN field, and sub-SN fields. A unique type value indicating the explicit NACK signal 1105 is inserted in the Type field. An SN and sub-SNs of a PDU for the explicit NACK signal 1105 are inserted in the SN field and the sub-SN fields. Here, when there is an intension to request retransmission of a non-segmented MAC-f PDU with the explicit NACK signal 1105, the sub-SN fields are not included. When the next bit is another sub-SN field, '1' is inserted in each of E fields following the SN field and the sub-SN fields, and otherwise, '0' is inserted therein.

For example, '14' is inserted in an SN field of an explicit NACK signal for requesting retransmission of PDU[14], '0' is inserted in an E field, and the sub-SN fields are not used. '14' is inserted in an SN field of an explicit NACK signal for requesting retransmission of PDU[14.1], '1' is inserted in a first E field, '1' is inserted in a sub-SN field, and '0' is inserted in a second E field. Upon receipt of the explicit NACK signal 1105, a transmitter retransmits PDU having an SN included in the explicit NACK signal.

The implicit NACK signal 1110 shown in FIG. 11B is used when a receiver cannot determine for which PDU it should make a retransmission request. Likewise, the implicit NACK signal 1110 is composed of a Type field, an SN field, and sub-SN fields. Each of the SN field and the sub-SN fields is followed by an E field. If a receiver fails to receive a segment with an LSI=1 in the course of receiving segmented-retransmitted segments, the receiver transmits the implicit NACK signal 1110. A unique type value indicating the implicit NACK signal 1110 is inserted in the Type field. This value is different from the type value indicating the explicit NACK signal 1105.

The receiver inserts the highest SN among the SNs of PDUs already received in the corresponding level, in the SN field and the sub-SN fields of the implicit NACK signal 1110 before transmission. For example, if PDU[14.1.0] is received and a segment with an LSI being set to '1' in the corresponding segment level is not received, the receiver transmits the implicit NACK signal 1110 having an SN=14, a first sub-SN=1 and a second sub-SN=0. Upon receipt of the implicit NACK signal 1110, a transmitter retransmits PDUs having SNs higher than the SN [14.1.0] in the corresponding segment level, that is PDU[14.1.1], PDU [14.1.2] and PDU[14.1.3].

Figure 12:
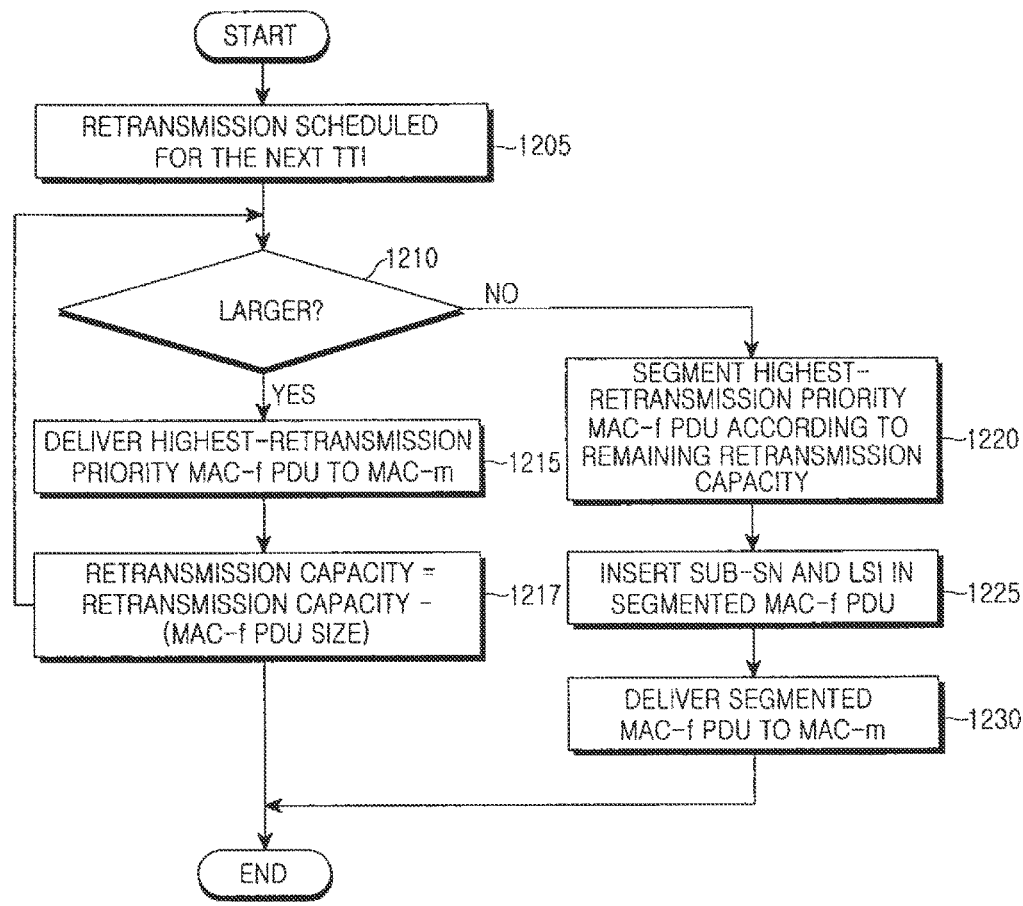
FIG. 12 is a flowchart illustrating a segmented retransmission operation according to an exemplary embodiment of the present invention.

FIG. 12 is a flowchart illustrating a segmented retransmission operation according to an exemplary embodiment of the present invention. Herein, initial transmission is omitted, and the retransmission operation is shown.

Referring to FIG. 12, in step 1205, retransmission of the next TTI is scheduled and the amount of retransmission data is determined. The amount of retransmission data will herein be referred to as 'retransmission capacity'.

In step 1210, a MAC-f entity compares the retransmission capacity with a size of the MAC-f PDU having the highest retransmission priority among the stored MAC-f PDUs. The retransmission priority can be set depending on various criteria. For example, the retransmission priority can be in inverse proportion to the SN. That is, the lower-SN MAC-f PDU has the higher retransmission priority. This can be considered as the most popular criterion for assigning a higher priority to an earlier generated MAC-f PDU. If there are several MAC-f PDUs to be retransmitted, retransmission priority is determined using the above priority criterion. In another example, a MAC-f PDU associated with the service requiring a very low transmission delay can have higher retransmission priority, even though it has the non-lowest SN.

If the retransmission capacity is greater than the size of the highest-retransmission priority MAC-f PDU in step 1210, the MAC-f entity proceeds to step 1215. Otherwise, the MAC-f entity proceeds to step 1220. In step 1215, the MAC-f entity delivers the highest-retransmission priority MAC-f PDU to a MAC-m layer. In step 1217, the MAC-f entity updates the retransmission capacity as follows, and then returns to step 1210.

Retransmission capacity=(existing retransmission capacity)−(size of MAC-f PDU delivered to MAC-m)

In step 1220, the MAC-f entity segments the highest-retransmission priority MAC-f PDU according to the retransmission capacity, and then proceeds to step 1225. Although will not be shown, if it is impossible to segment the highest-retransmission priority MAC-f PDU according to the retransmission capacity, that is, if the retransmission capacity is less than the minimum size of the MAC-f PDU, the MAC-f entity ends the operation. Herein, the minimum size of the MAC-f PDU means a size of a MAC-f header, and its value undergoes a change according to a segment level of the MAC-f PDU. For example, the minimum size of the MAC-f PDU is determined as follows.

Minimum size of MAC-f PDU=(SN field size+1)+ segment level*(sub-SN field size+2)+TL field size+1+Framing Header size The MAC-f entity inserts a sub-SN Header in an SN Header of the segmented MAC-f PDU in step 1225, and delivers the resulting MAC-f PDU to the MAC-m layer in step 1230. The MAC-f PDU is multiplexed in the MAC-m layer with MAC-f PDUs from other MAC-f entities, and then transmitted.

With reference to FIG. 12, a description will now be made of an exemplary segmented retransmission operation.

The following MAC-f PDUs are stored in a retransmission buffer.

MAC-f PDU[10]=[SN=10, F1=0, Total Length=1000, E=0]

MAC-f PDU[12.1]=[SN=12, F1=1, sub-SN=1, LSI=1, F2=0, Total Length=800]

Herein, the lower-SN MAC-f PDU[10] has the higher retransmission priority.

Thereafter, if 1500-byte retransmission capacity is scheduled, the MAC-f entity compares the retransmission capacity 1500 with the size 1000 of the highest-retransmission priority MAC-f PDU[10] in step 1210. Because the retransmission capacity is greater, the MAC-f entity proceeds to step 1215 where it delivers the MAC-f PDU[10] to the MAC-m layer without segmentation. In step 1217, the MAC-f entity updates the retransmission capacity to 500, and then proceeds to step 1210.

Next, in step 1210, the MAC-f entity compares the updated retransmission capacity 500 with the size 800 of the second highest-retransmission priority MAC-f PDU[12.1]. Because the size of the MAC-f PDU[12.1] is greater, the MAC-f entity proceeds to step 1220 where it segments the MAC-f PDU[12.1] into a 500-byte MAC-f PDU and a 300-byte MAC-f PDU.

In step 1225, the MAC-f entity inserts sub-SNs [12.1.0] and [12.1.1] and an LSI in the segmented MAC-f PDUs, completing the following MAC-f PDU[12.1.0] and MAC-fPDU[12.1.1].

MAC-f PDU[12.1.0]=[SN=12, F1=1, sub-SN=1, LSI=1, F2=1, sub-SN=0, LSI=0, F2=0, Total Length=500]

MAC-f PDU[12.1.1]=[SN=12, F1=1, sub-SN=1, LSI=1, F2=1, sub-SN=1, LSI=1, F2=0, Total Length=300]

Finally, in step 1230, the MAC-f PDU[12.1.0] is delivered to the MAC-m layer, and the MAC-f PDU[12.1.1] is buffered until the retransmission capacity is reallocated.

Figure 13:
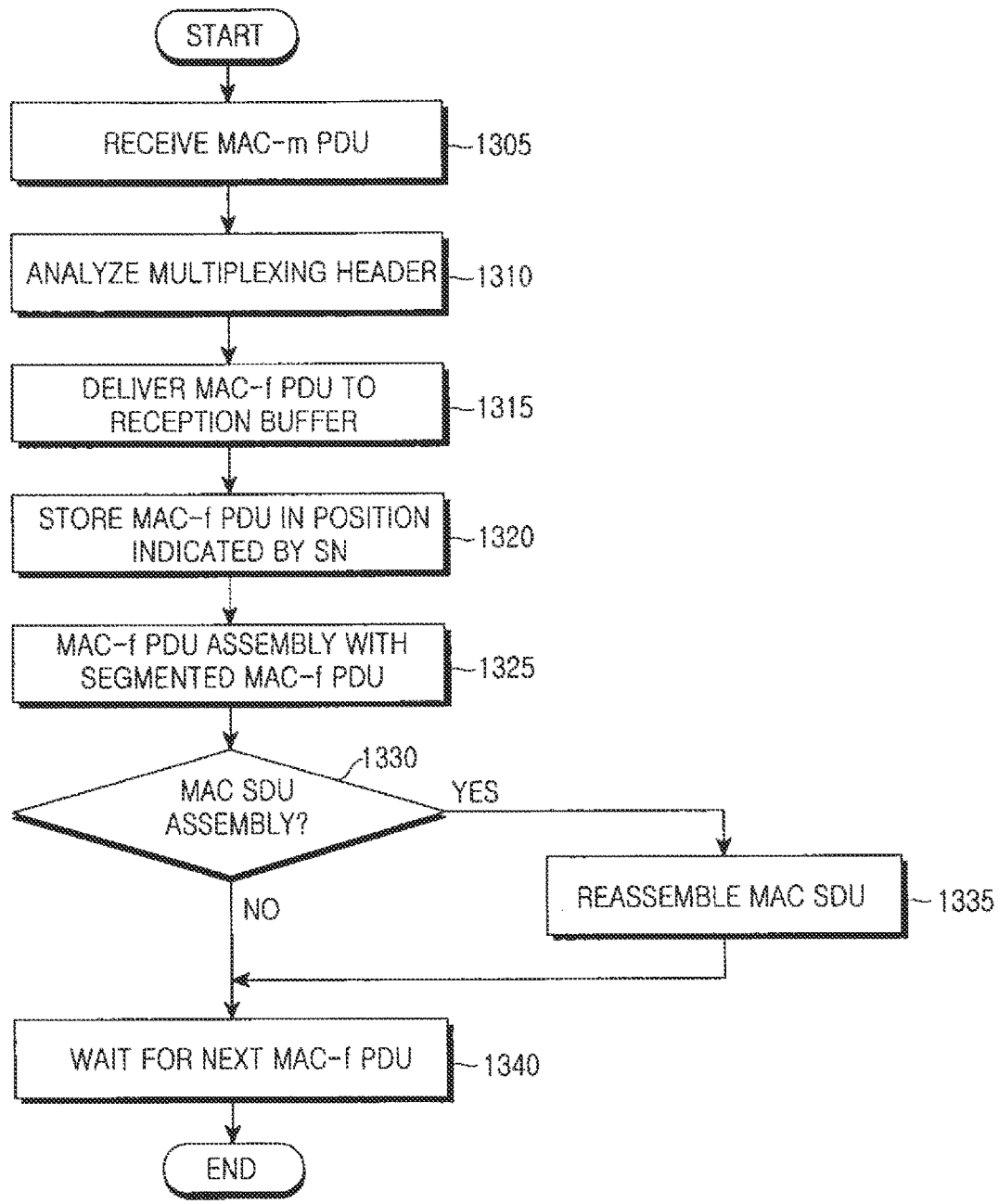
FIG. 13 is a flowchart illustrating a reception operation according to an exemplary embodiment of the present invention.

FIG. 13 is a flowchart illustrating a reception operation according to an exemplary embodiment of the present invention.

Referring to FIG. 13, a MAC-m layer receives a MAC-m PDU in step 1305, analyzes Multiplexing Headers of the MAC-m PDU in step 1310, and delivers MAC-f PDUs multiplexed to the MAC-m PDU to a reception buffer of each corresponding MAC-f entity in step 1315. The following steps 1320 to 1340 correspond to an operation of any one MAC-f entity.

In step 1320, a MAC-f entity checks an SN Header of the MAC-f PDU provided from the MAC-m layer, and stores the MAC-f PDU in an appropriate position. The MAC-f entity determines the storage position of the MAC-f PDU based on the total SNs. The total SN includes the SN and the sub-SN(s), and priority of the SN is determined according to a segment level. That is, a sub-SN with a segment level 1 is higher in priority than a sub-SN with a segment level 2. A receiver first compares SNs of MAC-f PDUs in determining sequence of previously stored MAC-f PDUs and the MAC-f PDU delivered from the MAC-m layer. If the SNs are equal to each other, the receiver next compares sub-SNs with a segment level=1. If the sub-SNs are still identical to each other, the receiver compares sub-SNs with a segment level=2, on a repeating basis.

In step 1325, the MAC-f entity checks whether there are any MAC-f PDUs reassemblable in a high-level MAC-f PDU among the stored MAC-f PDUs, and if any, reassembles the reassemblable MAC-f PDUs.

1. The MAC-f entity determines assemblability of the MAC-f PDUs as follows.

1.1. In a given segment level, the MAC-f entity groups MAC-f PDUs having the same SN and sub-SNs except for the last sub-SN into one segmented MAC-f PDU set. For example, MAC-f PDU[12.0.0] and MAC-f PDU[12.0.1] are grouped into the same segmented MAC-f PDU set. On the contrary, MAC-f PDU[12.0.0] and MAC-f PDU[12.1.1] do not belong to the same segmented MAC-f PDU set. Herein, the segmented MAC-f PDU set includes MAC-f PDUs reassemblable in the high-level MAC-f PDU, and when one segmented MAC-f PDU set is completely collected, the segmented MAC-f PDUs in the MAC-f PDU set are reassembled in the high-level MAC-f PDU.

1.2. If a MAC-f PDU with the last sub-SN=0 through a MAC-f PDU with an LSI=1 among the MAC-f PDUs belonging to the segmented MAC-f PDU set have the continuous last sub-SNs, the segmented MAC-f PDU set can be reassembled.

2. The reassemblable segmented MAC-f PDU set is reassembled in a high-level MAC-f PDU as follows.

2.1. The MAC-f entity sequentially concatenates payloads of all MAC-f PDUs included in the segmented MAC-f PDU, generating a payload of the high-level MAC-f PDU.

2.2. The MAC-f entity generates a header of the high-level MAC-f PDU as follows.

2.2.1. The MAC-f entity selects any one of MAC-f PDUs included in the segmented MAC-f PDU set, and generates an SN Header of the high-level MAC-f PDU using the part obtained by removing the last sub-SN Header from an SN Header of the selected MAC-f PDU.

2.2.2. The MAC-f entity newly calculates a Total Length field according to a payload size of the high-level MAC-f PDU.

2.2.3. The MAC-f entity re-sets the Framing Header according to the state where an IP packet is framed in a payload of the high-level MAC-f PDU.

2.3. The MAC-f entity combines the header and the payload of the high-level MAC-f PDU, completing reassembly of the high-level MAC-f PDU.

In step 1330, the MAC-f entity determines whether assembly of a MAC SDU is possible using the assembled MAC-f PDUs. If the following conditions are satisfied, assembly of the MAC SDU is possible.

An ith Length Indicator among the Length Indicators included in the MAC-f PDUs stored in a reception buffer is defined as LI(i).

If there is no non-received MAC-f PDU between a MAC-f PDU with an LI(i) and a MAC-f PDU with an LI(i+1), the MAC-f entity can reassemble a MAC SDU that has the LI(i) as a start point and the LI(i+1) as an end point.

Presence of the non-received MAC-f PDU can be determined depending on continuity of SNs. That is, if the SNs are continuous, there is no non-received MAC-f PDU. There is a non-received MAC-f PDU(s) in the part where the continuity of SNs is broken.

The continuity of SNs between a non-segmented MAC-f PDU and a segmented MAC-f PDU set, between a segmented MAC-f PDU set and a non-segmented MAC-f PDU, between segmented MAC-f PDU sets, and in a segmented MAC-f PDU set, is determined as follows.

Figure 14A:
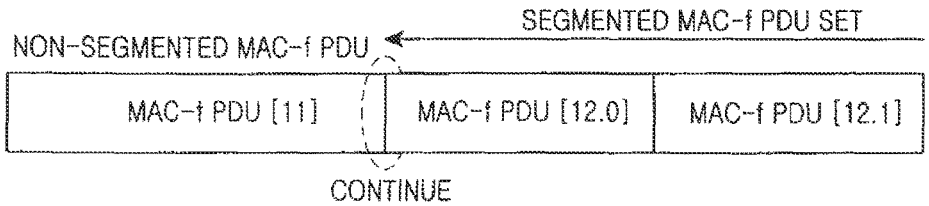
FIGS. 14A to 14D are diagrams illustrating an exemplary operation of determining continuity of sequence numbers, according to an exemplary embodiment of the present invention.

Continuity between a non-segmented MAC-f PDU and a segmented MAC-f PDU set: If SNs of the non-segmented MAC-f PDU and the segmented MAC-f PDU set are continuous and all sub-SNs of the first MAC-f PDU in the segmented MAC-f PDU set are '0', it indicates 'continuous'. Otherwise, it indicates 'discontinuous'. Referring to FIG. 14A, because an SN of the non-segmented MAC-f PDU[11] is '11', the total SNs of the segmented MAC-f PDU set include '12.0' and '12.1' being continuous to each other, and a sub-SN of a first MAC-f PDU in the segmented MAC-f PDU set is '0', the segmented MAC-f PDU set is continuous to the non-segmented MAC-f PDU.

Figure 14B:
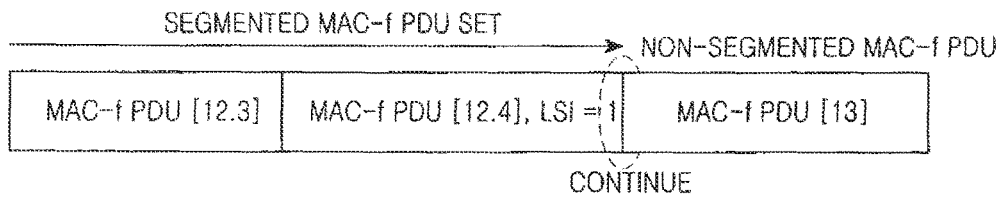

Continuity between a segmented MAC-f PDU set and a non-segmented MAC-f PDU: If SNs of the segmented MAC-f PDU set and the non-segmented MAC-f PDU are continuous and the last LSI of the last MAC-f PDU in the segmented MAC-f PDU set is set to '1', it indicates 'continuous'. Otherwise, it indicates 'discontinuous'. Referring to FIG. 14B, because an SN of the segmented MAC-f PDU set is '12', an SN of the non-segmented MAC-f PDU[13] is '13' being continuous to the SN '12', and an LSI of the last MAC-f PDU[12.4] in the segmented MAC-f PDU set is set to '1', the non-segmented MAC-f PDU[13] is continuous to the segmented MAC-f PDU set.

Figure 14C:
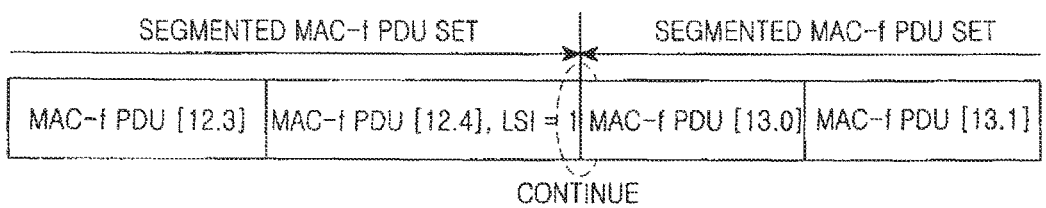

Continuity between segmented MAC-f PDU sets: If SNs of the segmented MAC-f PDU sets are continuous, the last LSI of the last MAC-f PDU in the first segmented MAC-f PDU set is '1, and all sub-SNs of the first MAC-f PDU in the second segmented MAC-f PDU set are '0', it indicates 'continuous'. Otherwise, it indicates 'discontinuous'. Referring to FIG. 14C, because an SN of the first segmented MAC-f PDU set is '12', an SN of the second segmented MAC-f PDU set is '13' being continuous to the SN '12', an LSI of the last MAC-f PDU[12.4] in the first segmented MAC-f PDU set is '1', and a sub-SN of the first MAC-f PDU[13.0] in the second segmented MAC-f PDU set is '0', the second segmented MAC-f PDU set is continuous to the first segmented MAC-f PDU set.

Figure 14D:
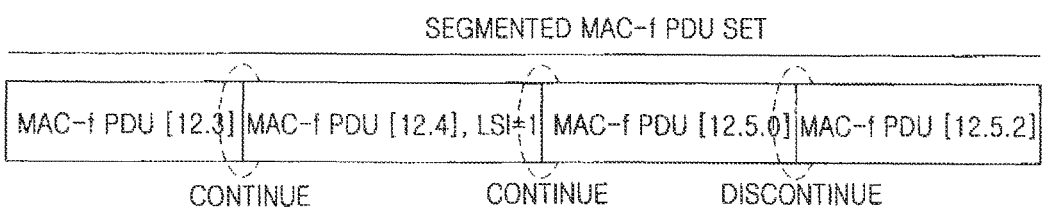

Continuity in a segmented MAC-f PDU set: In the point where a segment level undergoes a change, if the last LSI of the MAC-f PDU immediately before the segment level undergoes a change is '1' and the last sub-SN of the first MAC-f PDU where the segment level undergoes a change is '0', it means 'continuous'. Otherwise, it means 'discontinuous'. In addition, in the segment level where its SN is equal to the sub-SNs except for the last sub-SN, the point where the last sub-SN is continuous indicates 'continuous', and the point where the last sub-SN is discontinuous indicates 'discontinuous'. Referring to FIG. 14D, because MAC-f PDU[12.3] and MAC-f PDU[12.4] are continuous in terms of the last sub-SN in the segment level having the same SN 12, they are continuous to each other. Because the segment level undergoes a change in the point between the MAC-f PDU[12.4] and the MAC-f PDU[12.5.0], the LSI of the MAC-f PDU[12.4] immediately before the segment level undergoes a change is '1', and the last sub-SN of the first MAC-f PDU[12.5.0] where the segment level undergoes a change is '0', the MAC-f PDU[12.5.0] is continuous to the MAC-f PDU[12.4].

If it is determined in step 1330 that the MAC-f PDUs can be reassembled, the MAC-f entity proceeds to step 1335 where it reassembles a MAC SDU with the MAC-f PDUs and delivers the MAC SDU to an upper layer. In step 1340, the MAC-f entity waits until the next MAC-f PDU arrives. On the contrary, if it is determined in step 1330 that there are no MAC-f PDUs that can be reassembled, the MAC-f entity proceeds to step 1340 where it waits for the next MAC-f PDU.

An exemplary embodiment of the present invention proposes a scheme of setting different SNs for initial transmission and retransmission. There are two possible schemes of assigning SNs: one can assign an SN for each individual packet and another can assign an SN for every predetermined size. As a typical example, the latter scheme can assign an SN for each individual byte. The scheme of assigning an SN for each individual packet is advantageous in that a length of the SN is short, but is disadvantageous in that the number of sub-SNs is not matched during segmented retransmission. The scheme of assigning SNs in units of bytes is advantageous in that the header format is simplified during segmented retransmission, but is disadvantageous in that a length of the SN is long.

To make the best of the advantages of both schemes, an exemplary embodiment of the present invention assigns an SN for each individual packet during initial transmission, and assigns an SN for each individual byte during segmented retransmission.

Figure 15:
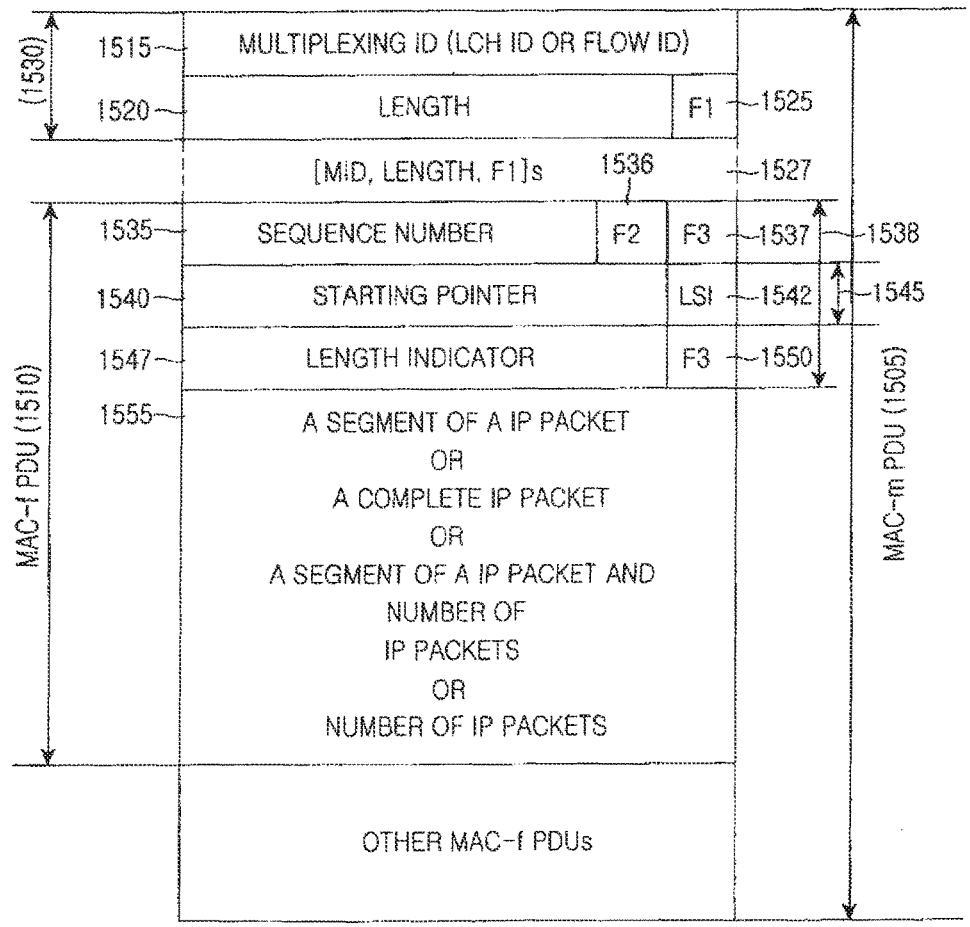
FIG. 15 is a diagram illustrating a frame format according to an exemplary embodiment of the present invention.

FIG. 15 illustrates a frame format according to an exemplary embodiment of the present invention.

Referring to FIG. 15, a MAC-m PDU 1505 is composed of at least one Multiplexing Header 1530 and at least one MAC-f PDU 1510. Each Multiplexing Header 1530 includes multiplexing information for each MAC-f PDU 1510 contained therein. For example, the multiplexing information is composed of a Multiplexing Identifier (ID) 1515 meaning an ID of a MAC-f entity (that is, logical channel or data flow) to which the MAC-f PDU 1510 belongs, a Length field 1520 indicating a size of the MAC-f PDU 1510, and an F1 bit 1525. The F1 bit 1525 is a 1-bit flag indicating whether its following byte has other multiplexing information 1527 or MAC-f PDU 1510.

Each MAC-f PDU 1510 is composed of a MAC-f header 1538 and a MAC-f payload 1555, and 'a part of an IP packet', 'one complete IP packet', 'a part of an IP packet and more than one IP packet', or 'a plurality of IP packets' is contained in the MAC-f payload 1555.

An SN 1535, an F2 bit 1536 and an F3 bit 1537 of the MAC-f PDU 1510 are first inserted in the MAC-f header 1538. The F2 bit 1536 is a 1-bit flag indicating presence/absence of a retransmission sub-header 1545. The F3 bit 1537 is a 1-bit flag indicating whether a Length Indicator 1547 is included in the MAC-f header 1538. The Length Indicator 1547, which is information indicating an end position of each IP packet included in the payload 1555, is optional header information that is inserted when the last part of an IP packet is included in the payload 1555 of the MAC-f PDU 1510. Each Length Indicator 1547 is followed by an F3 bit 1550 indicating whether it is followed by another Length Indicator or the payload 1555.

The retransmission sub-header 1545 included in the MAC-f header 1538 is composed of a Starting Pointer (SP) 1540 and an LSI 1542. The SP 1540, information indicating to which part of the original MAC-f PDU the corresponding segment corresponds, is an SN of a first byte of the corresponding segment when the first byte of the payload of the original MAC-f PDU is set to '0' and an SN that increases by one for every byte is assigned. A detailed example of the SP 1540 will be described in connection with FIG. 16. The "original MAC-f PDU" refers to a non-segmented MAC-f PDU. The LSI 1542 is a value indicating whether the corresponding segment is the last segment.

Figure 16:
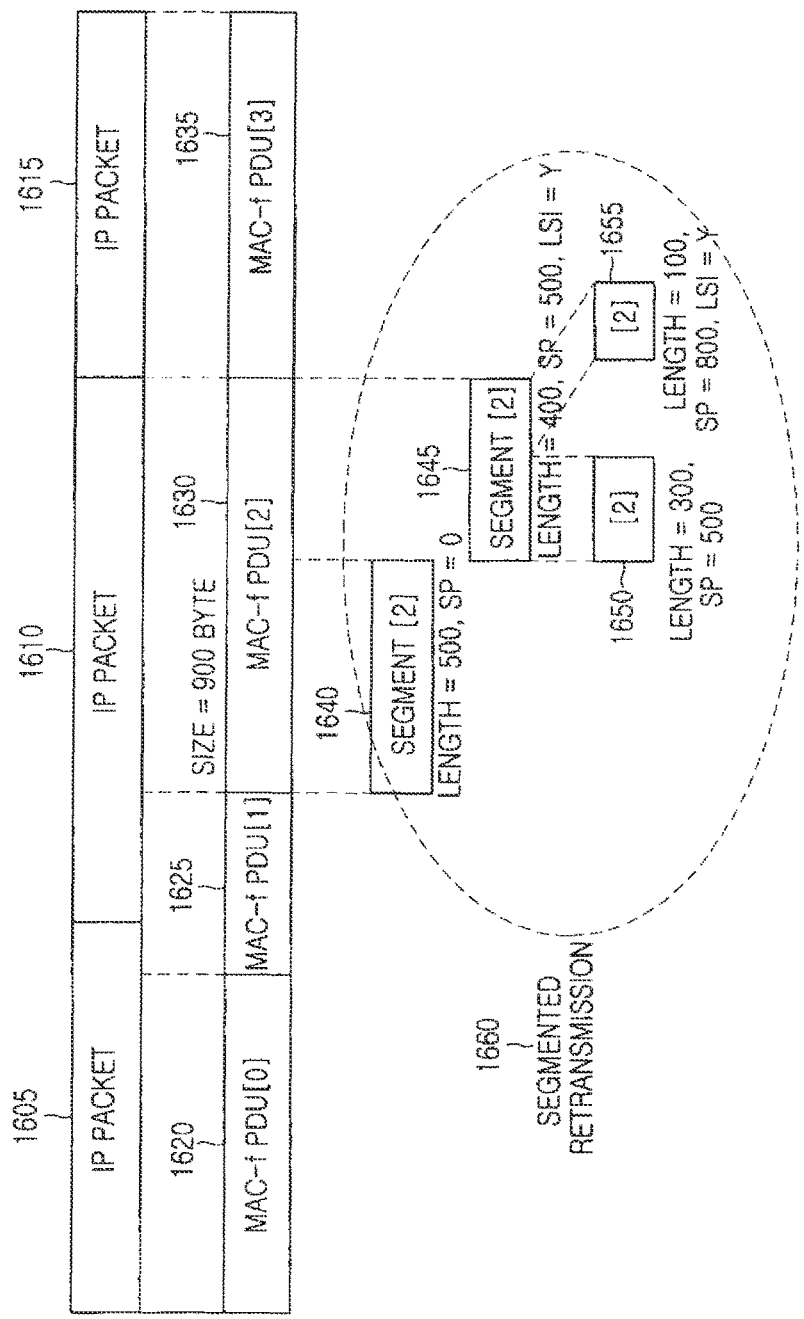
FIG. 16 is a diagram of exemplary segmented retransmission according to an exemplary embodiment of the present invention.

With reference to FIG. 16, a description will now be made of exemplary segmented retransmission according to an exemplary embodiment of the present invention.

As illustrated, three IP packets 1605, 1610 and 1615 are framed into four MAC-f PDUs 1620, 1625, 1630 and 1635. The MAC-f PDUs 1620 to 1635 are assigned SNs 0 to 3, respectively, and the MAC-f PDU 1630 with an SN=2 (that is, MAC-f PDU[2]) undergoes segmented retransmission because it has suffered a transmission failure. The 900-byte MAC-f PDU[2] 1630 is segmented into a 500-byte segment 1640 and a 400-byte segment 1645. An SN of the first segment 1640 is set to '2' like that of the parent MAC-f PDU 1630, an SP is set to '0', and a Length field is set to 500. An SN of the second segment 1645 is set to '2' like that of the parent MAC-f PDU 1630, and an SP is set to 500. This is because an SN of the first byte of the payload of the second segment 1645 is 500.

The segmented retransmission 1660 is possible even when the second segment 1645 is retransmitted. Also, in this case, each of segments 1650 and 1655 includes an SN of the parent MAC-f PDU 1645 as its SN, and uses an SN of a first byte of a payload of the corresponding segment as its SP. For example, a Length field of the first segment 1650 is 300 and an SP is 500, and a Length field of the second segment 1655 is 100 and an SP is 800. In each segment level, a value for indicating that an LSI of the last segment is the last one is set to 'Yes (Y)'.

Figure 17:
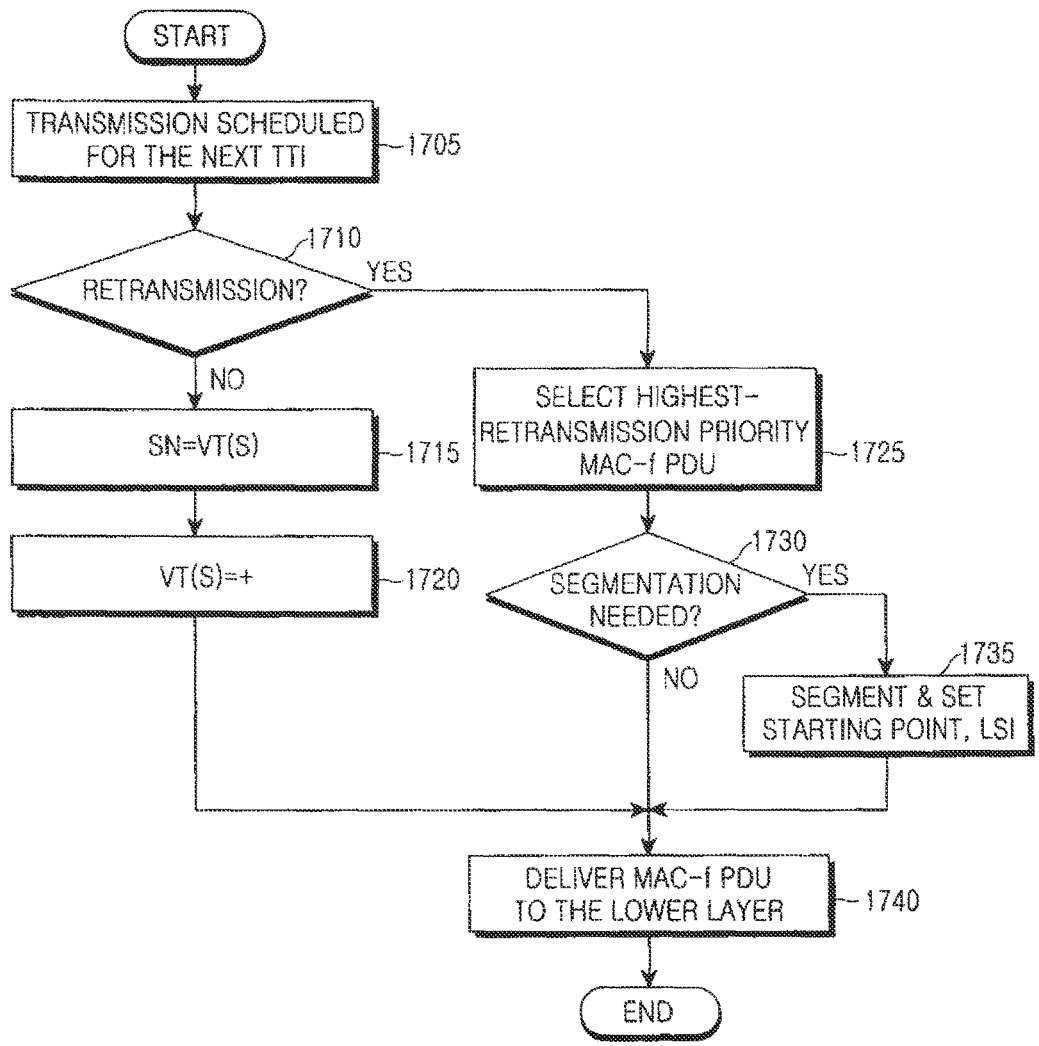
FIG. 17 is a flowchart illustrating a transmission operation according to an exemplary embodiment of the present invention.

FIG. 17 illustrates a transmission operation according to an exemplary embodiment of the present invention.

Referring to FIG. 17, in step 1705, transmission for the next TTI is scheduled and the amount of transmission data is determined. Herein, the amount of transmission data will be referred to as 'transmission capacity'. In step 1710, a transmitter's MAC-f entity determines whether there is a need for retransmission according to, for example, receipt/non-receipt of an ACK/NACK signal for a MAC-f PDU transmitted in the previous TTI, that is, determines whether there is a retransmission-requested MAC-f PDU. If there is no need for retransmission, the transmitter's MAC-f entity proceeds to step 1715. However, if there is no need for retransmission, the transmitter's MAC-f entity proceeds to step 1725.

In step 1715, the MAC-f entity configures a MAC-f PDU to be transmitted in the next TTI, and determines an SN to be used for the MAC-f PDU. The MAC-f entity manages a variable VT(S) whose initial value is '0', and the VT(S) increases by one every time the MAC-f PDU is initially transmitted. If a MAC-f PDU to be transmitted in the next TTI is configured, the MAC-f entity sets an SN of the MAC-f PDU to a value of the VT(S), and proceeds to step 1720 where it increases the VT(S) by one. Thereafter, in step 1740, the MAC-f entity delivers the MAC-f PDU to another party via a lower layer.

On the contrary, if there is a need for retransmission, the MAC-f entity proceeds to step 1725 where it selects the highest-retransmission priority MAC-f PDU among the buffered MAC-f PDUs. In step 1730, the MAC-f entity compares a size of the selected MAC-f PDU with the transmission capacity allocated through scheduling to determine whether there is a need for segmented retransmission. If the transmission capacity is greater than or equal to the size of the selected MAC-f PDU, indicating that there is no need for segmented retransmission, then the MAC-f entity proceeds to step 1740 where it delivers the selected MAC-f PDU to the other party via the lower layer. On the contrary, if the transmission capacity is less than the size of the selected MAC-f PDU, indicating that there is a need for segmented retransmission, the MAC-f entity proceeds to step 1735.

In step 1735, the MAC-f entity segments the selected MAC-f PDU according to the transmission capacity, and then sets a header of the segmented MAC-f PDU. If the segmented MAC-f PDU is a MAC-f PDU segmented from the original MAC-f PDU (that is, the first non-segmented MAC-f PDU), the MAC-f entity adds a retransmission sub-header composed of an SP and an LSI to a MAC-f header of the original MAC-f PDU, thereby setting a header of the segmented MAC-f PDU. If the segmented MAC-f PDU is a MAC-f PDU segmented from the previously-segmented parent MAC-f PDU, because a MAC-f header of the parent MAC-f PDU already has a retransmission sub-header, the MAC-f entity updates an SP and an LSI of the retransmission sub-header. In step 1740, the segmented MAC-f PDU is delivered to another party via the lower layer.

Figure 18:
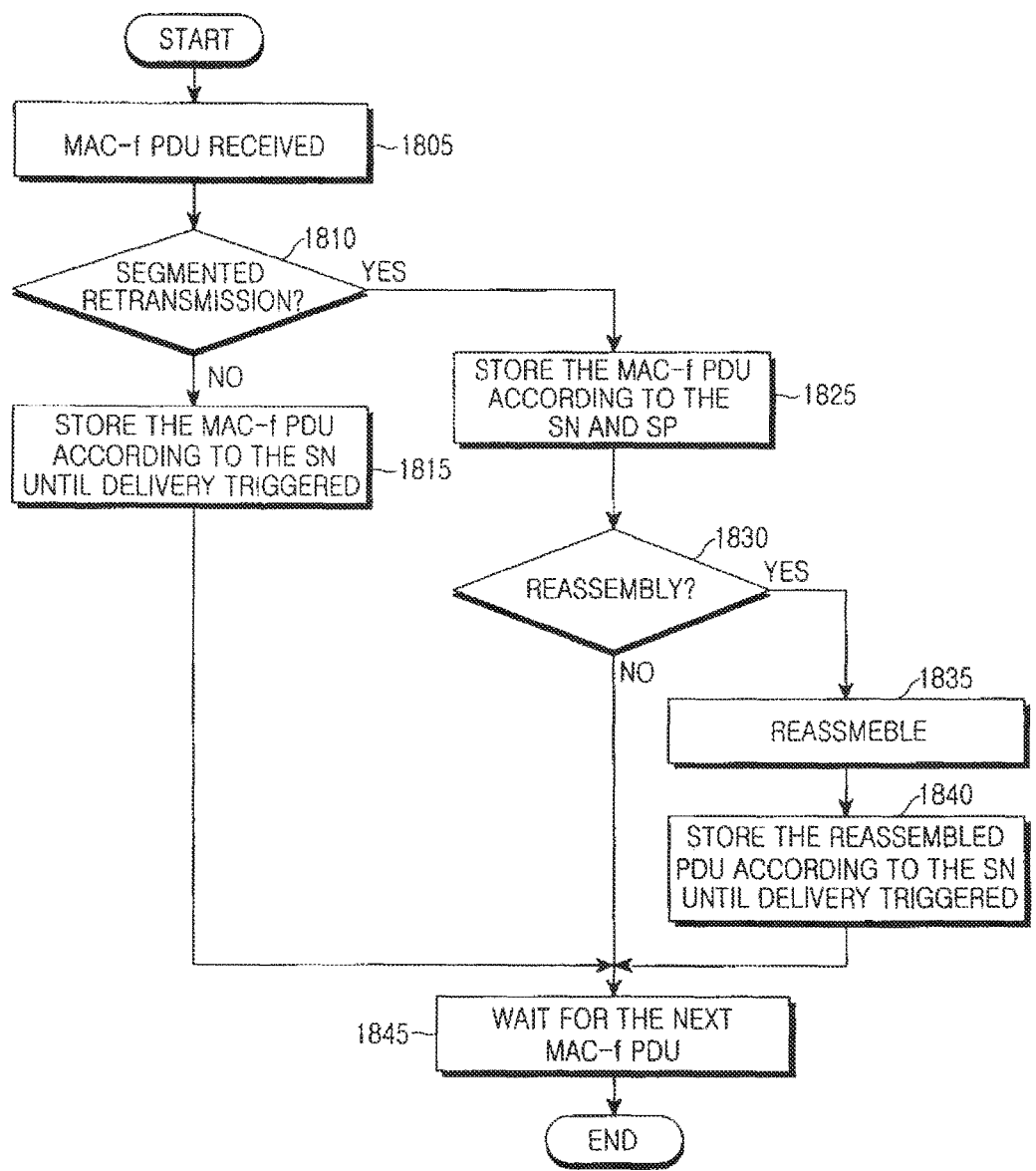
FIG. 18 is a flowchart illustrating a reception operation according to an exemplary embodiment of the present invention.

FIG. 18 illustrates a reception operation according to the second embodiment of the present invention.

Referring to FIG. 18, if a MAC-f PDU is received in step 1805, a receiver's MAC-f entity determines whether the MAC-f PDU includes a retransmission sub-header to check if the received MAC-f PDU is a segmented-retransmitted MAC-f PDU in step 1810. If the received MAC-f PDU is a segmented-retransmitted MAC-f PDU, the MAC-f entity proceeds to step 1825. Otherwise, the MAC-f entity proceeds to step 1815.

In step 1815, the MAC-f entity stores the MAC-f PDU in a reception buffer according to an SN until a 'delivery condition to an upper layer' is satisfied, and then proceeds to step 1845. The 'delivery condition to an upper layer' is differently specified according to circumstances. For example, if the reception buffer is set for 'in-sequence delivery', the 'delivery condition to an upper layer' is satisfied when there is no non-received PDU (that is, gap) among the MAC-f PDUs having SNs lower than that of the MAC-f PDU. If the 'delivery condition to an upper layer' is satisfied, the reception buffer reconfigures an upper layer packet using the MAC-f PDUs, and delivers the reconfigured packet to the upper layer. On the contrary, if the reception buffer is set for 'out of sequence delivery', the reception buffer reconfigures an upper layer packet using the MAC-f PDUs that can be reconfigured as an upper layer packet, among the received MAC-f PDUs, and then delivers the reconfigured upper layer packet to the upper layer. In this case, the MAC-f PDUs are reordered in the upper layer. In other words, in 'in-sequence delivery', the MAC-f PDUs are delivered to the upper layer according to the received sequence, and in 'out of sequence delivery', the MAC-f PDUs are delivered to the upper layer regardless of the received sequence.

In step 1825, the MAC-f entity stores the MAC-f PDU in the reception buffer according to an SN and an SP. In step 1830, the MAC-f entity checks if reassembly of the MAC-f PDUs stored in the reception buffer is possible. The reassembly is possible if the following conditions are satisfied.

1. The MAC-f entity arranges the MAC-f PDUs having the same SNs in order of the MAC-f PDU having a less SP.

2. If an LSI of the last MAC-f PDU among the arranged MAC-f PDUs is 'Y' and the MAC-f PDUs are continuous to each other, the MAC-f entity reassembles the MAC-f PDUs in a parent MAC-f PDU.

Herein, "continuous" indicates that the following condition is satisfied.

In the case where the MAC-f PDUs having the same SNs are arranged according to SPs, if SPs and Lengths of adjacent MAC-f PDUs are as follows, the adjacent MAC-f PDUs are continuous to each other.

$$SP(x+1)=SP(x)+Length(x)$$

where SP(x+1) denotes an SP of an (x+1)th MAC-f PDU among the MAC-f PDUs having the same SNs, SP(x) denotes an SP of an xth MAC-f PDU, and Length(x) denotes a size of an xth MAC-f PDU.

If there is no reassemblable MAC-f PDUs in step 1830, the MAC-f entity proceeds to step 1845 where it waits until the next MAC-f PDU arrives. On the contrary, if there are reassemblable MAC-f PDUs in step 1830, the MAC-f entity proceeds to step 1835 where it reassembles the MAC-f PDUs having the same SNs in a parent MAC-f PDU. Thereafter, in step 1840, the MAC-f entity stores the parent MAC-f PDU in the reception buffer according to the SN until the 'delivery condition to an upper layer' is satisfied, and then proceeds to step 1845.

In the foregoing exemplary embodiments of the present invention, there is no relationship between an SN and an upper layer packet. However, if one upper layer packet is mapped to one MAC-f PDU, there is no need for a separate Length Indicator, contributing to simplification of the header format. Therefore, an exemplary embodiment of the present invention maps one non-segmented MAC-f PDU to one upper layer packet, and assigns an SN for each individual upper layer packet.

Figure 19:
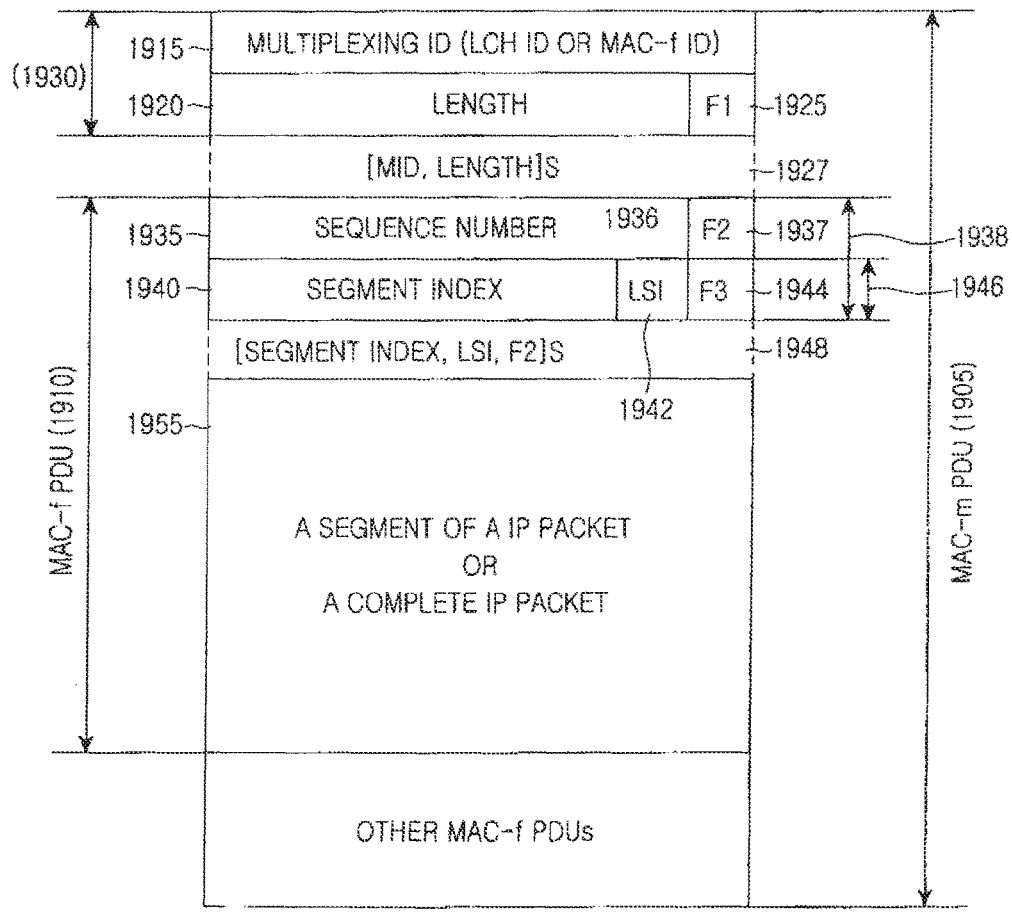
FIG. 19 is a diagram illustrating a frame format according to an exemplary embodiment of the present invention.

FIG. 19 illustrates a frame format according to an exemplary embodiment of the present invention.

Referring to FIG. 19, a MAC-m PDU 1905 is composed of at least one Multiplexing Header 1930 and at least one MAC-f PDU 1910. Each Multiplexing Header 1930 includes multiplexing information for each MAC-f PDU 1910 contained therein. For example, the multiplexing information is composed of a Multiplexing ID 1915 meaning an ID of a MAC-f entity to which the MAC-f PDU 1910 belongs, a Length field 1920 indicating a size of the MAC-f PDU 1910, and an F1 bit 1925. The F1 bit 1925 is a 1-bit flag indicating whether its following byte is other multiplexing information 1927 or MAC-f PDU 1910.

Each MAC-f PDU 1910 is composed of a MAC-f header 1938 and a MAC-f payload 1955, and 'a part of an IP packet' or 'one complete IP packet' is contained in the MAC-f payload 1955. An SN 1935, a Segment Index 1940, an F2 bit 1937 and an LSI 1942 of the MAC-f PDU 1910 are first inserted in the MAC-f header 1938. The F2 bit 1937 is a 1-bit flag indicating presence/absence of a segment subheader 1946. The segment sub-header 1946 is composed of the Segment Index 1940 and the LSI 1942. The Segment Index 1940 is an integer that monotonously increases one by one beginning at 0, and indicates a specific segment of a parent MAC-f PDU. As done in an exemplary embodiment of the present invention described above, segmentation can be achieved over several levels.

An LSI 1942 is a value indicating whether the corresponding segment is the last segment in the corresponding segment level. Each segment sub-header 1946 further includes an F3 bit 1944 whether it is followed by another segment sub-header 1948 or payload 1955.

Figure 20:
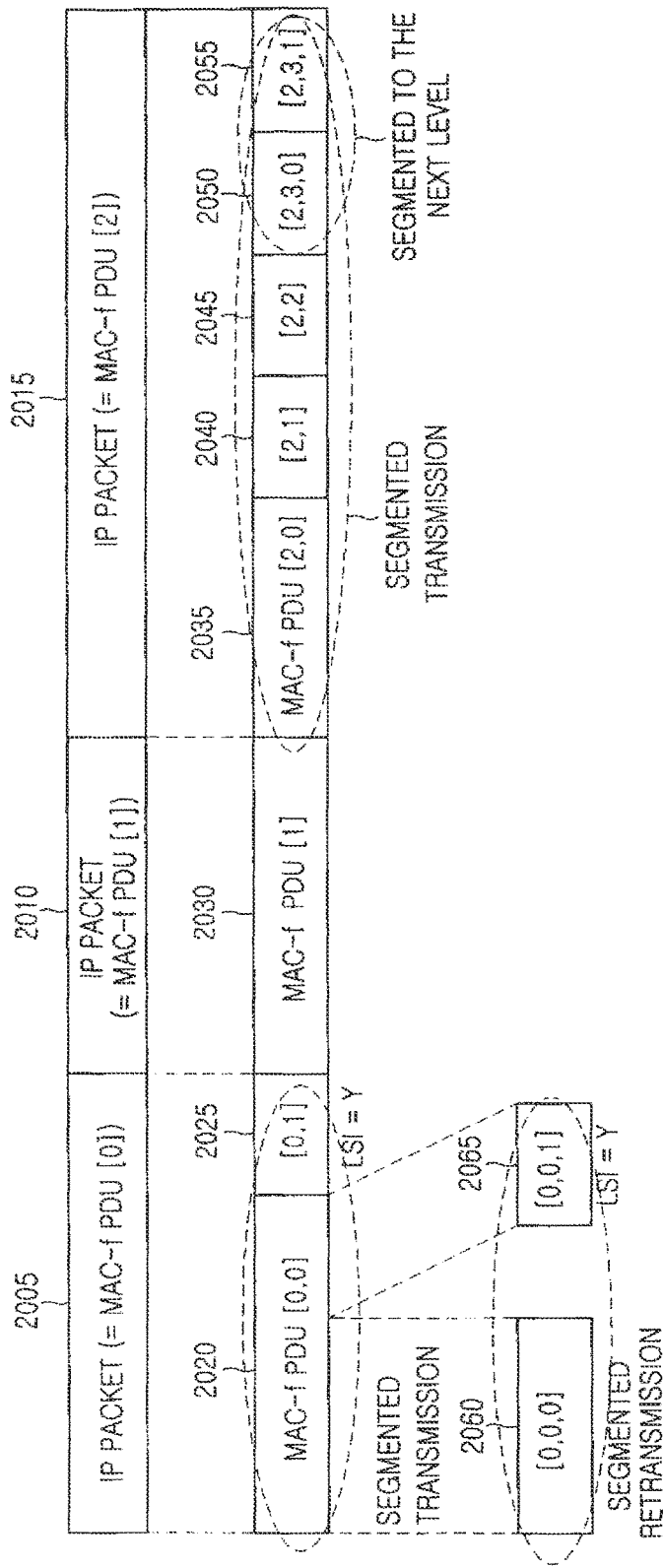
FIG. 20 is a diagram of exemplary segmented transmission and segmented retransmission according to an exemplary embodiment of the present invention.

With reference to FIG. 20, a description will now be made of exemplary segmented transmission and segmented retransmission according to an exemplary embodiment of the present invention. For convenience, it is assumed that MAC-f (s0, s1, ... , sn) means a MAC-f PDU of which an SN is s0, a segment index of a first segment level is s1, and a segment index of an nth segment level is sn.

As illustrated, there are three transmission IP packets 2005, 2010 and 2015. In an exemplary embodiment of the present invention, because one SN is assigned to one upper layer packet, an SN 0 is assigned to the first IP packet 2005, an SN 1 is assigned to the second IP packet 2010, and an SN 2 is assigned to the third IP packet 2015. Then, the first IP packet 2005 is indicated by MAC-f PDU[0], the second IP packet 2010 is indicated by MAC-f PDU[1], and the third IP packet 2015 is indicated by MAC-f PDU[2].

In the case where a transmitter intends to transmit the first MAC-f PDU[0] 2005, if the channel status is insufficient to transmit the MAC-f PDU[0] 2005, the transmitter segments the MAC-f PDU[0] into several segments, and inserts segment sub-headers in the segments, thereby configuring a MAC-f PDU[0.0] 2020 and a MAC-f PDU[0.1] 2025. An LSI of the MAC-f PDU[0.1] is set to 'Y'.

During transmission of the MAC-f PDU[1] 2010, if there is no need for segmentation because of the sufficient transmission resources allocated, the MAC-f PDU[1] 2010 is transmitted as it is without a segment sub-header, as shown by reference numeral 2030.

Due to the channel status that became poor during transmission of the MAC-f PDU[2] 2015, the MAC-f PDU[2] 2015 is segmented into 5 segments. If a size of the segment index is limited to 2 bits, the transmitter segments the MAC-f PDU[2] 2015 over several levels, thereby overcoming the limit of the segment index.

That is, the MAC-f PDU[2] 2015 is segmented into a MAC-f PDU[2.0] 2035, a MAC-f PDU[2.1] 2040 and a MAC-f PDU[2.2] 2045, and the remaining data is segmented again into a MAC-f PDU[2.3.0] 2050 and a MAC-f PDU[2.3.1] 2055. This is because a size of the MAC-f PDU[2.3] scheduled to contain all of the remaining data is too large and the segment index cannot allow a value greater than or equal to 3.

The segmented transmission is equally applied even for retransmission. For example, if there is a need for retransmission of a MAC-f PDU[0.0] 2020 but the transmitter cannot retransmit it at a time, the transmitter segments the MAC-f PDU[0.0] 2020 into a MAC-f PDU[0.0.0] 2060 and a MAC-f PDU[0.0.1] 2065 before transmission. Likewise, an LSI of the MAC-f PDU[0.0.1] 2065 is set to 'Y'.

Figure 21:
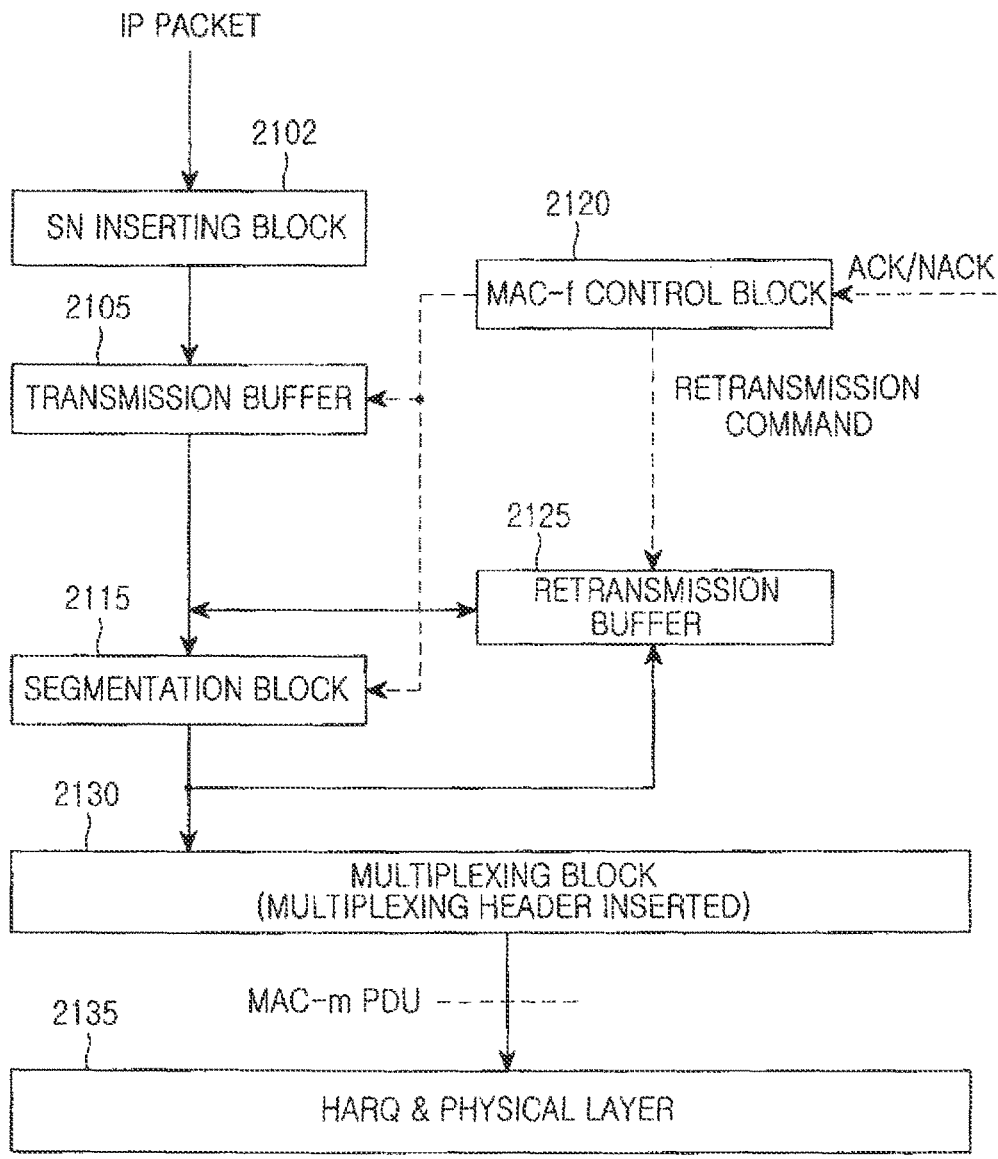
FIG. 21 is a diagram illustrating a structure of a transmitter according to an exemplary embodiment of the present invention.

FIG. 21 illustrates a structure of a transmitter according to an exemplary embodiment of the present invention.

Referring to FIG. 21, the transmitter includes an SN inserting block 2102, a transmission buffer 2105, a segmentation block 2115, a MAC-f control block 2120, a retransmission buffer 2125, a multiplexing block 2130, and an HARQ block and physical layer 2135. Of these entities, the SN inserting block 2102, the transmission buffer 2105, the segmentation block 2115, the MAC-f control block 2120, and the retransmission buffer 2125 constitute a MAC-f entity. Although one MAC-f entity is shown herein, a plurality of MAC-f entities for a plurality of services can also be provided.

The SN inserting block 2102 serves to assign an SN to the packets (for example, IP packets) provided from an upper layer. The SN monotonously increases one by one for every IP packet. The transmission buffer 2105 stores the SN-inserted IP packets until they are transmitted over a radio channel. The SN-inserted packet is called a 'MAC-f PDU'.

The multiplexing block 2130 determines the amount of data to be transmitted in the next TTI for each individual MAC-f entity according to the radio transmission resources allocated by a Node B's scheduler, and notifies the determined information to the MAC-f control block 2120. The MAC-f control block 2120 determines the data to be transmitted in the next TTI according to priority of initial transmission and retransmission. If the MAC-f control block 2120 determines to transmit a new IP packet in the next TTI, it notifies the amount of transmission data to the transmission buffer 2105. If the MAC-f control block 2120 determines to perform retransmission in the next TTI, the MAC-f control block 2120 notifies the amount of retransmission data to the retransmission buffer 2125.

If there is no need for segmented transmission, the transmission buffer 2105 delivers the stored MAC-f PDU to the retransmission buffer 2125 and the multiplexing block 2130. However, if there is a need for segmented transmission, the transmission buffer 2105 delivers the stored MAC-f PDU to the segmentation block 2115.

The segmentation block 2115 segments the MAC-f PDU provided from the transmission buffer 2105 in an appropriate size, inserts a segment index and an LSI in each segment, and then delivers a MAC-f PDU to be transmitted in the next TTI, among the segmented MAC-f PDUs, to the multiplexing block 2130. Further, the segmentation block 2115 delivers all segmented MAC-f PDUs including the MAC-f PDU delivered to the multiplexing block 2130, to the retransmission buffer 2125.

The retransmission buffer 2125 stores the MAC-f PDUs, and discards the stored MAC-f PDUs or schedules retransmission under the control of the MAC-f control block 2120.

The multiplexing block 2130 multiplexes the MAC-f PDUs provided from a plurality of MAC-f entities to one MAC-m PDU, and inserts multiplexing headers in the MAC-m PDU. The MAC-m PDU undergoes an HARQ operation by the HARQ block and physical layer 2135, and then is transmitted over a radio channel.

Figure 22:
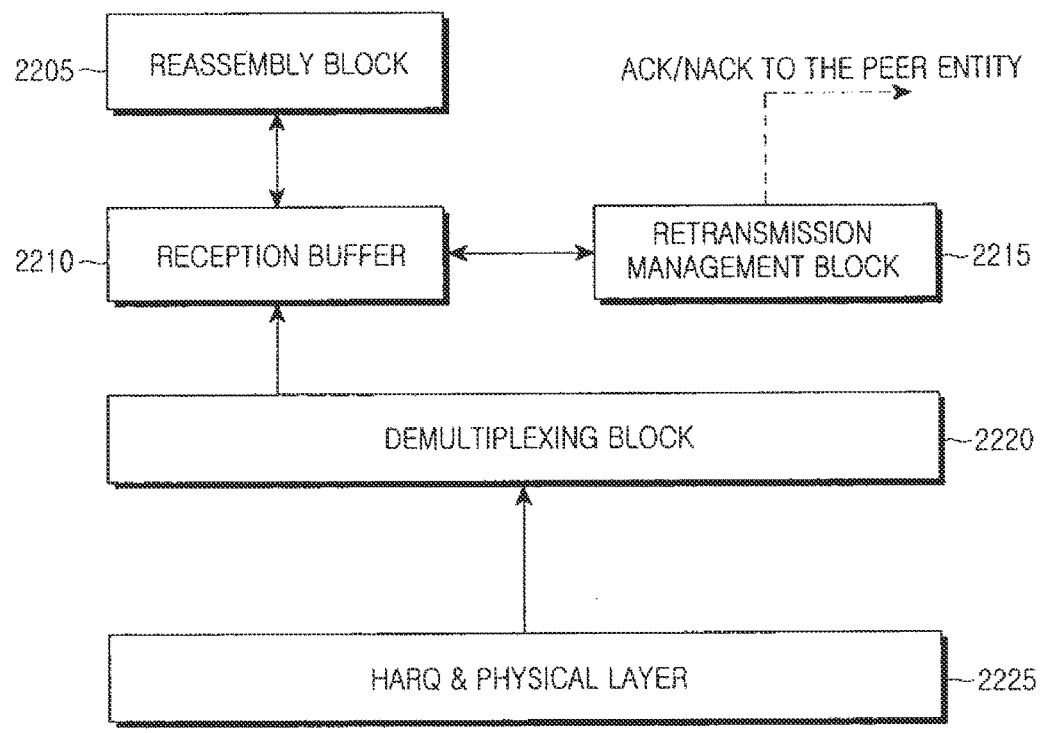
FIG. 22 is a block diagram illustrating a structure of a receiver according to an exemplary embodiment of the present invention.

FIG. 22 is a block diagram illustrating a structure of a receiver according to an exemplary embodiment of the present invention.

Referring to FIG. 22, the transmitter includes a reassembly block 2205, a reception buffer 2210, a retransmission management block 2215, a demultiplexing block 2220, and an HARQ block and physical layer 2225. Of these entities, the reassembly block 2205, the reception buffer 2210, and the retransmission management block 2215 constitute a MAC-f entity. Although one MAC-f entity is shown herein, a plurality of MAC-f entities for a plurality of services can also be provided.

The HARQ block and physical layer 2225 performs an HARQ process on a MAC-m PDU through a physical channel, and delivers the MAC-m PDU successfully received through the HARQ process to the demultiplexing block 2220. The demultiplexing block 2220 analyzes multiplexing headers of the MAC-m PDU delivered from the HARQ block and physical layer 2225, demultiplexes the MAC-m PDU into a plurality of MAC-f PDUs, and then delivers the demultiplexed MAC-f PDUs to MAC-f entities indicated by the corresponding multiplexing headers.

The reception buffer 2210 stores a MAC-f PDU received from the demultiplexing block 2220 in a position associated with the corresponding SN, and delivers reassemblable MAC-f PDUs among the stored MAC-f PDUs to the reassembly block 2205. Herein, the "reassemblable MAC-f PDUs" refer to MAC-f PDUs that are arranged in order of their SNs without gap. The retransmission management block 2215 checks SNs and sub-SNs of the MAC-f PDUs stored in the reception buffer 2210, and transmits an ACK/NACK signal to the other party's ARQ entity. Here, the NACK signal is transmitted by the retransmission management block 2215 to request retransmission of a particular failed MAC-f PDU, or when it cannot determine for which MAC-f PDU it should send a retransmission request. The reassembly block 2205 reconfigures the original IP packet using the segmented MAC-f PDUs among the MAC-f PDUs depending on the segment indexes and LSIs of the MAC-f PDUs delivered from the reception buffer 2210, and then delivers the IP packet to an upper layer.

Figure 23:
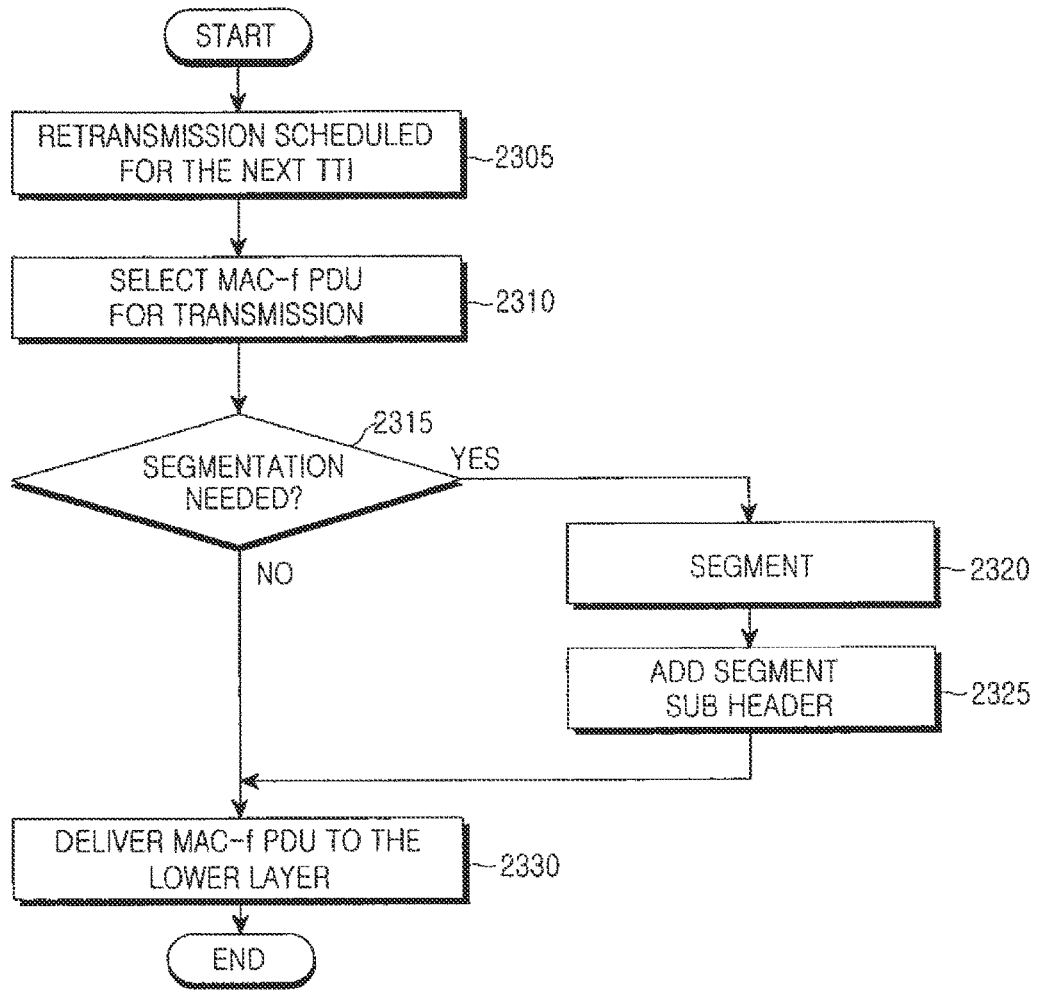
FIG. 23 is a flowchart illustrating a transmission operation according to an exemplary embodiment of the present invention.

FIG. 23 is a flowchart illustrating a transmission operation according to an exemplary embodiment of the present invention.

Referring to FIG. 23, in step 2305, transmission for the next TTI is scheduled and the amount of transmission data is determined. Herein, the amount of transmission data will be referred to as 'transmission capacity'. In step 2310, a transmitter's MAC-f entity selects a MAC-f PDU that it will transmit, among the MAC-f PDUs stored in a transmission buffer and a retransmission buffer. That is, if there is a need for retransmission of the MAC-f PDU transmitted in the previous TTI, the MAC-f entity selects the MAC-f PDU stored in the retransmission buffer, and if there is no need for retransmission, the MAC-f entity selects the MAC-f PDU stored in the transmission buffer.

In step 2315, the MAC-f entity compares a size of the selected MAC-f PDU with the transmission capacity to determine whether there is a need for segmentation of the selected MAC-f PDU. If the transmission capacity is greater than or equal to the size of the selected MAC-f PDU, there is no need for segmentation. However, if the transmission capacity is less than the size of the selected MAC-f PDU, there is a need for segmentation. If there is a need for segmentation, the MAC-f entity proceeds to step 2320. However, if there is no need for segmentation, the MAC-f entity proceeds to step 2330 where it delivers the MAC-f PDU to a lower layer to transmit it over a radio channel.

The MAC-f entity segments the selected MAC-f PDU in an appropriate size corresponding to the transmission capacity in step 2320, inserts a segment sub-header composed of a segment index and an LSI in a MAC-f header of the segmented MAC-f PDU in step 2325, and then delivers the MAC-f PDU to the lower layer to transmit it over a radio channel in step 2330.

Figure 24:
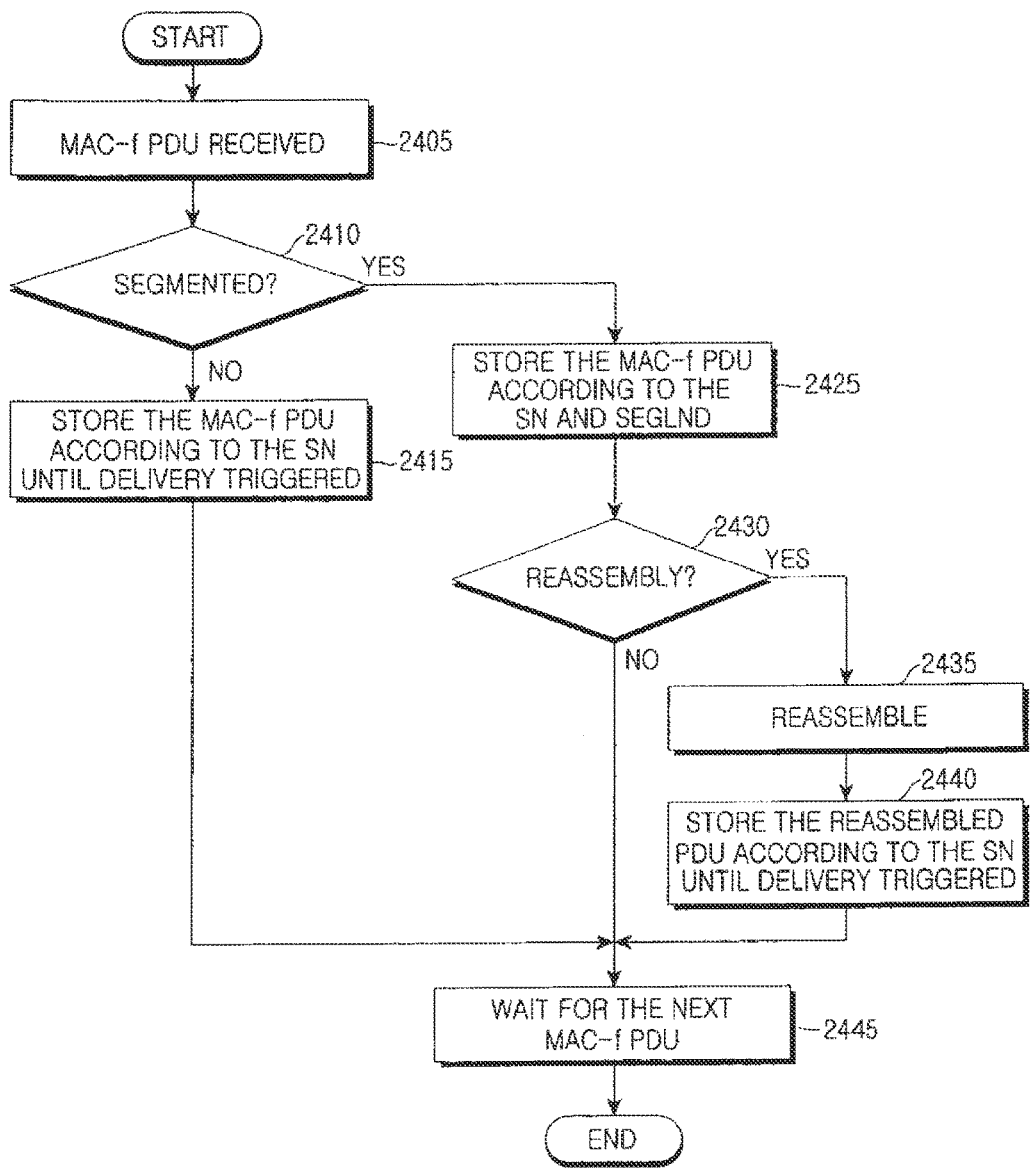
FIG. 24 is a flowchart illustrating a reception operation according to an exemplary embodiment of the present invention.

FIG. 24 is a flowchart illustrating a reception operation according to an exemplary embodiment of the present invention.

Referring to FIG. 24, if a MAC-f PDU is received in step 2405, a receiver's MAC-f entity determines whether the MAC-f PDU includes a segment sub-header to check if the received MAC-f PDU is a segmented MAC-f PDU in step 2410. If the received MAC-f PDU is a segmented MAC-f PDU, the MAC-f entity proceeds to step 2425. Otherwise, the MAC-f entity proceeds to step 2415.

In step 2415, the MAC-f entity stores the MAC-f PDU in a reception buffer according to an SN until a 'delivery condition to an upper layer' is satisfied, and then proceeds to step 2445. The 'delivery condition to an upper layer' is specified according to circumstances. For example, if the reception buffer is set for 'in-sequence delivery', the 'delivery condition to an upper layer' is satisfied when there is no non-received PDU among the MAC-f PDUs having SNs lower than that of the MAC-f PDU. If the 'delivery condition to an upper layer' is satisfied, the reception buffer reconfigures an upper layer packet using the MAC-f PDUs, and delivers the reconfigured packet to the upper layer. On the contrary, if the reception buffer is set for 'out of sequence delivery', the reception buffer reconfigures an upper layer packet using the MAC-f PDUs that can be reconfigured as an upper layer packet, among the received MAC-f PDUs, and then delivers the reconfigured upper layer packet to the upper layer. In other words, in 'in-sequence delivery', the MAC-f PDUs are delivered to the upper layer according to the received sequence, and in 'out of sequence delivery', the MAC-f PDUs are delivered to the upper layer regardless of the received sequence.

In step 2425, the MAC-f entity stores the MAC-f PDU in the reception buffer according to the SN and the segment index.

In step 2430, the MAC-f entity determines whether reassembly of the MAC-f PDUs stored in the reception buffer is possible, that is, whether there are reassemblable MAC-f PDUs. The reassembly is possible if the following conditions are satisfied.

1. In a given segment level, the MAC-f entity groups MAC-f PDUs having the same 'SNs and segment indexes' except for the last segment index into one segmented MAC-f PDU set. For example, MAC-f PDU[12.0.0] and MAC-f PDU[12.0.1] are grouped into the same segmented MAC-f PDU set. On the contrary, MAC-f PDU[12.0.0] and MAC-f PDU[12.1.1] do not belong to the same segmented MAC-f PDU set. Herein, the segmented MAC-f PDU set includes MAC-f PDUs reassemblable in the high-level MAC-f PDU (that is, parent MAC-f PDU), and when one segmented MAC-f PDU set is completely collected, the segmented MAC-f PDUs in the MAC-f PDU set are reassembled in the high-level MAC-f PDU.

2. If a MAC-f PDU with the last segment index=0 through a MAC-f PDU with an LSI=1 among the MAC-f PDUs belonging to the segmented MAC-f PDU set have the continuous last segment indexes, the segmented MAC-f PDU set can be reassembled.

In step 2435, the MAC-f entity reassembles the reassemblable MAC-f PDUs. The segmented MAC-f PDU set is reassembled in the high-level MAC-f PDU as follows.

1. The MAC-f entity sequentially concatenates payloads of all MAC-f PDUs included in the segmented MAC-f PDU set, generating a payload of the high-level MAC-f PDU.

2. The MAC-f entity configures a header of the high-level MAC-f PDU as follows.

2.1 The MAC-f entity selects any one of the MAC-f PDUs included in the segmented MAC-f PDU set, and defines the part obtained by removing the last segment sub-header from the MAC-f header of the selected MAC-f PDU as a MAC-f header of the high-level MAC-f PDU.

3. The MAC-f entity adds a header and a payload of the high-level MAC-f PDU, completing reassembly of the high-level MAC-f PDU.

In step 2440, the MAC-f entity stores the reassembled high-level MAC-f PDU in the reception buffer until the 'delivery condition to an upper layer' is satisfied, and then proceeds to step 2445. On the contrary, if there is no reassemblable MAC-f PDU in step 2430, the MAC-f entity proceeds to step 2445 where it waits for the next MAC-f PDU.

The use of the foregoing implicit NACK signal will now be described in more detail below.

In the system supporting retransmission, if a specific condition is satisfied, a receiver generates a status report and transmits the generated status report to a transmitter. The status report contains therein the last SN of a PDU successfully received up to an occurrence time of the status report, and an SN of a retransmission-requested PDU(s), and the SN of the retransmission-required PDU is a NACK signal. The receiver checks whether SNs of the received PDUs are continuous to each other, to determine if there is a gap between SNs. If there is a gap, the PDU having an SN corresponding to the gap is considered as a non-received PDU, and the status report contains a NACK signal indicating an SN for the non-received PDU, and sends a request for retransmission of the non-received PDU to the transmitter.

However, if the PDU is segmented, the receiver may not determine the gap between the SNs. There is a possible case where the receiver fails to receive a segment including an 'indicator indicating the last segment', i.e. LSI, among, for example, three segments. In this case, the receiver, although it recognizes presence of a non-received PDU, cannot be aware of an SN of the non-received PDU. In this case, the implicit NACK signal is used.

Figure 25:
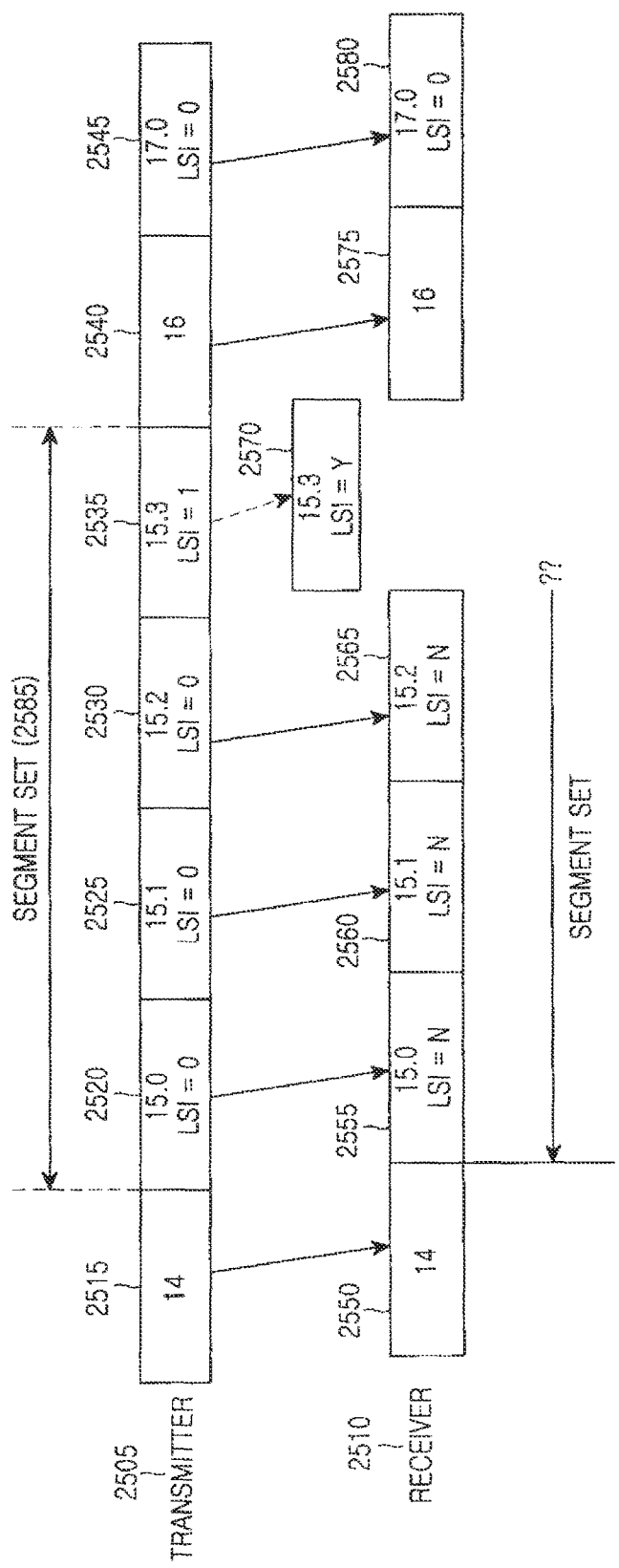
FIG. 25 is diagram of a use of an implicit NACK signal according to an exemplary embodiment of the present invention.

FIG. 25 is diagram for a description of a use of an implicit NACK signal according to an exemplary embodiment of the present invention.

Referring to FIG. 25, a transmitter 2505 transmits PDU [14] 2515, PDU[15.0] 2520, PDU[15.1] 2525, PDU[15.2] 2530, PDU[15.3] 2535, PDU[16] 2540, and PDU[17] 2545 to a receiver 2510. That is, for some reason, a PDU[15] is segmented into 4 segments, and PDU[15.0] 2520, PDU [15.1] 2525, PDU[15.2] 2530, and PDU[15.3] 2535 include fragments associated with the PDU[15], respectively, thereby configuring the same segment set 2585. The PDU [15.3] 2535 including the last segment of the segment set 2585 has an LSI being set to '1'.

As shown by reference numeral 2570, the PDU[15.3] 2535 including the last segment in the segment set 2585 having an SN 15 is lost without being successfully received at the receiver 2510. The receiver 2510, although it has received PDU[15.0] to PDU[15.2], has failed to receive the information (i.e. LSI) indicating the last segment, so it recognizes the fact that there is at least one non-received PDU having an SN greater than that of the PDU[15.2]. However, the receiver 2510 cannot be aware whether there is only one non-received PDU or there are more than two non-received PDUs having greater SNs.

In this case, the receiver 2510 transmits an implicit NACK signal through a status report.

Figure 26:
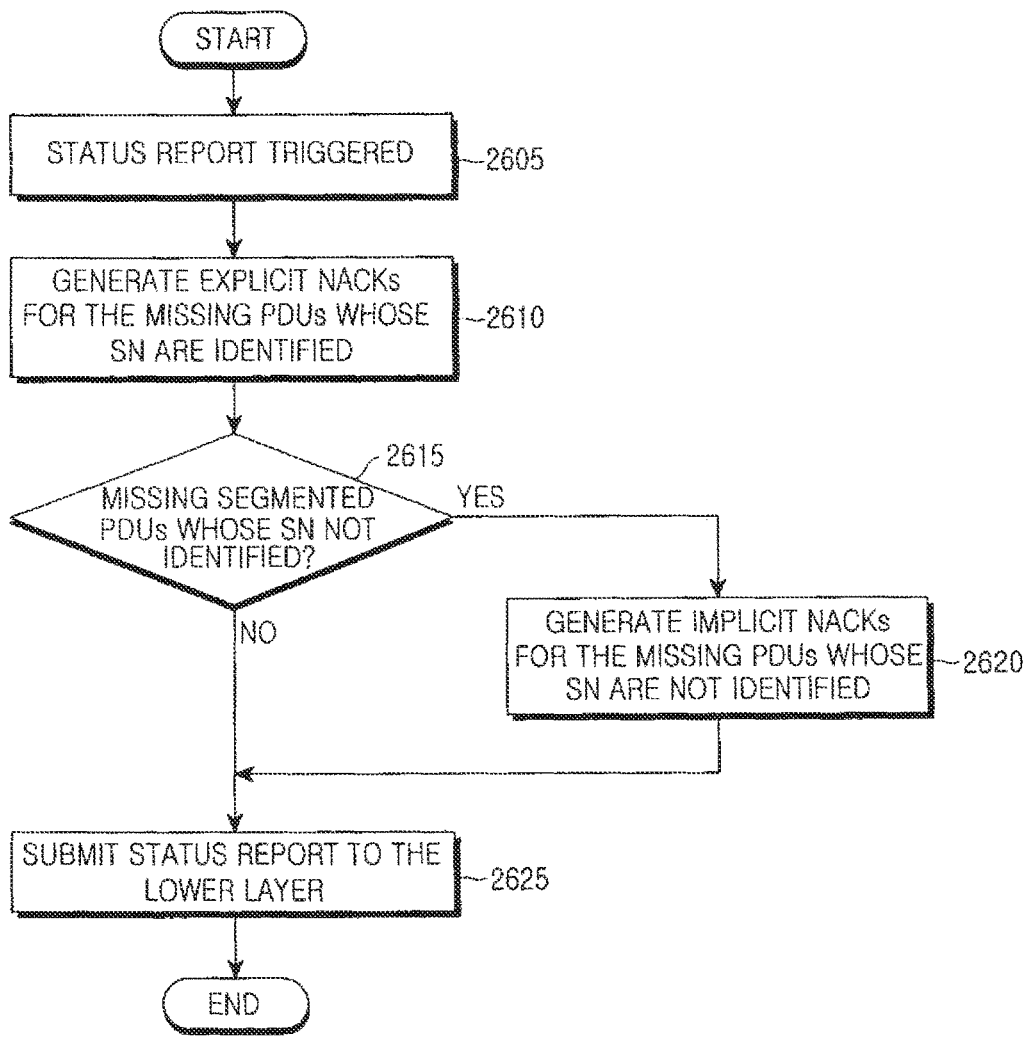
FIG. 26 is a flowchart illustrating an operation of transmitting an implicit NACK signal according to an exemplary embodiment of the present invention.

FIG. 26 is a flowchart illustrating an operation of transmitting an implicit NACK signal according to an exemplary embodiment of the present invention.

Referring to FIG. 26, a generation condition of a status report is satisfied in step 2605. For example, the generation condition can include an occasion where a status report occurrence time based on a predetermined period has arrived, and another occasion where a status report transmission command is received from a transmitter. In step 2610, a receiver checks whether SNs of the PDUs successfully received up to the time where the generation condition of the status report is satisfied are continuous to each other, to detect an SN of a non-received PDU, configures an explicit NACK signal for the non-received PDU, and contains it in the status report. In step 2615, the receiver checks whether there is any non-received PDU whose SN is unidentified. If there is any non-received PDU whose SN is unidentified, the receiver proceeds to step 2620, and if there is no non-received PDU, the receiver proceeds to step 2625. If it is determined in step 2615 that there is any non-received PDU whose SN is unidentified, the receiver generates, in step 2625, an explicit NACK signal including an SN of the non-received PDU, and transmits the explicit NACK signal to the transmitter along with a status report.

Step 2615 will be described in more detail. The receiver checks whether there is any segment set of which a PDU with an indicator indicating the last segment being set to '1' is not received, among the segment sets including received PDUs, reassembly of which is not completed. If there is a segment set satisfying the above condition, indicating that there is a non-received PDU whose SN is unidentified, the receiver proceeds to step 2620. The "segment set" refers to a set of PDUs segmented from the same PDU, and the segmented PDUs share the same SN and are identified by sub-SNs. If segmentation is performed over several levels, the segmented PDUs belonging to the segment set are equal in the SN and sub-SNs except for the last sub-SN, and identified by the last sub-SNs.

In step 2620, the receiver includes in the implicit NACK the highest SN of the PDU belonging to the segment set satisfying the condition of step 2615 among the received PDUs, and then proceeds to step 2625. In the example of FIG. 25, an SN [15.2] is reported through the implicit NACK. In other words, if the segmented PDU indicating the last segment among the non-reassembled PDUs is not received, the receiver contains in the implicit NACK the highest-SN PDU among the non-reassembled PDUs.

In step 2625, the receiver transmits a status report including the implicit NACK to the transmitter.

Figure 27:
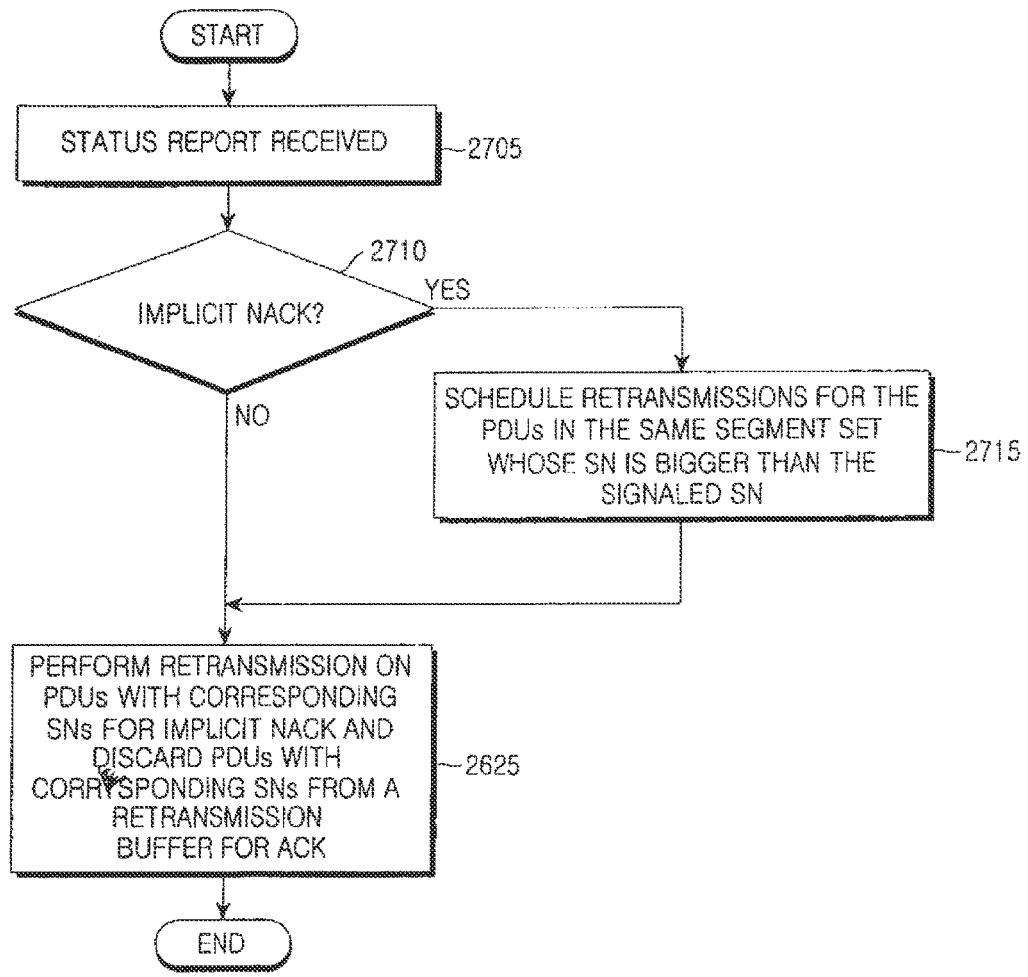
FIG. 27 is a flowchart illustrating an operation of receiving an implicit NACK signal according to an exemplary embodiment of the present invention.

FIG. 27 is a flowchart illustrating an operation of receiving an implicit NACK signal according to an exemplary embodiment of the present invention.

Referring to FIG. 27, after receiving a status report in step 2705, a transmitter determines in step 2710 whether there is an implicit NACK contained in the received status report. If there is no implicit NACK contained in the status report, the transmitter proceeds to step 2720. Format information of the NACK signal can be obtained from a type value of the NACK signal included in the status report. If the implicit NACK is contained, the transmitter proceeds to step 2715 where it schedules retransmission in response to the implicit NACK, and then proceeds to step 2720. Specifically, in step 2715, the transmitter detects an SN contained in the implicit NACK, and performs retransmission on the PDUs having SNs greater than the detected SN in the segment set corresponding to the SN. Herein, the segment set corresponding to a particular SN refers to PDUs belonging to the same segment set as the PDU having the particular SN.

For example, in FIG. 25, if an SN [15.2] is contained in the implicit NACK, a segment set corresponding to the SN includes PDU[15.0], PDU[15.1], PDU[15.2], and PDU [15.3]. Because a PDU having an SN greater than the SN [15.2] is PDU[15.3], the transmitter schedules retransmission of the PDU[15.3].

In step 2720, the transmitter appropriately processes the remaining status information except for the implicit NACK. That is, the transmitter performs retransmission on the PDUs associated with the corresponding SNs, for the common implicit NACK, and discards the PDUs associated with the corresponding SNs from a retransmission buffer, for an ACK.

The foregoing implicit NACK can be applied to every type of system that contains transmission data packets in several PDUs before transmission, and receives information indicating successful receipt of the PDUs, being fed back from a receiver. For example, in a UMTS system, an RLC layer in charge of setup and release of logical channels can operate in one of three operation modes: an Acknowledged Mode (AM mode), an Unacknowledged Mode (UM mode) and a Transparent Mode (TM mode). An RLC layer operating in the AM mode (hereinafter referred to as an "RLC AM layer") segments or concatenates the data delivered from an upper layer, that is, RLC Service Data Unit(s) (SDU), performs padding on the resulting data such that its size should be appropriate for transmission through a radio channel, inserts segmentation/concatenation/padding information and an SN therein to generate an RLC Protocol Data Unit (PDU), and delivers the RLC PDU to a lower layer. A receiver's RLC AM layer checks SNs of RLC PDUs transmitted by a transmitter to determine whether there is any non-received PDU. If there is any non-received PDU, the receiver's RLC AM layer sends a retransmission request.

Figure 28:
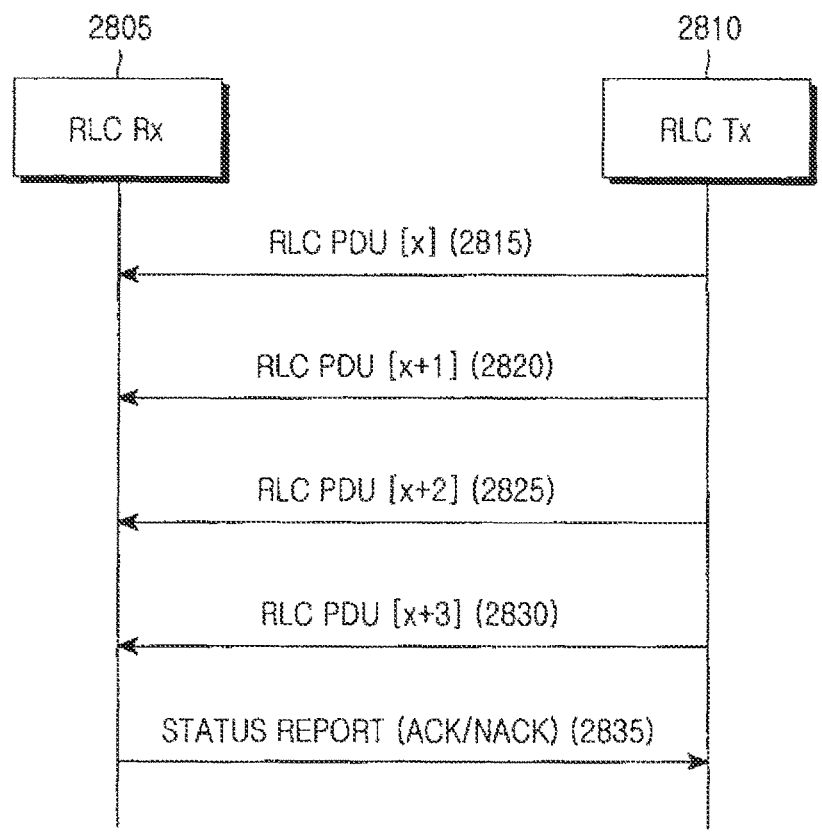
FIG. 28 is a flowchart illustrating an operation of an RLC AM mode.

Accordingly, the RLC AM layer detects a non-received PDU and performs retransmission thereon. With reference to FIG. 28, a detailed description will now be made of an operation of the RLC AM layer. Herein, an entity for transmitting user data is called an RLC transmission entity 2810, and an entity for receiving user data and transmitting a status report is called an RLC reception entity 2805. In HSDPA, the RLC transmission entity 2810 is included in a terminal, and the RLC reception entity 2805 is included in an RNC. Referring to FIG. 28, the RLC transmission entity 2810 attaches an SN to the user data called an RLC PDU, before transmission. Herein, for convenience, an RLC PDU with an SN=x is denoted by RLC PDU[x].

The RLC reception entity 2805 checks SNs 2815, 2820, 2825 and 2830 of the RLC PDUs transmitted by the RLC transmission entity 2810, to determine whether there is any non-received PDU. For example, if an RLC PDU[x+2] 2825 is lost during its transmission, the RLC reception entity 2805, after receiving an RLC PDU[x+3] 2830, recognizes the fact that the RLC PDU[x+2] 2825 is lost and there is a need for retransmission of the RLC PDU[x+2] 2825. Thereafter, the RLC reception entity 2805 can request the retransmission by transmitting feedback information called Status PDU to the RLC reception entity 2810.

The RLC reception entity 2805 transmits a Status Report 2835 periodically or when a particular event occurs, to notify a received status to the RLC transmission entity 2810. The Status Report 2835 includes therein an ACK signal which is SNs of RLC PDUs received from the RLC transmission entity 2810, and a NACK signal which is SNs of non-received RLC PDUs. The RLC transmission entity 2810 performs retransmission on the RLC PDUs denoted by NACK in the Status Report 2835 to increase reliability of communication.

Even in the foregoing operation of the RLC AM layer, as described above, there is a possible case where although the transmitter cannot exactly know which RLC PDU the receiver has failed to receive, there is a high RLC PDU loss possibility. For example, in HSDPA for implementing high speed downlink data communication, when a terminal receiving data moves to a cell (target cell) controlled by a new base station through handover, the new base station cannot be aware of the left data that was not transmitted from a previous base station to the terminal. In order to solve this problem, if the terminal moves to the new base station, the HSDPA allows the terminal to transmit a Status Report to the new base station to perform retransmission in an RLC layer. However, simply with the use of this method, retransmission on the data left in the previous base station cannot be performed.

Figure 29:
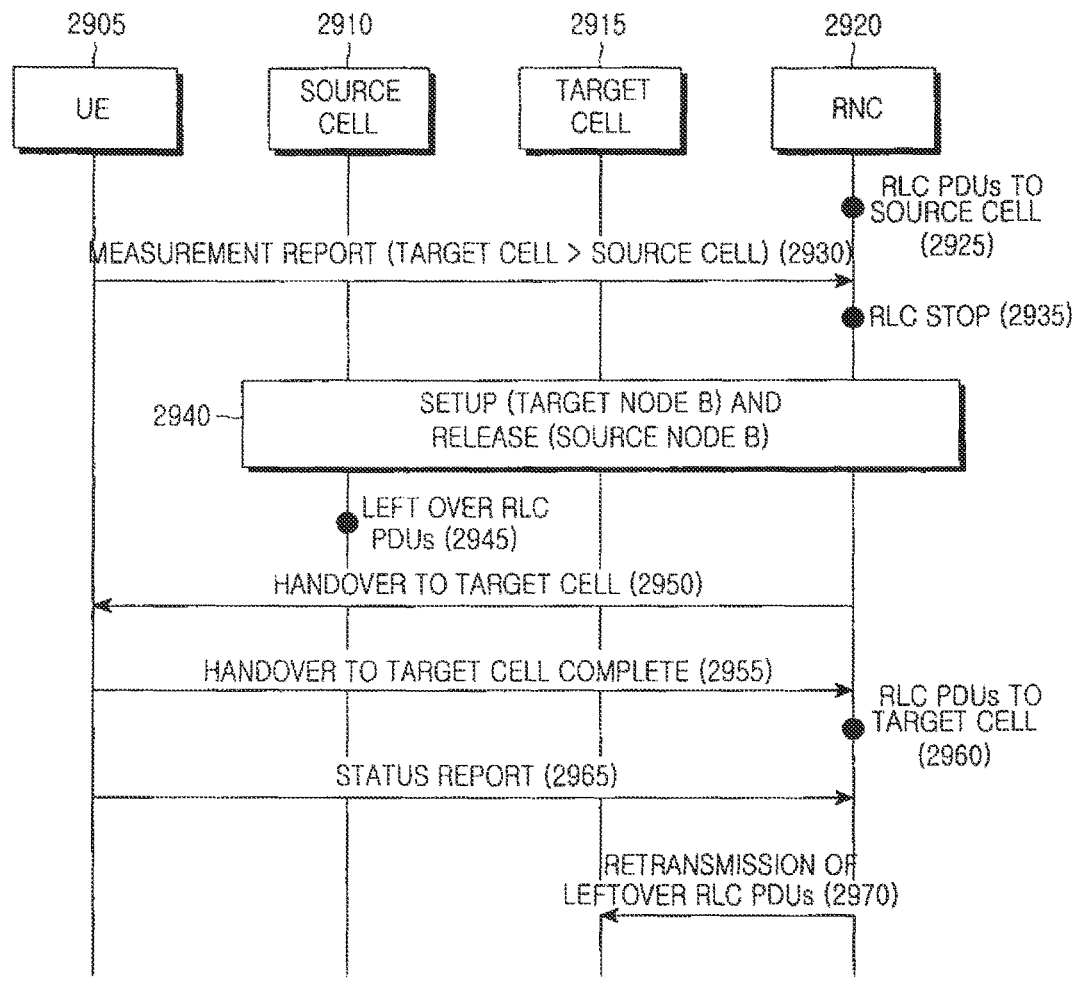
FIG. 29 is a signaling diagram illustrating a HSDPA cell switching process.

FIG. 29 is a signaling diagram illustrating an HSDPA cell switching process.

Referring to FIG. 29, a RNC transmits RLC PDUs to a source cell 2910 in step 2925. Cell Reselection is triggered when a Measurement Report of a terminal (UE) 2905, indicating that a channel status of a target cell 2915 is better than that of the source cell 2910, is delivered to an RNC 2920 that controls radio resources of the UE 2905, in step 2930.

Upon receipt of the Measurement Report, the RNC 2920 stops transmission of RLC PDUs to the source cell 2910 in step 2935, and sets up a new communication link for the UE 2905 to the target cell 2915 and releases a communication link of the source cell 2910 in step 2940. If the communication link of the source cell 2910 is released, communication for the UE 2905 is stopped in the source cell 2910, so the RLC PDUs not transmitted to the UE 2905 can be left in a transmission buffer of the source cell 2910 in step 2945.

In step 2950, the RNC 2920 sends a command for handover to the target cell 2915 to the UE 2905. Upon receipt of a Handover Complete Response message from the UE 2905 in step 2955, the RNC 2920 starts transmitting RLC PDUs to the target cell 2915 in step 2960. After handover to the target cell 2915, the UE 2905 transmits a Status Report to the RNC 2920 in step 2965 to request retransmission in an RLC layer for the RLC PDUs that it has failed to receive from the source cell 2910. Then, in step 2970, the RNC 2920 retransmits the PDUs NACKed in the Status Report.

However, this method is disadvantageous in that it cannot request retransmission for the PDUs not transmitted from the source cell, simply with the Status Report that contains the received status from the source cell.

Figure 30:
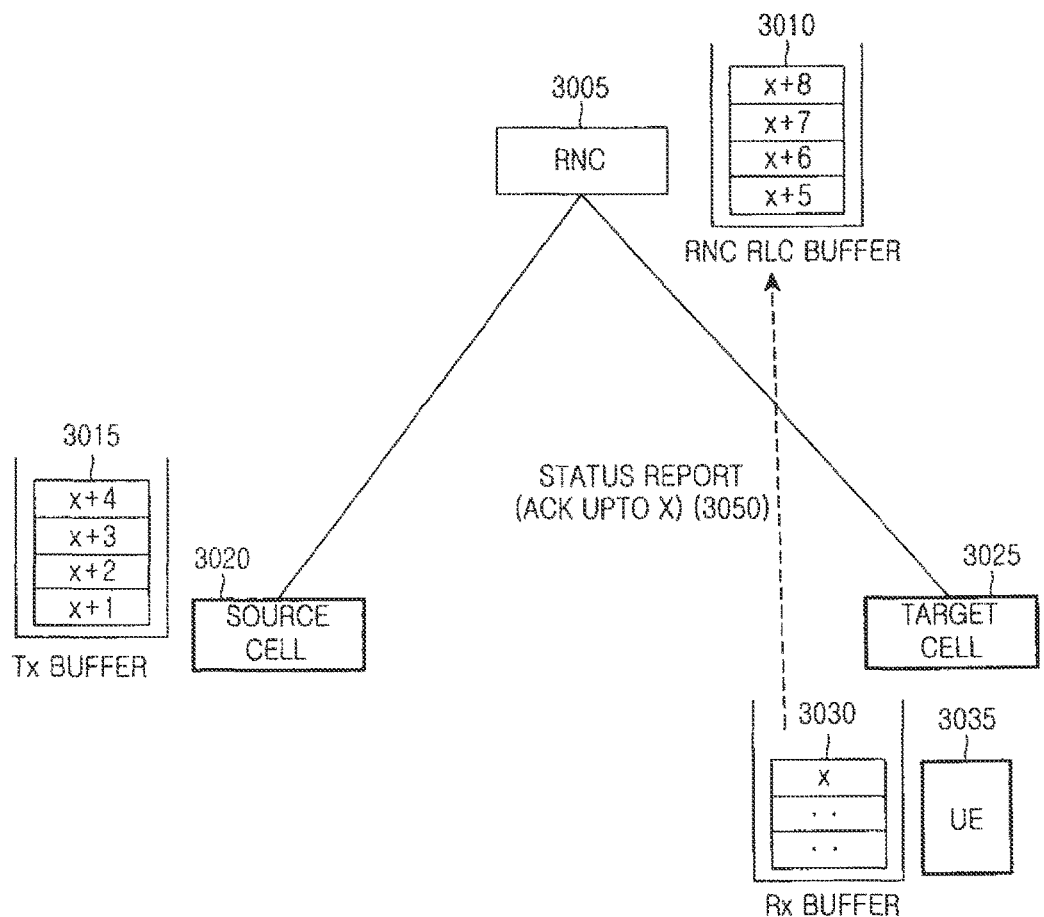
FIG. 30 is a diagram for a description of the problem occurring in the HSDPA cell switching process.

With reference to FIG. 30, it is assumed that a UE 3035 that was performing communication in a source cell 3020 has moved to a target cell 3025 at a certain time, received up to an RLC PDU with an SN=x (that is, PDU[x]) and stored the received RLC PDUs in a reception buffer 3030. Here, PDU[x+1]~PDU[x+4] stored in a transmission buffer 3015 of the source cell 3020 were not transmitted to the UE 3035. Therefore, PDU[x+5] and PDUs having greater SNs are stored in an RLC transmission buffer 3010 of a RNC 3005.

If the UE 3035 transmitted a Status Report 3050 as soon as it moved to the target cell 3025, the information indicating successful receipt of up to PDU[x] is written in the Status Report 3050 of the UE 3035. Therefore, the RNC 3005 cannot recognize the fact that there is a need to retransmit PDU[x+1]~PDU[x+4] to the UE 3035.

In this case, an exemplary embodiment of the present invention described below uses an implicit NACK.

Figure 31:
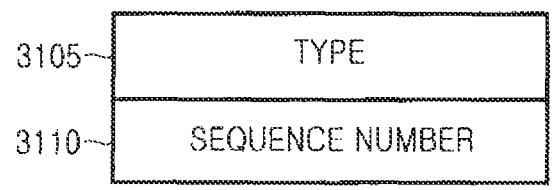
FIG. 31 is a diagram illustrating an exemplary implicit NACK available for a RLC AM layer operation during handover according to an exemplary embodiment of the present invention.

FIG. 31 illustrates an exemplary implicit NACK available for an RLC AM layer operation during handover according to an exemplary embodiment of the present invention. Herein, unlike the format of the foregoing implicit NACK signal, one SN field 3110 is shown.

Referring to FIG. 31, a Type field 3105 includes a type value indicating an implicit NACK. In the 3GPP RLC standard, 4 bits are used for the Type field 3105, and usages of 1000~1111 of these bits are not defined. Therefore, one of the unused type values can be used for indicating an implicit NACK. The highest SN of the RLC PDU received by the RLC reception entity is inserted in a Sequence Number (SN) field 3110 of the implicit NACK. For example, in the case of FIG. 30, an SN 'x' is inserted in the SN field 3110.

Upon receipt of this implicit NACK, an RLC transmission entity performs retransmission on RLC PDUs having SNs higher than the SN field 3110 of the implicit NACK. For example, in the case of FIG. 30, RLC PDU[x+1]~PDU[x+4] will be retransmitted.

Figure 32:
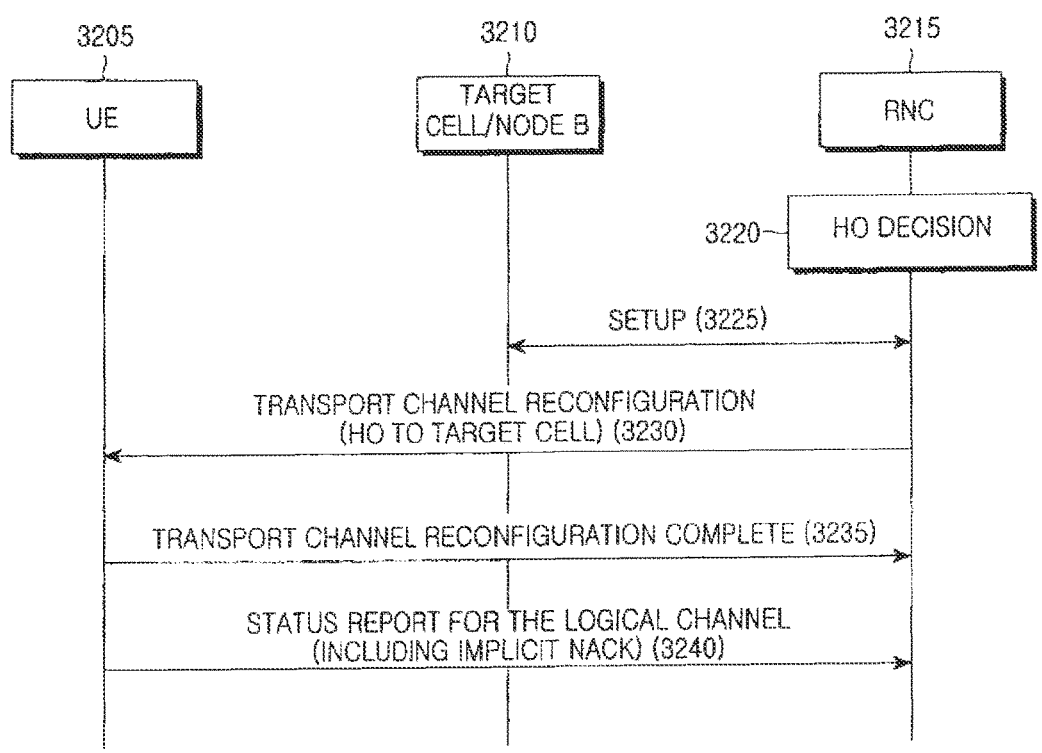
FIG. 32 is a signaling diagram illustrating a transmission and reception operation of a RLC AM layer during handover according to an exemplary embodiment of the present invention.

FIG. 32 is a diagram illustrating a transmission and reception operation of an RLC AM layer during handover according to an exemplary embodiment of the present invention. Herein, an HSDPA operation in a UMTS system is shown.

Referring to FIG. 32, in step 3220, an RNC 3215 determines that a UE 3205 will perform handover to a target cell 3210. Then the RNC 3215 sets up a communication link so that the target cell 3210 can perform packet data communication with the UE 3205, in step 3225, and commands the UE 3205 to perform handover to the target cell 3210 in step 3230. As the handover command, a Transport Channel Reconfiguration message can be used.

The UE 3205 sets up a communication link to the target cell 3210 according to set information of the Transport Channel Reconfiguration message, and transmits to the RNC 3215 a Transport Channel Reconfiguration Complete message indicating completed setup of a transport channel for the target cell 3210, in step 3235.

If the UE 3205 performs handover to the target cell 3210 in this manner, the UE 3205 considers that there is at least one unidentified RLC PDU not successfully received from the network. Therefore, in step 3240, the UE 3205 transmits a Status Report including an implicit NACK to the RNC 3215.

Figure 33:
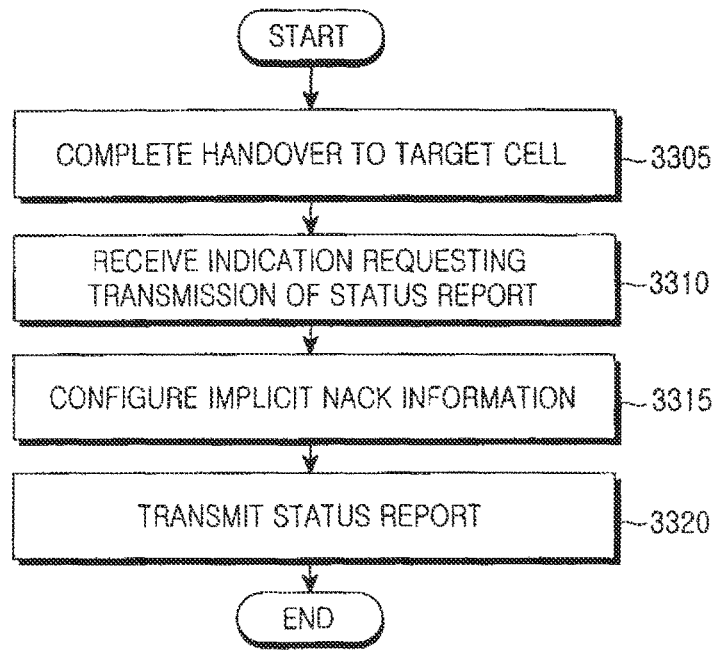
FIG. 33 is a diagram illustrating an operation of a RLC reception entity during cell switching according to an exemplary embodiment of the present invention.

FIG. 33 is a diagram illustrating an operation of an RLC reception entity during cell switching according to an exemplary embodiment of the present invention.

Referring to FIG. 33, if a UE completes handover to a target cell in step 3305, an RLC reception entity included in the UE receives a command for transmission of a Status Report from an entity that manages the handover, in step 3310. Then the RLC reception entity configures an implicit NACK in step 3315. An SN of the PDU having the highest SN among the PDUs that the RLC reception entity has received up to now is written in the implicit NACK. In step 3320, the RLC reception entity transmits the Status Report including the implicit NACK to an RNC that controls radio resources of the UE. Here, the Status Report can be transmitted to the RNC via the target cell.

Although the UE can transmit the implicit NACK immediately after completing the handover, the UE can also transmit the implicit NACK immediately before performing the handover or while performing the handover.

Figure 34:
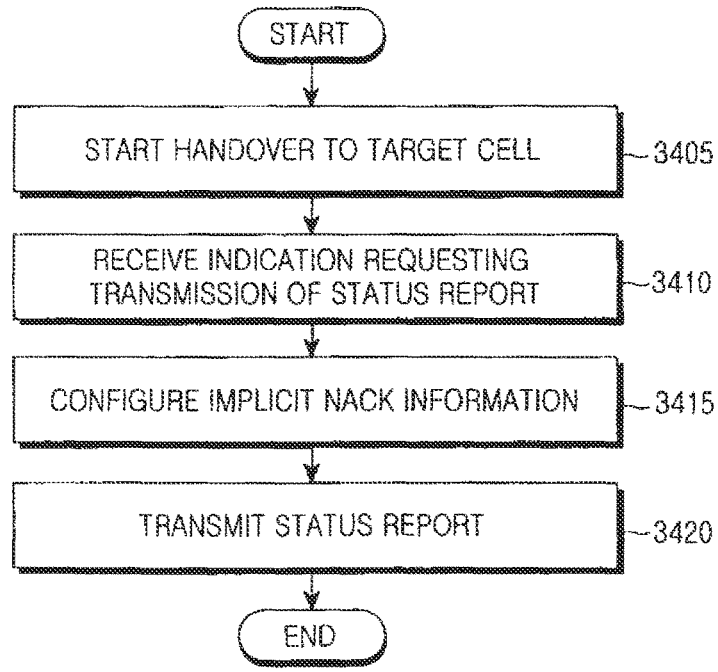
FIG. 34 is a diagram illustrating an operation of a RLC reception entity during cell switching according to an exemplary embodiment of the present invention.

FIG. 34 illustrates an operation of an RLC reception entity during cell switching according to an exemplary embodiment of the present invention.

Referring to FIG. 34, if a UE determines to start handover to a target cell in step 3405, an RLC reception entity included in the UE receives a command for transmission of a Status Report from an RRC layer in step 3410. Herein, handover of the UE can be started when the UE receives a handover command message from a network, and is completed when the UE transmits a handover complete message to the network. Therefore, an RRC layer of the UE, upon receipt of the handover command, sends a command for transmission of a Status Report to the RLC reception entity.

Upon receipt of the transmission command for the Status Report, the RLC reception entity of the UE configures an implicit NACK in step 3415. An SN of a PDU having the highest SN among the PDUs that the RLC reception entity has received up to now is written in the implicit NACK. In step 3420, the RLC reception entity transmits the Status Report including the implicit NACK to an RNC that controls radio resources of the UE. Here, the Status Report can be transmitted to the RNC via the source cell.

Figure 35:
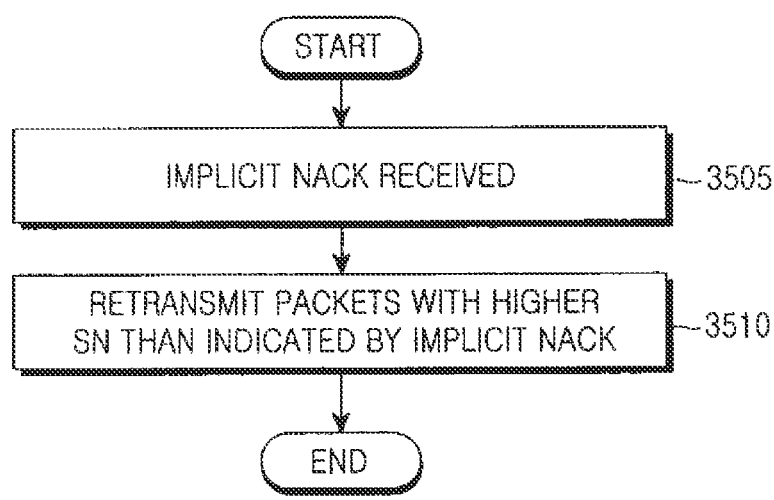
FIG. 35 is a flowchart illustrating an operation of a RLC transmission entity during cell switching according to an exemplary embodiment of the present invention.

FIG. 35 illustrates an operation of an RLC transmission entity during cell switching according to an exemplary embodiment of the present invention.

Referring to FIG. 35, in step 3505, an RLC transmission entity included in an RNC receives a Status Report including an implicit NACK from a UE. In step 3510, the RLC transmission entity performs retransmission on the packets having SNs higher than the SN written in the implicit NACK.

A description will now be made for solving the problem that exists when the RLC transmission entity is not aware of the PDU that the UE has failed to receive during handover.

Commonly, in order to recognize that the UE has failed to receive a particular PDU, the RLC transmission entity should receive a PDU having an SN higher than the particular PDU. For example, in the case of FIG. 30, in order to recognize the fact that the UE should send a retransmission request for PDU[x+1]~PDU[x+4], the RLC transmission entity should first receive PDU[x+5].

Therefore, in the exemplary embodiment described below, the UE transmits a Status Report after receiving at least one PDU from a target cell, instead of transmitting the Status Report to the RNC immediately after moving to the target cell. In this manner, the UE can efficiently request retransmission of the PDUs that were not transmitted from the source cell.

Figure 36:
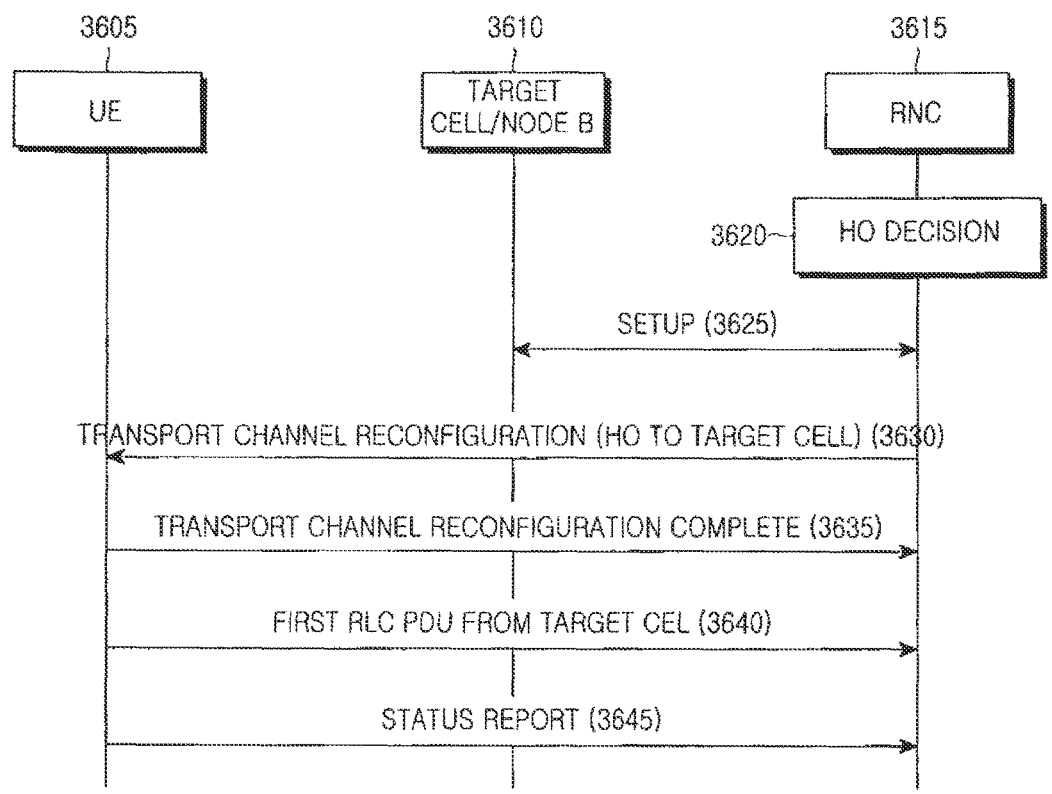
FIG. 36 is a signaling diagram illustrating a transmission operation of a Status Report during cell switching according to an exemplary embodiment of the present invention.

FIG. 36 is a signaling diagram illustrating a transmission operation of a Status Report during cell switching according to an exemplary embodiment of the present invention.

Referring to FIG. 36, an RNC 3615 determines in step 3620 that a UE 3605 will perform handover to a target cell 3610. Then the RNC 3615 sets up a communication link so that the target cell 3610 can perform packet data communication with the UE 3605, in step 3625, and commands the UE 3605 to perform handover to the target cell 3610 in step 3630. For the handover command, a Transport Channel Reconfiguration message can be used.

The UE 3605 sets up a communication link to the target cell 3610 according to set information of the Transport Channel Reconfiguration message, and transmits to the RNC 3615 a Transport Channel Reconfiguration Complete message indicating completed setup of a transport channel for the target cell 3610, in step 3635.

In addition, after handover to the target cell 3610, the UE 3605 waits until a first RLC PDU arrives from the target cell 3610. Upon receipt of the first RLC PDU from the target cell 3610 in step 3640, the UE 3605 transmits a Status Report indicating the successfully received RLC PDU and the reception-failed RLC PDU to the RNC 3615 in step 3645.

Figure 37:
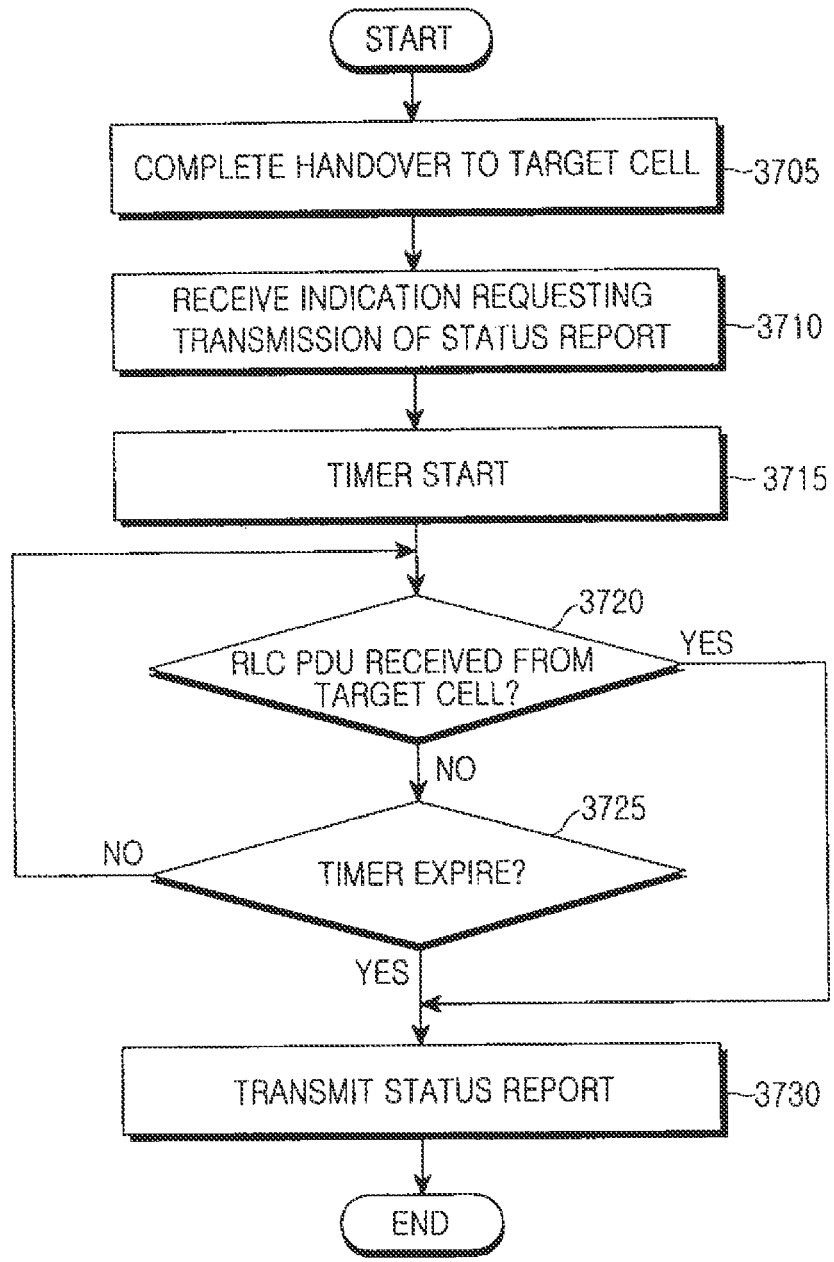
FIG. 37 is a flowchart illustrating an operation of a RLC reception entity of a UE during cell switching according to an exemplary embodiment of the present invention.

If the transmission-failed data in the source cell is the last data, no new data will be transmitted from the target cell, so a timer will be introduced for an operation of a UE shown in FIG. 37 to prepare for this case.

FIG. 37 is a flowchart illustrating an operation of an RLC reception entity of a UE during cell switching according to an exemplary embodiment of the present invention.

Referring to FIG. 37, if a UE completes handover to a target cell in step 3705, an RLC reception entity included in the UE receives a command for transmission of a Status Report from an entity that manages the handover, in step 3710. Then the RLC reception entity starts a timer set for a predetermined time in step 3715.

In step 3720, the RLC reception entity monitors whether there is any RLC PDU received from the target cell. Because the RLC reception entity can hardly determine whether there is data received from the target cell due to the hierarchical structure of the UE, the RLC reception entity can regard the first RLC PDU that it receives after step 3710, as an RLC PDU that it received from the target cell.

Upon receipt of the first RLC PDU after handover, the UE proceeds to step 3730 where it transmits a Status Report to the RLC and then ends the operation. On the contrary, upon a failure to receive the RLC PDU, the UE proceeds to step 3725.

In step 3725, the RLC reception entity determines whether the timer started in step 3715 has expired. If the timer has expired, the UE proceeds to step 3730 where it transmits a Status Report and then ends the operation. However, if the timer has not expired, the UE returns to step 3720 where it checks whether there is a received RLC PDU.

In the foregoing exemplary embodiment, if the UE moves to the target cell, it generates a Status Report after receiving the first RLC PDU from the target cell, thereby successfully restoring the RLC PDUs left in the previous cell. However, if the first RLC PDU transmitted from the target cell is a transmitted RLC PDU, an SN of the retransmitted RLC PDU is lower than that of the RLC PDU left in the previous cell, so the UE cannot restore the left RLC PDUs. Therefore, an exemplary embodiment described below allows the UE to generate a Status Report after receiving the first transmitted RLC PDU rather than the RLC PDU retransmitted from the target cell while moving to the target cell.

Figure 38:
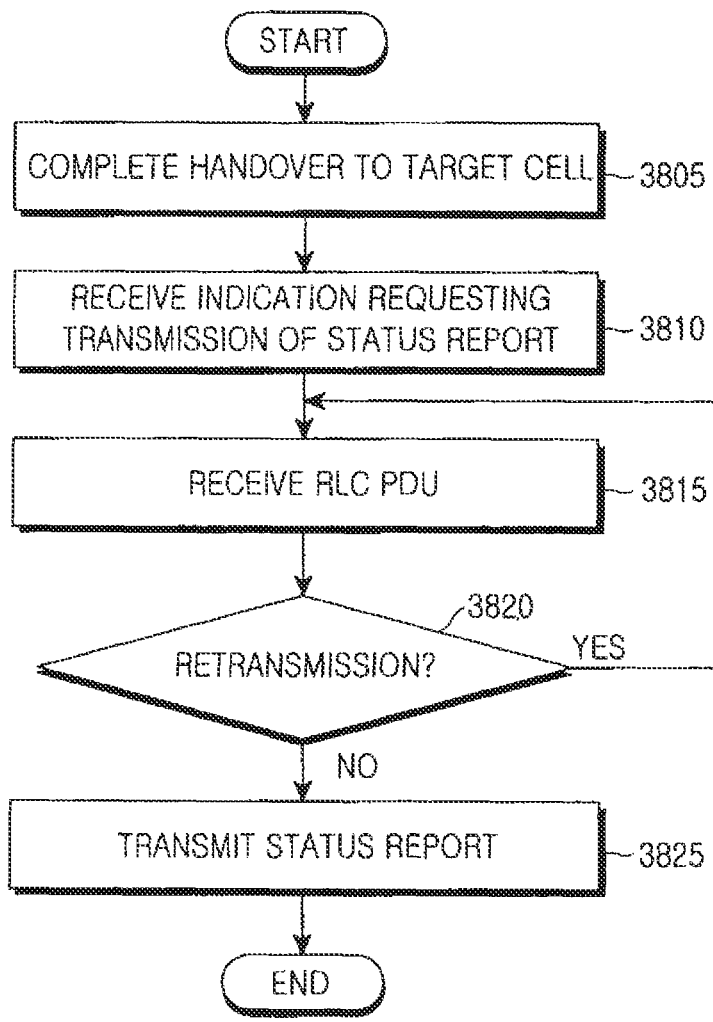
FIG. 38 is a flowchart illustrating a transmission operation of a Status Report according to an exemplary embodiment of the present invention.

FIG. 38 is a flowchart illustrating a transmission operation of a Status Report according to another embodiment of the present invention.

Referring to FIG. 38, if an UE completes handover to a target cell in step 3805, an RLC reception entity included in the UE receives a command for transmission of a Status Report from an entity that manages the handover, in step 3810.

Then, in step 3815, the RLC reception entity waits until an RLC PDU is received from the target cell. Upon receipt of an RLC PDU, the RLC reception entity proceeds to step 3820 where it determines whether the received RLC PDU is a retransmitted RLC PDU. Determining whether the received RLC PDU is a retransmitted RLC PDU can be achieved by checking whether the received RLC PDU updates VR(H). Herein, the VR(H) is a stored variable obtained by adding 1 to the highest SN among the SNs of the RLC PDUs that the RLC reception entity has received up to now. Upon receipt of a new RLC PDU, the RLC reception entity compares the SN of the received RLC PDU with the stored VR(H), and increases the VR(H) by one if the two values are equal to each other. That is, the VR(H) is updated to a new value.

If it is determined in step 3820 that the received RLC PDU is a retransmitted RLC PDU, that is, if the received RLC PDU does not update VR(H), the RLC reception entity proceeds to step 3815 where it waits until a new RLC PDU is received.

On the contrary, if it is determined in step 3820 that the received RLC PDU is not a retransmitted RLC PDU, that is, if the received RLC PDU updates VR(H), the RLC reception entity proceeds to step 3825 where it configures a Status Report and transmits the Status Report to the RNC, ending the operation.

Figure 39:
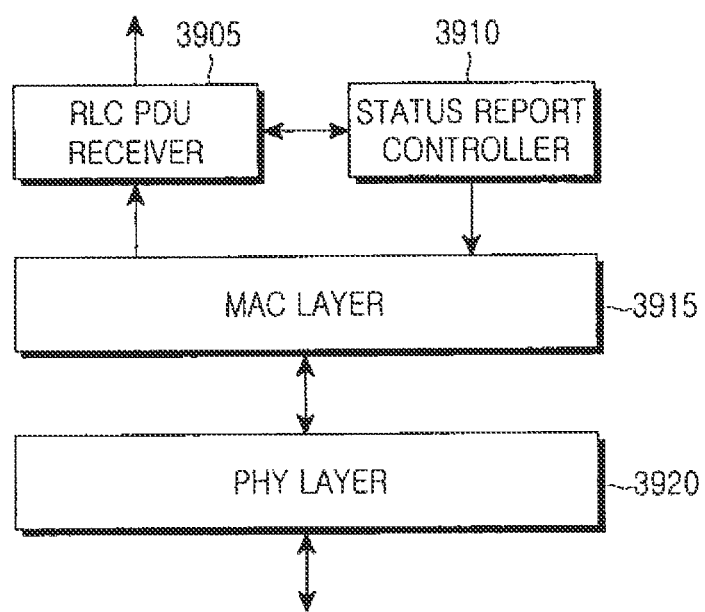
FIG. 39 is a diagram illustrating a structure of an apparatus for transmitting a Status Report during cell switching according to an exemplary embodiment of the present invention.

FIG. 39 is a diagram illustrating a structure of an apparatus for transmitting a Status Report during cell switching according to an exemplary embodiment of the present invention. As illustrated, the apparatus includes an RLC PDU receiver 3905, a Status Report controller 3910, a MAC layer 3915, and a physical layer 3920.

Referring to FIG. 39, the physical layer 3920 serves to transmit data of an upper layer over a radio channel, or serves to receive a signal on a radio channel and deliver the received signal to the upper layer. The MAC layer 3915 serves to multiplex data of an upper layer and deliver the multiplexed data to the physical layer 3920, or serves to demultiplex data provided by the physical layer 3920 and deliver the demultiplexed data to an appropriate upper layer.

The RLC PDU receiver 3905 includes a reception buffer (not shown) for receiving and buffering the RLC PDUs delivered by the MAC layer 3915, and serves to reassemble the RLC PDUs stored in the reception buffer in an RLC SDU and then deliver the RLC SDU to an upper layer. The Status Report controller 3910 serves to check SNs of the received RLC PDUs to manage a received status, and if needed, serves to generate a Status Report and deliver the Status Report to the MAC layer 3915.

In an exemplary embodiment of FIG. 33, upon receipt of a handover complete indication signal or a handover start indication signal from an entity that manages handover, the Status Report controller 3910 configures an implicit NACK and transmits a Status Report including the implicit NACK to an RNC via the MAC layer 3915 and the physical layer 3920.

In an exemplary embodiment of FIG. 36, the MAC layer 3915 monitors whether handover is completed, and if the handover is completed, the MAC layer 3915 notifies this to the Status Report controller 3910. Upon receipt of a first RLC PDU after receiving a handover complete indication signal, the Status Report controller 3910 configures a Status Report indicating a successfully received RLC PDU and a reception-failed RLC PDU at the corresponding time, and transmits the Status Report.

Figure 40:
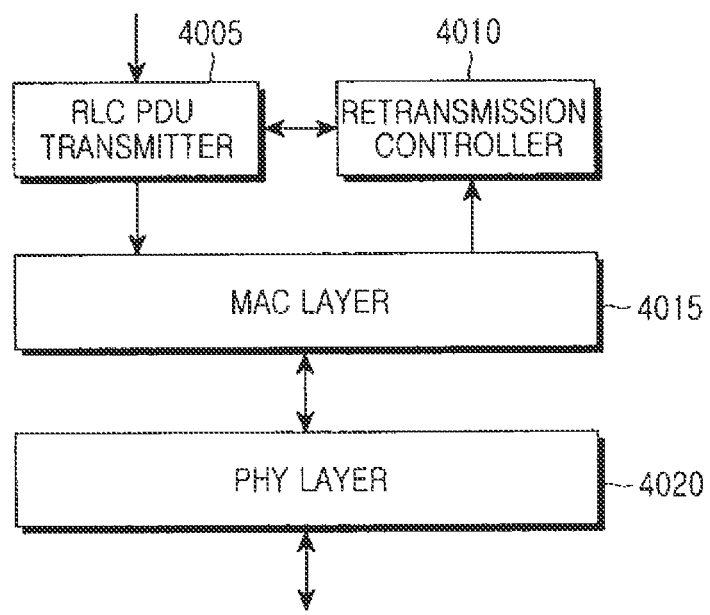
FIG. 40 is a diagram illustrating a structure of an apparatus for receiving a Status Report during cell switching according to an exemplary embodiment of the present invention.

FIG. 40 is a diagram illustrating a structure of an apparatus for receiving a Status Report during cell switching according to an exemplary embodiment of the present invention. Because the function of the transmitter corresponds to the exemplary embodiment of FIG. 36, a structure of a transmitter according to the exemplary embodiment of FIG. 33 is shown in FIG. 40. As illustrated, the apparatus includes an RLC PDU transmitter 4005, a retransmission controller 4010, a MAC layer 4015, and a physical layer 4020.

Referring to FIG. 40, the physical layer 4020 serves to transmit data of an upper layer over a radio channel, or serves to receive a signal on a radio channel and deliver the received signal to the upper layer. The MAC layer 4015 serves to multiplex data of an upper layer and deliver the multiplexed data to the physical layer 4020, or serves to demultiplex data provided by the physical layer 4020 and deliver the demultiplexed data to an appropriate upper layer.

The RLC PDU transmitter 4005 serves to generate at least one RLC PDU by concatenating or segmenting an RLC SDU(s) provided from an upper layer and then inserting an SN therein, and to deliver the RLC PDU to the MAC layer 4015. The retransmission controller 4010 receives a Status Report from another party, and if needed, sends a retransmission command to the RLC PDU transmitter 4005.

In the exemplary embodiment of FIG. 33, upon receipt of an implicit NACK included in the Status Report, the retransmission controller 4010 sends to the RLC PDU transmitter 4005 a command for retransmission of RLC PDUs having SNs higher than an SN written in the implicit NACK.

As can be understood from the foregoing description, when the receiver cannot correctly detect the PDU that it has failed to receive, the receiver transmits to the transmitter an implicit NACK including an SN of the last packet among the packets that it has successfully received up to now, so the transmitter can continuously transmit the packets having SNs following the SN included in the implicit NACK. Accordingly, the present invention performs an improved retransmission on the packets which were not successfully received.

The exemplary embodiments of the present invention can also be embodied as computer-readable codes on a computer-readable recording medium. The computer-readable recording medium is any data storage device that can store data which can thereafter be read by a computer system. Examples of the computer-readable recording medium include, but are not limited to, read-only memory (ROM), random-access memory (RAM), CD-ROMs, magnetic tapes, floppy disks, optical data storage devices, and carrier waves (such as data transmission through the Internet via wired or wireless transmission paths). The computer-readable recording medium can also be distributed over network-coupled computer systems so that the computer-readable code is stored and executed in a distributed fashion. Also, function programs, codes, and code segments for accomplishing the present invention can be easily construed as within the scope of the invention by programmers skilled in the art to which the present invention pertains While the invention has been shown and described with reference to a certain exemplary embodiments thereof, it will be understood by those skilled in the art that various changes in form and details may be made therein without departing from the spirit and scope of the invention as defined by the appended claims.

What is claimed is:

1. A method for transmitting packet data units (PDUs) at a transmitting device in a communication system, the method comprising:
    transmitting a first PDU comprising a PDU header and a data portion to a receiving device, without segmentation of the first PDU;
    determining, by the transmitting device, whether negative acknowledgment (NACK) information for the first PDU is received from the receiving device;
    segmenting, by the transmitting device, the data portion of the first PDU to form at least two PDU segments, if the NACK information is received and an available PDU size at a retransmission time is smaller than a size of the first PDU, wherein each of the at least two PDU segments comprises a PDU segment header and a data field; and
    sequentially transmitting the at least two PDU segments to the receiving device in response to the NACK information,
    wherein the data portion of the first PDU except for the PDU header is mapped to at least two data fields of the at least two PDU segments.

2. The method of claim 1, wherein the PDU segment header comprises one bit of a last segment indicator (LSI) field indicating whether or not a last portion of a corresponding PDU segment corresponds to a last portion of the first PDU.

3. The method of claim 1, wherein the PDU segment header comprises a length indicator (LI) field indicating a length of the data field of a corresponding PDU segment.

4. The method of claim 1, wherein the PDU segment header further comprises a sequence number (SN) field indicating a sequence number of the first PDU.

5. The method of claim 1, further comprising receiving NACK information comprising one of:
    first information indicating a position of a PDU segment among the at least two PDU segments segmented from the first PDU; and
    second information indicating whether a PDU segment includes a last PDU segment among the at least two PDU segments segmented from the first PDU.

6. A method for receiving packet data units (PDUs) at a receiving device in a communication system, the method comprising:
    receiving a first PDU comprising a PDU header and a data portion from a transmitting device, without segmentation of the first PDU;
    transmitting negative acknowledgment (NACK) information for the first PDU; and
    sequentially receiving at least two PDU segments from the transmitting device in response to the transmitting the NACK information,
    wherein the at least two PDU segments are formed by segmenting the data portion of the first PDU, if the NACK information is received at the transmitting device and an available PDU size at a retransmission time is smaller than a size of the first PDU, wherein each of the at least two PDU segments comprises a PDU segment header and a data field, and
    wherein the data portion of the first PDU except for the PDU header is mapped to at least two data fields of the at least two PDU segments.

7. The method of claim 6, wherein the PDU segment header comprises one bit of a last segment indicator (LSI) field indicating whether or not a last portion of a corresponding PDU segment corresponds to a last portion of the first PDU.

8. The method of claim 6, wherein the PDU segment header comprises a length indicator (LI) field indicating a length of the data field of a corresponding PDU segment.

9. The method of claim 6, wherein the PDU segment header further comprises a sequence number (SN) field indicating a sequence number of the first PDU.

10. The method of claim 6, further comprising transmitting NACK information comprising one of:
first information indicating a position of a PDU segment among the at least two PDU segments segmented from the first PDU; or
second information indicating whether the PDU segment includes a last PDU segment among the at least two PDU segments segmented from the first PDU.

11. An apparatus for transmitting packet data units (PDUs) in a transmitting device of a communication system, the apparatus comprising:
a transmitter configured to transmit a first PDU comprising a PDU header and a data portion to a receiving device, without segmentation of the first PDU;
a receiver configured to receive negative acknowledgement (NACK) information for the first PDU from the receiving device; and
a processor configured to:
determine whether the NACK information is received by the receiver, and
segment the data portion of the first PDU to form at least two PDU segments if the NACK information is received and an available PDU size at a retransmission time is smaller than a size of the first PDU,
wherein each of the at least two PDU segments comprises a PDU segment header and a data field,
wherein the transmitter is further configured to sequentially transmit the at least two PDU segments to the receiving device in response to the NACK information, and
wherein the data portion of the first PDU except for the PDU header is mapped to at least two data fields of the at least two PDU segments.

12. The apparatus of claim 11, wherein the PDU segment header comprises one bit of a last segment indicator (LSI) field indicating whether or not a last portion of a corresponding PDU segment corresponds to a last portion of the first PDU.

13. The apparatus of claim 11, wherein the PDU segment header comprises a length indicator (LI) field indicating a length of the data field of a corresponding PDU segment.

14. The apparatus of claim 11, wherein the PDU segment header further comprises a sequence number (SN) field indicating a sequence number of the first PDU.

15. The apparatus of claim 11, wherein the receiver is further configured to receive NACK information comprising one of:
first information indicating a position of a PDU segment among the at least two PDU segments segmented from the first PDU; or
second information indicating whether a PDU segment includes a last PDU segment among the at least two PDU segments segmented from the first PDU.

16. An apparatus for receiving packet data units (PDUs) in a receiving device of a communication system, the apparatus comprising:
a receiver configured to receive a first PDU comprising a PDU header and a data portion from a transmitting device, without segmentation of the first PDU; and
a transmitter configured to transmit negative acknowledgment (NACK) information for the first PDU,
wherein the receiver is further configured to sequentially receive at least two PDU segments from the transmitting device in response to the transmitting the NACK information,
wherein the at least two PDU segments are formed by segmenting the data portion of the first PDU, if the NACK information is received at the transmitting device and an available PDU size at a retransmission time is smaller than a size of the first PDU, wherein each of the at least two PDU segments comprises a PDU segment header and a data field, and
wherein the data portion of the first PDU except for the PDU header is mapped to at least two data fields of the at least two PDU segments.

17. The apparatus of claim 16, wherein the PDU segment header comprises one bit of a last segment indicator (LSI) field indicating whether or not a last portion of a corresponding PDU segment corresponds to a last portion of the first PDU.

18. The apparatus of claim 16, wherein the PDU segment header comprises a length indicator (LI) field indicating a length of the data field of a corresponding PDU segment.

19. The apparatus of claim 16, wherein the PDU segment header further comprises a sequence number (SN) field indicating a sequence number of the first PDU.

20. The apparatus of claim 16, wherein the receiver is further configured to transmit NACK information comprising one of:
first information indicating a position of a PDU segment among the at least two PDU segments segmented from the first PDU; or
second information indicating whether the PDU segment includes a last PDU segment among the at least two PDU segments segmented from the first PDU.

* * * * *